United States Patent
Watanabe et al.

(10) Patent No.: US 7,802,131 B2
(45) Date of Patent: Sep. 21, 2010

(54) INFORMATION SYSTEM AND DATA TRANSFER METHOD

(75) Inventors: Yasuo Watanabe, Machida (JP); Yasutomo Yamamoto, Sagamihara (JP); Kenta Ninose, Yokohama (JP); Yoshiaki Eguchi, Yokohama (JP); Takashige Iwamura, Yokohama (JP); Hisao Homma, Odawara (JP)

(73) Assignee: Hitachi, Ltd., Tokyo (JP)

( * ) Notice: Subject to any disclaimer, the term of this patent is extended or adjusted under 35 U.S.C. 154(b) by 374 days.

(21) Appl. No.: 11/850,918

(22) Filed: Sep. 6, 2007

(65) Prior Publication Data

US 2008/0104346 A1    May 1, 2008

(30) Foreign Application Priority Data

Oct. 30, 2006 (JP) ............................. 2006-293485
Mar. 28, 2007 (JP) ............................. 2007-085792

(51) Int. Cl.
G06F 11/00 (2006.01)
(52) U.S. Cl. .................................... 714/6; 714/4; 714/5
(58) Field of Classification Search .................... 714/4, 714/5, 6
See application file for complete search history.

(56) References Cited

U.S. PATENT DOCUMENTS

| 5,734,818 | A | 3/1998 | Kern et al. |
| 6,308,284 | B1 * | 10/2001 | LeCrone et al. ................. 714/6 |
| 6,877,073 | B2 | 4/2005 | Sanada et al. |
| 6,973,586 | B2 | 12/2005 | Petersen et al. |
| 7,058,731 | B2 | 6/2006 | Kodama |
| 7,080,197 | B2 | 7/2006 | Odenwald, Jr. |
| 7,085,956 | B2 | 8/2006 | Petersen et al. |
| 7,120,825 | B2 * | 10/2006 | Ji et al. .......................... 714/6 |
| 2004/0250034 | A1 * | 12/2004 | Yagawa et al. ............... 711/162 |
| 2004/0260736 | A1 | 12/2004 | Kern et al. |
| 2005/0027819 | A1 | 2/2005 | Nakano et al. |
| 2005/0091455 | A1 | 4/2005 | Kano et al. |
| 2005/0114599 | A1 | 5/2005 | Kasako et al. |
| 2005/0210078 | A1 | 9/2005 | Maruyama et al. |
| 2005/0251517 | A1 | 11/2005 | Watanabe et al. |
| 2006/0277378 | A1 | 12/2006 | Morishita et al. |
| 2007/0038824 | A1 | 2/2007 | Suishu et al. |
| 2007/0067593 | A1 | 3/2007 | Satoyama et al. |

FOREIGN PATENT DOCUMENTS

| JP | 7-244597 | 9/1995 |
| JP | 2001-216185 | 8/2001 |
| JP | 2003-015915 | 1/2003 |
| JP | 2004-342050 | 12/2004 |

(Continued)

*Primary Examiner*—Robert Beausoliel
*Assistant Examiner*—Charles Ehne
(74) *Attorney, Agent, or Firm*—Brundidge & Stanger, P.C.

(57) ABSTRACT

Availability of an information system including a storage apparatus and a computer is improved. First and second storage apparatuses execute remote copy of copying data written into a first primary volume from the computer to a second primary volume, at least one of the first and second storage apparatuses executes local copy of copying the data written into the first or second primary volume in a self-storage apparatus to the corresponding first or second secondary volume, and the computer switches the destination of a write request of the data from the first storage apparatus to the second storage apparatus in case of a failure occurring in the first storage apparatus.

12 Claims, 46 Drawing Sheets

FOREIGN PATENT DOCUMENTS

| | | |
|---|---|---|
| JP | 2005-084953 | 3/2005 |
| JP | 2005-115898 | 4/2005 |
| JP | 2005-182222 | 7/2005 |
| JP | 2005-215940 | 8/2005 |
| JP | 2005-267216 | 9/2005 |
| JP | 2007-115221 | 5/2007 |

* cited by examiner

FIG.8

| IDENTIFIER OF VIRTUAL VOLUME IN HOST | RELATED VOLUME IDENTIFIER LIST | PRIMARY VOLUME IDENTIFIER | FAILURE STATUS | PAIR STATUS |
|---|---|---|---|---|
| vsda | rsda, rsdb | rsda | NORMAL STATUS | Duplex |
| vsdb | rsdc, rsdd | rsdc | SECONDARY SYSTEM IN PREPARATION | Duplex-Pending |
| .. | .. | | .. | .. |

| PAIR NUMBER | PRIMARY VOLUME INFORMATION | | SECONDARY VOLUME INFORMATION | | PAIR STATUS | DIFFERENTIAL BITMAP |
|---|---|---|---|---|---|---|
| | APPARATUS IDENTIFIER | VOLUME IDENTIFIER | APPARATUS IDENTIFIER | VOLUME IDENTIFIER | | |
| 1 | SELF-APPARATUS | A | 1 | B | Duplex | 000000··· |
| 2 | SELF-APPARATUS | C | 1 | D | Duplex | 000000··· |
| : | : | : | : | : | : | : |

| VIRTUAL ADDRESS | | | REAL ADDRESS | | |
|---|---|---|---|---|---|
| VOLUME IDENTIFIER | ADDRESS | DATA LENGTH | APPARATUS IDENTIFIER | VOLUME IDENTIFIER | ADDRESS |
| 1 | 0 | 512Byte | 1 | 1 | 1024 |
| 1 | 512 | 512Byte | 1 | 1 | 2048 |
| 1 | 1024 | 512Byte | 1 | 1 | 4096 |
| : | : | | : | : | : |

INFORMATION SYSTEM AND DATA TRANSFER METHOD

CROSS REFERENCES

This application relates to and claims priority from Japanese Patent Application No. 2007-85792, filed on Mar. 28, 2007 and Japanese Patent Application No. 2006-293485, filed on Oct. 30, 2006, the entire disclosure of which is incorporated herein by reference.

BACKGROUND

The present invention relates to a storage system comprising a plurality of storage areas, and a host computer coupled to the storage system.

Generally, an information system is equipped with a storage apparatus that uses an HDD (hard disk drive) as a storage device, and a storage system including this storage apparatus is accessed from a plurality of host systems (hosts, for example) via a storage area network (SAN: Storage Area Network). Generally, with a storage apparatus, a high-reliability method according to RAID (Redundant Array of Independent (or Inexpensive) Disks) technology is adopted to provide reliability to the storage apparatus beyond the reliability of a stand-alone HDD. Nevertheless, pursuant to the advancement of information society in recent years, the availability (service continuity) of information systems depending on reliability based on RAID is becoming inadequate.

Japanese Patent Laid-Open Publication No. H7-244597 (Patent Document 1) describes high-availability technology to deal with the foregoing situation. This technology prepares a production site and a backup site respectively including a host computer (hereinafter abbreviated as a "host") and a storage apparatus, and mirrors data stored in the storage apparatus of the production site to the storage apparatus of the backup site. If the storage apparatus of the production site fails and shuts down, application processing that was suspended as a result of such storage apparatus failure is resumed using the storage apparatus and the host of the backup site. This technology is generally referred to as remote copy or remote mirroring.

SUMMARY

With the technology of Patent Document 1, since the application is resumed with a different host when a storage apparatus fails and shuts down, re-boot processing of the application is required. Needless to say, there will be a problem concerning availability since the application will not be able to perform its normal operation from the time such application is suspended until the re-boot is complete.

Thus, an object of the present invention is to improve the availability of an information system including a storage system that performs remote copy between two or more storage apparatuses, and a host that uses this storage system.

In order to achieve the foregoing object, the present invention provides an information system comprising a computer as a host system, a first storage apparatus coupled to the computer and including a first primary volume and a first secondary volume, and a second storage apparatus coupled to the first storage apparatus and the computer and including a second primary volume and a second secondary volume. The first and second storage apparatuses execute remote copy of copying data written into the first primary volume from the computer to the second primary volume. At least one of the first and second storage apparatuses executes local copy of copying the data written into the first or second primary volume in a self-storage apparatus to the corresponding first or second secondary volume. The computer switches the destination of a write request of the data from the first storage apparatus to the second storage apparatus in case of a failure occurring in the first storage apparatus.

The present invention also provides a data transfer method in an information system comprising a computer as a host system, a first storage apparatus coupled to the computer and including a first primary volume and a first secondary volume, and a second storage apparatus coupled to the first storage apparatus and the computer and including a second primary volume and a second secondary volume. The information system further comprises a third storage apparatus coupled to the first storage apparatus and including a third volume. The data transfer method comprises a first step of the first and second storage apparatuses executing remote copy of copying data written into the first primary volume to the second primary volume, only one of the first and second storage apparatuses copies data stored in the first or second secondary volume to the third volume, and the third storage apparatus creating a snapshot constituted as a replication of the third volume, and a second step switching the destination of a write request of the data from the first storage apparatus to the second storage apparatus in case of a failure occurring in the first storage apparatus.

The present invention further provides an information system comprising a computer as a host system, a first storage apparatus coupled to the computer and including a first primary volume and a first secondary volume, and a second storage apparatus coupled to the first storage apparatus and the computer and including a second primary volume and a second secondary volume. The first and second storage apparatuses execute remote copy of copying data written into the first primary volume from the computer to the second primary volume. At least one of the first and second storage apparatuses saves pre-updated data of the first or second primary volume updated following a creation command of a logical snapshot in the first or second secondary volume. The computer switches the destination of a write request of the data from the first storage apparatus to the second storage apparatus in case of a failure occurring in the first storage apparatus.

The present invention additionally provides a data transfer method in an information system comprising a computer as a host system, a first storage apparatus coupled to the computer, and a second storage apparatus coupled to the first storage apparatus and the computer. The first storage apparatus includes a first primary volume and a first secondary volume. The second storage apparatus includes a second primary volume and a second secondary volume. This data transfer method comprises a first step of the first and second storage apparatuses executing remote copy of copying data written into the first primary volume from the computer to the second primary volume, and at least one of the first and second storage apparatuses saving pre-updated data of the first or second primary volume updated following a creation command of a logical snapshot in the first or second secondary volume, and a second step of the computer switching the destination of a write request of the data from the first storage apparatus to the second storage apparatus in case of a failure occurring in the first storage apparatus.

According to the present invention, it is possible to improve the availability of an information system including a storage system that performs remote copy between two or more storage apparatuses, and a host that uses this storage system.

DESCRIPTION OF DRAWINGS

FIG. 8 is a conceptual diagram showing a device relation table to be managed by an I/O path manager;

FIG. 23 is a conceptual diagram explaining local copy pair information;

FIG. 39 is a conceptual diagram explaining a virtual address/real address mapping table;

DETAILED DESCRIPTION

Embodiments of the present invention are now explained with reference to the attached drawings.

(1) First Embodiment

1. Constitution of Information System

Figure 1:
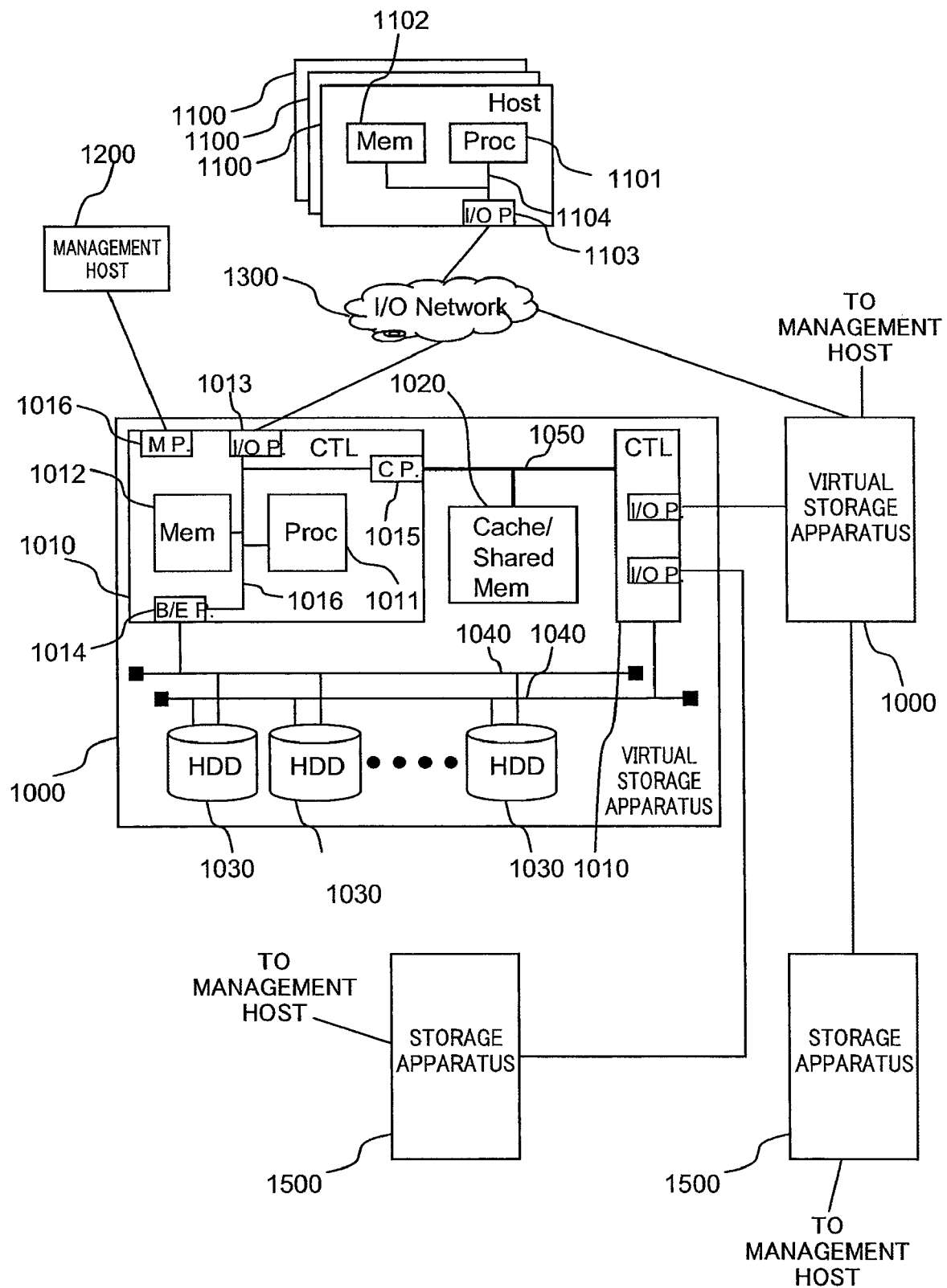
FIG. 1 is a block diagram showing an example of the hardware constitution of an information system according to a first embodiment of the present invention.

FIG. 1 is a diagram showing an example of the hardware constitution(configuration) of an information system according to an embodiment of the present invention.

The information system, for example, comprises a storage apparatus 1500, a host computer (hereafter abbreviated as a "host") 1100, a management host 1200, and two or more virtual storage apparatuses 1000. A plurality of storage apparatuses 1500, host computers (hereafter abbreviated as the "hosts") 1100, and management hosts 1200 may be provided, respectively. The virtual storage apparatus 1000 and the host 1100 are mutually connected via an I/O network 1300. The virtual storage apparatus 1000 and the storage apparatus 1500 and the management host 1200 are mutually connected via a management network (not shown) or the I/O network 1300.

The host 1100 has a host internal network 1104, and coupled to this network 1104 are a processor (abbreviated as Proc in the diagrams) 1101, a memory (abbreviated as Mem in the diagrams) 1102, and an I/O port (abbreviated as I/O P in the diagrams) 1103. The management host 1200 may also have the same hardware constitution as the host 1100. Incidentally, an expansion card for adding an I/O port to the host 1100 is sometimes referred to as an HBA (Host Bus Adapter).

The management host 1200 has a display device, and this display device is able to display a screen for managing the virtual storage apparatus 1000 and the storage apparatus 1500. Further, the management host 1200 is able to receive a management operation request from a user (for instance, an operator of the management host 1200), and send the received management operation request to the virtual storage apparatus 1000 and the storage apparatus 1500. The management operation request is a request for operating the virtual storage apparatus 1000 and the storage apparatus 1500, and, for example, there are a parity group creation request, an internal LU (Logical Unit) creation request, a path definition request, and operations related to a virtualization function.

Connection via a fibre channel is foremost considered as the I/O network 1300, but in addition thereto, a combination of FICON (Fibre CONnection: registered trademark), or Ethernet (registered trademark) and TCP/IP (Transmission Control Protocol/Internet Protocol) and iSCSI (internet SCSI (Small Computer System Interface)), and a combination of network file systems such as Ethernet (registered trademark) and NFS (Network File System) of CIFS (Common Internet File System) may also be considered. Further, the I/O network 1300 may also be other than the above so as long as it is a communication device capable of transferring I/O requests. Further, the network that connects the virtual storage apparatus 1000 and the storage apparatus 1500 is also the same as the I/O network 1300.

The virtual storage apparatus 1000 comprises a controller (indicated as CTL in the diagrams) 1010, a cache memory (indicated as CM in the diagrams) 1020, and a plurality of HDDs 1030. As a preferred embodiment, the controller 1010 and the cache memory 1020 are respectively constituted of a plurality of components. The reason for this is because even if a failure occurs in a single component and such component is blocked, the remaining components can be used to continue receiving I/O requests as represented by read and write requests.

The controller 1010 is an apparatus (a circuit board, for example) for controlling the operation of the virtual storage apparatus 1000. The controller 1010 has an internal network 1017, and coupled to this internal network 1017 are an I/O port 1013, a cache port (abbreviated as CP in the diagrams) 1015, a management port (abbreviated as MP in the diagrams) 1016, a back-end port (abbreviated as B/E P in the diagrams) 1014, a processor (a CPU (Central Processing Unit), for instance) 1011, and a memory 1012. The controllers 1010 and the cache memories 1020 are mutually connected each other via a storage internal network 1050. Further, the controller 1010 and the respective HDDs 1030 are mutually connected via a plurality of back-end networks 1040.

The hardware constitution of the storage apparatus 1500 is constituted of similar components as those of the virtual storage apparatus 1000. Incidentally, when the virtual storage apparatus 1000 is a dedicated device or switch for virtualization without an HDD, the storage apparatus 1500 does not need to be constituted of similar components as those of the virtual storage apparatus 1000. Further, the internal network of the host 1100 and the virtual storage apparatus 1000 is preferably of a broader bandwidth than the transfer bandwidth of the I/O port 1013, and all or a part thereof may be substituted with a bus or switch-type network. Further, in FIG. 1, although only one I/O port 1013 is provided to the controller 1010, in reality, a plurality of I/O ports 1013 may exist in the controller 1010.

According to the foregoing hardware constitution, the host 1100 will be able to read or write all or a part of the data stored in the HDD of the virtual storage apparatus 1000 and the storage apparatus 1500. Incidentally, in the ensuing explanation, the system handling the storage of data is referred to as a storage cluster. Further, a subsystem that realizes high availability by including two subsystems inside the storage cluster and which includes the virtual storage apparatus 1000 and/or the storage apparatus 1500 is referred to as a storage subsystem.

2. Overview of Present Embodiment

Figure 2:
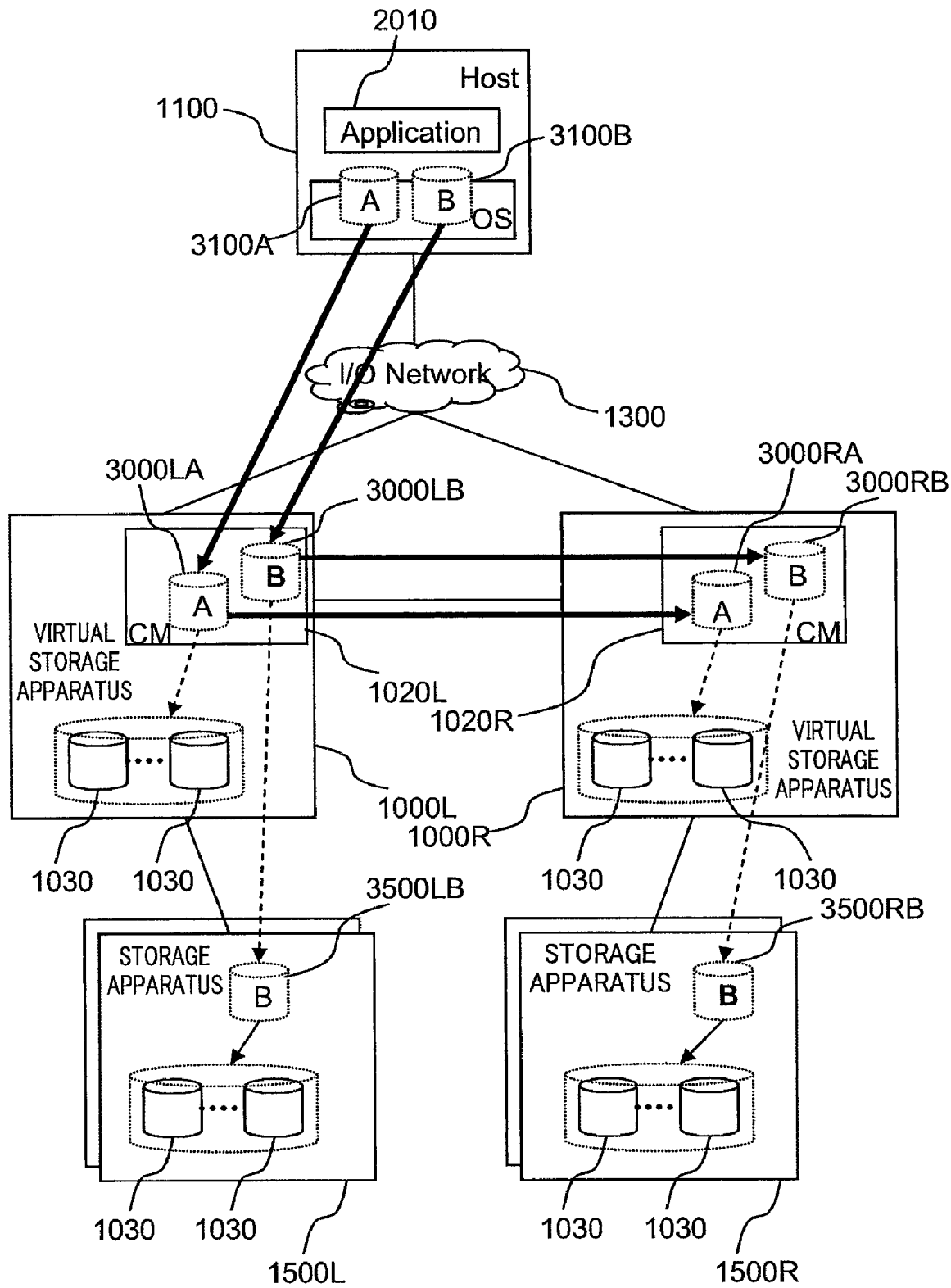
FIG. 2 is a first conceptual diagram showing the overview of a first embodiment of the present invention.

In this embodiment, in order to improve the availability of a storage system including the virtual storage apparatus 1000 having a virtualization function for virtualizing a storage area such as a volume in another storage apparatus, a redundant constitution using another virtual storage apparatus 1000 is adopted. FIG. 2 is a diagram showing an overview of such a duplex constitution.

In this overview, the storage system includes a virtual storage apparatus 1000L, a virtual storage apparatus 1000R, a storage apparatus 1500L, and a storage apparatus 1500R. Incidentally, in order to simplify the following explanation, let it be assumed that the virtual storage apparatus 1000L and the storage apparatus 1500L serve as a primary system (production system), and the virtual storage apparatus 1000R and the storage apparatus 1500R serve as a secondary system (backup system). Nevertheless, when the number of volumes to be respectively provided by the virtual storage apparatuses 1000L, 1000R to the host 1100 is two or more volumes, in substitute for handling the primary system/secondary system in virtual storage apparatus units, only the virtual storage apparatuses 1000L, 1000R to serve as the primary system in volume units need to be defined.

The respective virtual storage apparatuses 1000L, 1000R provide partial or all areas of a parity group (configured based on RAID technology) with its own HDD 1030 as the constituent element as a volume 3000LA and a volume 3000RA to the host 1100 (corresponds to the portion in which 'A' is indicated in a cylinder in FIG. 2). Further, the virtual storage apparatus 1000 is also able to optionally provide, based on the virtualization function, virtual volumes 3000LB, 3000RB (volumes in which the nonvolatile storage areas of the corresponding HDD or the like exist outside the virtual storage apparatuses 1000L, 1000R). In this overview, a part or all of the volumes 3500LB, 3500RB provided by the storage apparatuses 1500L, 1500R are used as the corresponding nonvolatile storage areas. Incidentally, reference to "data of a volume" in the following explanation includes, in addition to the data stored in the HDD 1030, data that is temporarily stored in the cache memory 1020. Further, "data of a virtual volume" described later includes, in addition to the data stored in the volumes 3500LB, 3500RB of the storage apparatuses 1500L, 1500R, data that is temporarily stored in the cache memory 1020 of the virtual storage apparatuses 1000L, 1000R.

Meanwhile, an application program (hereinafter sometimes abbreviated as an "application") 2010, an OS, and system programs as represented by daemon and management programs for assisting in the setting and processing of the OS are executed in the host 1100. The OS provides to the application 2010 an interface for I/O requests to data existing in the volumes 3000LA, 3000LB, 3000RA, 3000RB provided by the virtual storage apparatuses 1000L, 1000R, and sends I/O requests to the appropriate virtual storage apparatuses 1000L, 1000R and volumes 3000LA, 3000LB, 3000RA, 3000RB according to the request from the application 2010. In a normal status, the host 1100 issues an I/O request as represented by a read or write request to the volumes 3000LA, 3000LB of the virtual storage apparatus 1000L, and thereby sends and receives data. In other words, upon receiving a read request, the virtual storage apparatus 1000L reads data from the HDD 1030 and returns such data to the host 110 when the requested volumes 3000LA, 3000LB, 3500LB correspond to the HDD 1030 inside the virtual storage apparatus 1000L, or acquires the necessary data and returns such data (all or a part) to the host 1100 by issuing a read request to the storage apparatus 1500L.

In the case of a write request, in order to make the data redundant, the virtual storage apparatus 1000L that received the write data sends the write data to the virtual storage apparatus 1000R as the secondary system, and returns the write complete message to the host 1100 after the virtual storage apparatus 1000L receives a write data reception complete message from the virtual storage apparatus 1000R. Incidentally, write data to the virtual storage apparatus 1000L and write data received by the virtual storage apparatus 1000R via the virtual storage apparatus 1000L may also be temporarily retained in the cache memories 1020L, 1020R of the respective virtual storage apparatuses 1000L, 1000R. Incidentally, as one example of this embodiment, the transfer of this write data is conducted via storage remote copy.

Figure 3:
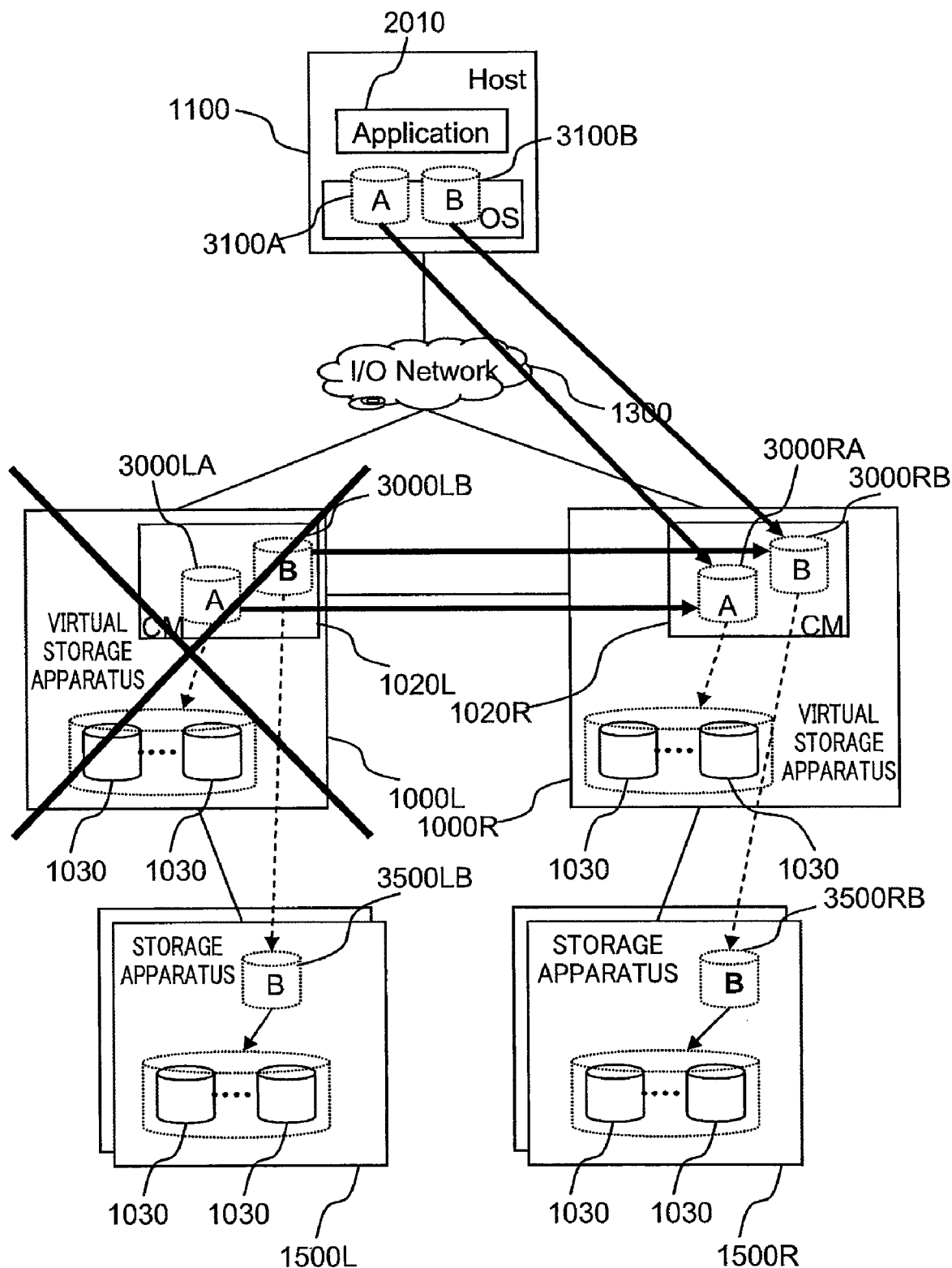
FIG. 3 is a second conceptual diagram showing the overview of the first embodiment.

FIG. 3 shows the processing overview of the information system after a failure occurred in the virtual storage apparatus 1000L under a normal status.

When the primary virtual storage apparatus 1000L fails and shuts down, the system program in the host 1100 detects this failure, and switches the destination of the I/O request from the primary virtual storage apparatus 1000L to the secondary virtual storage apparatus 1000R. Nevertheless, in this case also, the application 2010 is able to continue I/O without being aware that the destination of the I/O request has been switched. Thus, normally, as a volume identifier designated at the time of an I/O request from the application 2010 or the file system, the system program provides a virtual volume identifier (or a device file) at an OS layer (more specifically, a layer that is lower than the file system), and the lower layer of OS manages the correspondence of that identifier and the identifier (or device file) actually allocated to the volume. When switching the destination of the I/O request, the correspondence thereof is switched from the volume 3000LA and the volume 3000LB of the virtual storage apparatus 1000L to the volume 3000RA and the volume 3000RB of the virtual storage apparatus 1000R, so as to realize switching that will be transparent to the application 2010.

Further, the virtual storage apparatus 1000R is also able to process the write request, according to the arrival of such write request to the volumes 3000RA, 3000RB from the host 1100, or other express fail over requests. As an example of this change processing, in line with the data copy from the virtual storage apparatus 1000L to the virtual storage apparatus 1000R, when the setting is configured to deny the write request from the host 1100 to the volumes 3000RA, 3000RB of the virtual storage apparatus 1000R, such setting is cancelled. Further, when write data is being transferred using remote copy, the copy status of remote copy may also be changed.

Figure 4:
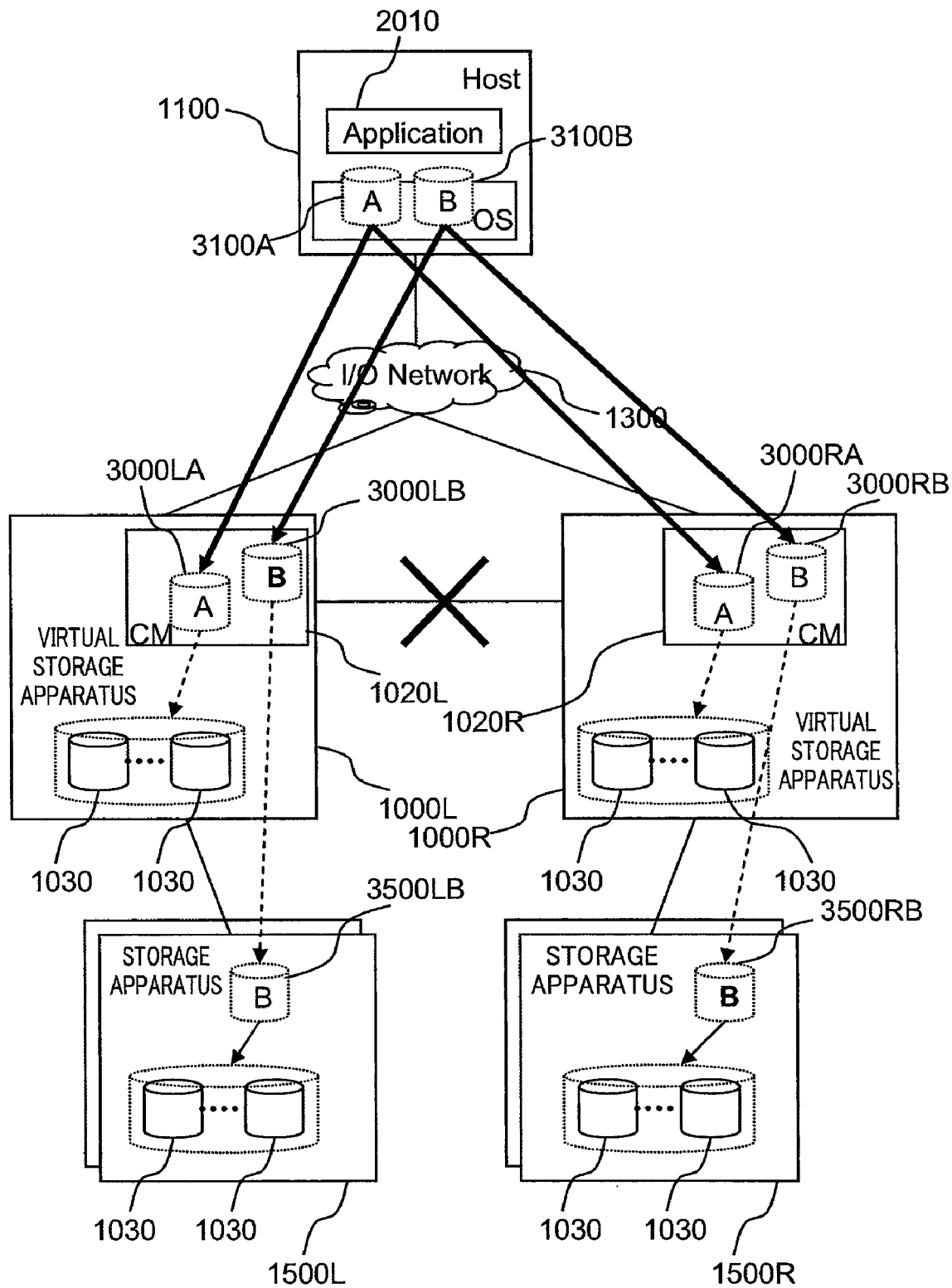
FIG. 4 is a third conceptual diagram showing the overview of the first embodiment.

FIG. 4 shows the processing overview of the information system after the occurrence of a failure in the network between the virtual storage apparatuses 1000L, 1000R.

The virtual storage apparatus 1000L that detected the network failure notifies this failure to the host 1100. The host 1100 that received the failure notice requests the secondary virtual storage apparatus 1000R to process the write request and issues subsequent write requests to both the primary virtual storage apparatus 1000L and the secondary virtual storage apparatus 1000R so as to make the data of the primary system and the data of the secondary system uniform.

3. Programs and Information to be Executed by Host 1100

Figure 5:
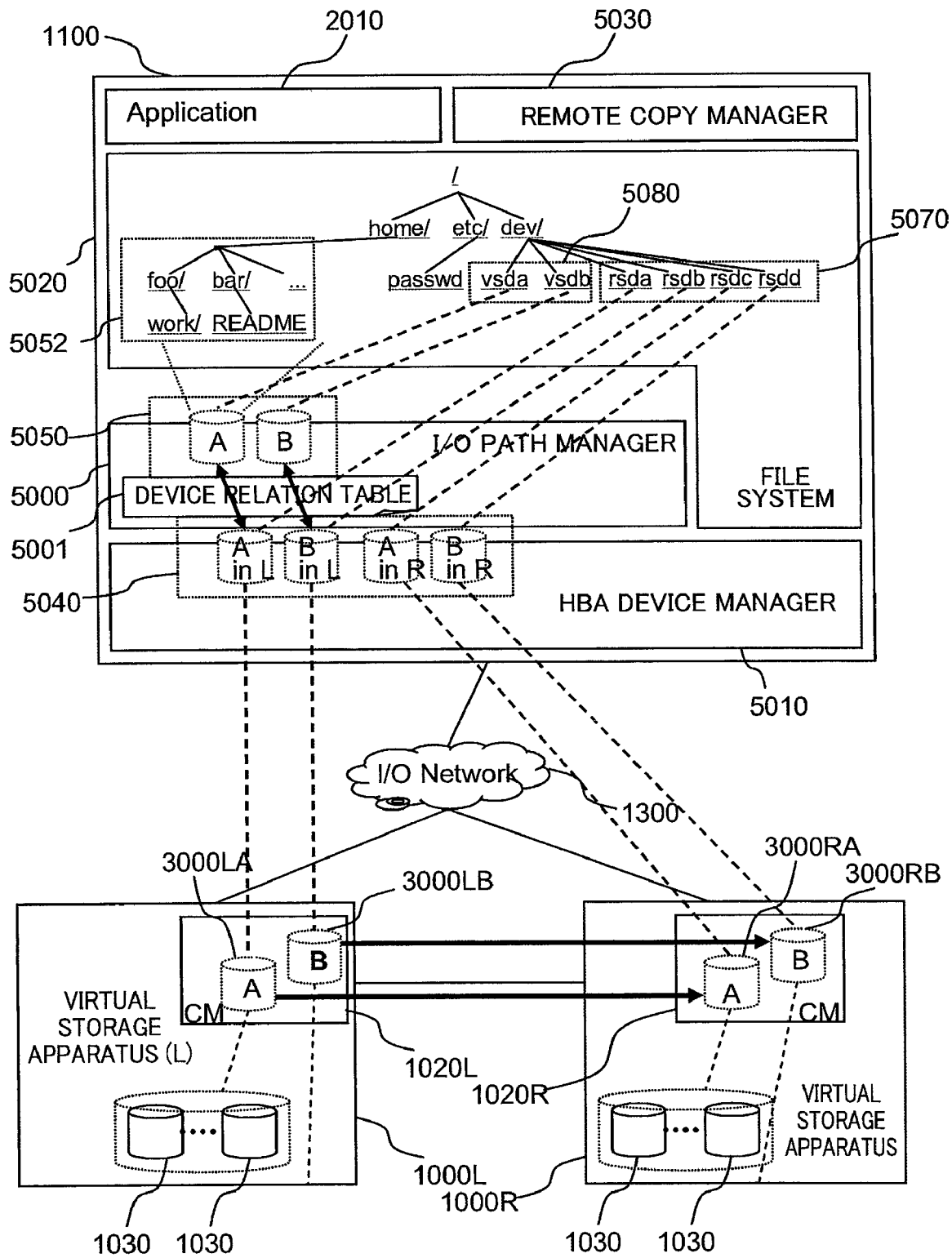
FIG. 5 is a conceptual diagram representing the software constitution in a host.

FIG. 5 is a diagram illustrating the concept to be provided by the respective software programs in addition to the software programs to be executed in the host 1100 and information to be used by such software programs. Incidentally, although the software programs are retained in the memory 1102 (FIG. 1) and executed by the processor 1101 (FIG. 1), such software programs may be partially realized as hardware and executed.

In the host 1100, in addition to the application 2010 and the remote copy manager 5030, a file system 5020, an I/O path manager 5000 and an HBA device driver 5010 are executed as program modules inside the OS or Kernel (it is not necessary to execute all processing, for the file system 5020, the I/O path manager 5000 or the HBA device driver 5010, inside the Kernel.).

The HBA device driver 5010 is a program for sending and receiving I/O requests and incidental data through the I/O port 1103 (FIG. 1) mounted on the HBA, and controlling communication with the other virtual storage apparatuses 1000L, 1000R and the storage apparatuses 1500L, 1500R. The HBA device driver 5010 is also able to provide an identifier corresponding to the volumes 3000LA, 3000LB, 3000RA, 3000RB provided by the virtual storage apparatuses 1000L, 1000R to the upper layer, and receive an I/O request accompanied with such identifier. The volume 5040 illustrates this concept, and corresponds to the respective volumes 3000LA, 3000LB, 3000RA, 3000RB provided by the virtual storage apparatuses 1000L, 1000R.

The I/O path manager 5000 is a module for switching the I/O request destination of the application 2010. This module provides to the file system 5020 an I/O request interface and the identifier, which is the same type of identifier corresponding to the volume 5040 provided by the HBA device driver 5010 and corresponds to a virtual volume in the host 1100. The identifier corresponding to the virtual volume in the host 1100 corresponds to the identifier corresponding to the volume 5040 provided by the HBA device driver 5010 in the module, and the device relation table 5001 retains the correspondence thereof. The volume 5050 illustrates the concept of this virtual volume in the host 1100, and, in FIG. 5, an example of the correspondence thereof corresponds to the identifier corresponding to the volumes 3000LA, 3000LB of the virtual storage apparatus 1000L (to put it differently, it could be said that the entities of the virtual volume 5050 in the host 1100 are the volumes 3000LA, 3000LB of the virtual storage apparatus 1000L).

An I/O request up to this layer is usually designated in a fixed-length block access format. Nevertheless, the I/O request is not limited thereto when the host 1100 is a mainframe, and it may also be designated in a CKD (Count Key Data) format.

The file system 5020 is a module for sending an I/O request and sending and receiving data from/to the virtual storage apparatuses 1000L, 1000R, which is done through the identifier and the I/O interface corresponding to the volume 5040 provided by the HBA device driver 5010, and the identifier and the interface corresponding to the virtual volume 5050 in the host 1100 provided by the I/O path manager 5000. FIG. 5 illustrates as an example of the structure of a directory tree inside the file system 5020 in a state where a part of such tree structure 5052 is stored in the volume 5050 provided through virtualization in the host 1100 by the I/O path manager 5000 (as explained above, more precisely, provision of the virtual volume 5050 in the host 1100 of the I/O path manager 5000 is made through the identifier, and the data indicated as being stored in the volume 5050 is actually stored in the volumes 3000LA, 3000LB, 3000RA, 3000PB provided by the virtual storage apparatuses 1000L, 1000R shown in the device relation table 5001). The file system 5020 provides an interface of a file I/O to the application 2010. The file system 5020 called from the application 2010 through the file I/O interface converts the read or write request accompanied with a file name and data offset in the file into a read or write request of a block format while referring to structural information in the file system 5020 such as a directory file or an inode, and delivers the read or write request to the I/O path manager 5000 or the HBA device driver 5010.

Incidentally, with a Unix system or Windows (registered trademark) system OS, the file I/O interface is used to provide a function referred to as a device file system as the interface for directly operating the data of volumes. Normally, the device file system is deployed under the control of the '/dev' directory of the file space, and the file name of the file of the foregoing directory and below (rsda and so on in the illustrated example) corresponds to the volumes 5040, 5050 provided by the lower layer (HBA device driver 5010 and I/O path manager 5000) of the file system 5020. Then, data stored in the volumes 5040, 5050 can be read and written with the file I/O interface as though such data is stored in the device files 5070, 5080. Incidentally, in the example shown in FIG. 5, the device file 5070 (rsda, rsdb, rsdc, rsdd) corresponds to the volume 5040 recognized and provided by the HBA device driver 5010, and the device file 5080 (vsda, vsdb) corresponds to the volume 5050 provided by the I/O path manager 5000. These device files 5070, 5080 may be used for the purpose of realizing independent data organization or buffer management when the application 2010 is a database.

The remote copy manager 5030 is a program for acquiring the status of remote copy for realizing the data transfer between the virtual storage apparatuses 1000L, 1000R, and for the host 1100 and the I/O path manager 5000 to perform the operation of remote copy, and communicates with the virtual storage apparatuses 1000L, 1000R according to the request of a program, a user or the I/O path manager 5000 using this program.

Incidentally, as explained above, it would be desirable if the functions of the HBA device driver 5010 and the I/O path manager 5000 could be partially or wholly installed and uninstalled as modules inside the Kernel. This is because, since the HBA device driver 5020 is a program for controlling the HBA, it is often provided by the manufacturer of the HBA. Similarly, since the processing of the I/O path manager 5000 is decided subject to the processing of the virtual storage apparatuses 1000L, 1000R, it is possible that some or all of the modules will be provided by the manufacturer of the virtual storage apparatuses 1000L, 1000R. Therefore, as a result of being able to install/uninstall this program, it will be possible to constitute an information system based on a broad range of combinations of HBA and virtual storage apparatuses 1000L, 1000R. Further, with the present invention, since the primary system and the secondary system are switched in a manner that is transparent to the application 2010, transparent switching that does not require the recompilation or the like of the application 2010 can be realized by executing processing inside the Kernel. Moreover, since the I/O path manager 5000 exists in the intermediate layer of the file system 5020 and the HBA device driver 5010, recompilation of the file system 5020 is no longer required, and transparency of the file system is also secured. In addition, the I/O path manager 5000 is able to use the functions of the HBA device driver 5010.

Further, the following two methods can be considered when the I/O path manager 5000 inside the Kernel calls the remote copy manager 5030 or performing the opposite communication method thereof.

(A) The I/O path manager 5000 creates a virtual volume for communication, and the file system 5020 creates this communication volume as a device file in the file space. The remote copy manager 5030 stands by in a state of periodically executing a read system call to the device file. The I/O path manager 5000 receives an I/O request from the remote copy manager 5030, but pends it internally. Then, when it becomes necessary for this module to send a message to the remote copy manager 5030, the I/O path manager 5000 returns the data containing the message defined as a return value of the I/O request to the remote copy manager 5030 through the file system 5020. Incidentally, the read system call issued by the remote copy manager thereupon will be forced to wait inside the Kernel for a long period of time. If this is not preferable, the I/O path manager 5000 should return data indicating that there is no message to the remote copy manager 5030 through the file system 5020 after the lapse of a prescribed period of time, and the remote copy manager 5030 that received this message should execute the read system call once again.

(B) Unix (registered trademark) domain socket is used and this is treated as a virtual network communication. Specifically, the remote copy manager 5030 operates one end of the socket, and the I/O path manager 5000 operates the remaining end.

Incidentally, in the following explanation, when the I/O path manager 5000 is to operate remote copy or refer to the status, let it be assumed that such operation is conducted by calling the remote copy manager 5030 through the foregoing communication.

4. Programs and Information to be Executed by Virtual Storage Apparatus 1000

Figure 6:
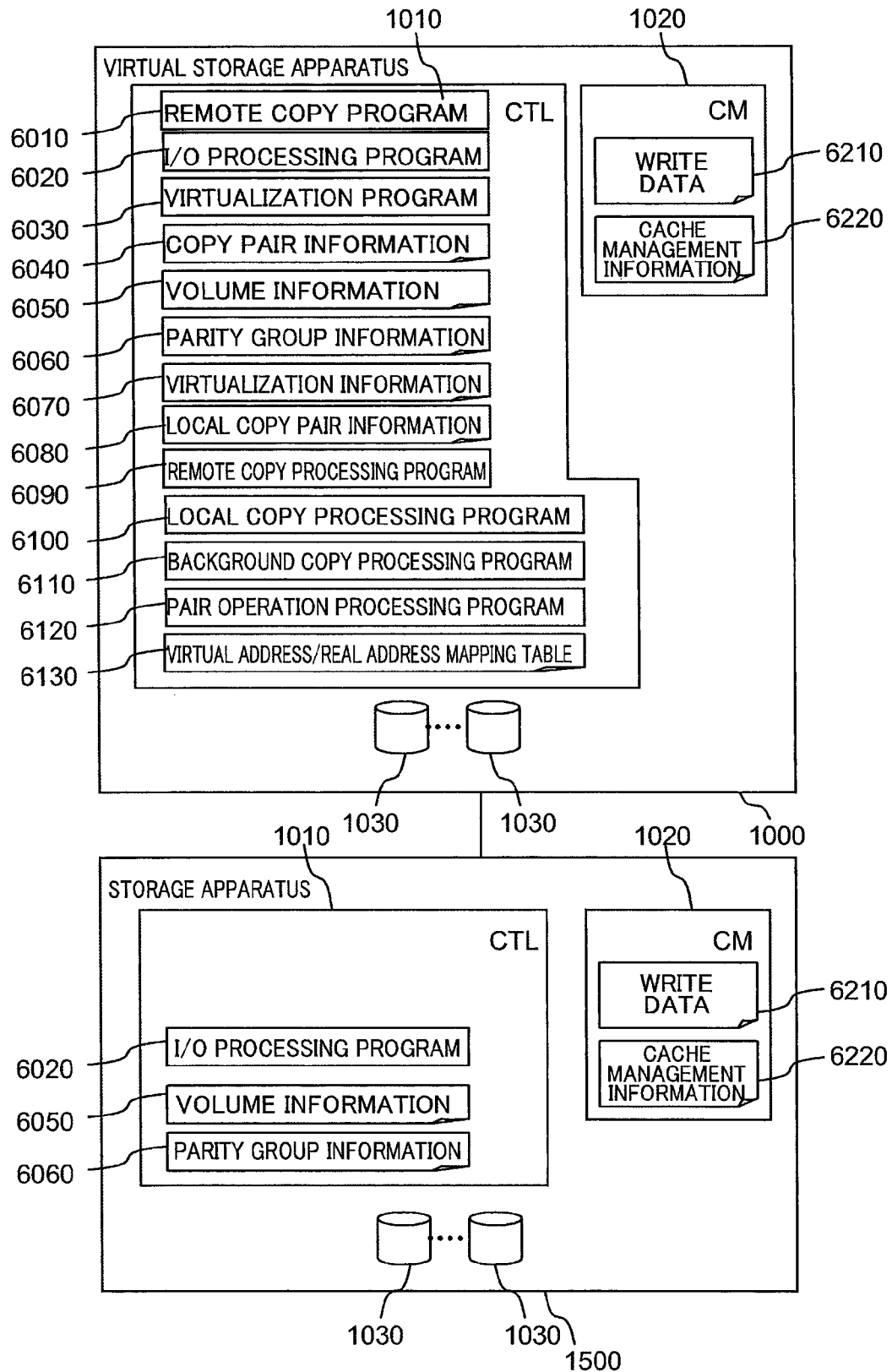
FIG. 6 is a block diagram representing the software constitution in a virtual storage apparatus and a storage apparatus.

FIG. 6 is a diagram showing the programs to be executed by the virtual storage apparatuses 1000 (1000L, 1000R) and the storage apparatuses 1500 (1500L, 1500R), and information to be managed by these programs. Incidentally, although the programs are retained in the memory 1102 (FIG. 1) and the cache memory 1020 and executed by the processor 1101 (FIG. 1), such programs may be partially constituted as hardware and executed.

<4.1. I/O Processing Program 6020, Parity Group Information 6060 and Volume Information 6050>

The parity group information 6060 contains information relating to the following configuration of each parity group.

(1) Identifier of HDD 1030 configuring the parity group. Since a plurality of HDDs 1030 are participating in the parity group, this information exists in a plurality for each parity group.

(2) RAID level

Further, the volume information 6050 contains information relating to the following configuration of each volume.

(1) Volume capacity (2) Identifier of the parity group and areas (start address and/or end address) in the parity group storing data corresponding to the volume.

The I/O processing program 6020 executes the following processing relating to the I/O request received from the host 1100 by referring to the volume information 6050 and the parity group information 6060.

(A) Staging: Copying data stored in the HDD 1030 to the cache memory 1020.

(B) Destaging: Copying data stored in the cache memory 1020 to the HDD 1030. Incidentally, as the pre-processing thereof, redundant data based on RAID technology may also be created.

(C) Read processing: Determining whether data corresponding to the request exists in the cache memory 1020 in response to the read request received from the host 1100. In case of the data corresponding to the request not existing in the cache memory 1020, staging processing is executed to copy the data to the cache memory 1020, and such data is sent to the host 1100. Incidentally, in case of such data existing in the cache memory 1020, this data is sent to the host 1100.

(D) Write processing: Storing the write data received from the host 1100 in the cache memory 1020. Incidentally, in case of the free area in the cache memory 1020 not being enough during the processing, destaging processing is executed to copy appropriate data to the HDD 1030, and the area in the cache memory 1020 is thereafter reused. Further, in case of the address, of which data is previously stored in the cache memory 1020, is included in the target area of the write request, the data of the area may sometimes be directly overwritten in the cache memory 1020.

(E) Cache algorithm: Deciding the data in the HDD 1030 to be staged and the data in the cache memory 1020 to be destaged according to an LRU algorithm or the like based on the reference frequency or reference period of data in the cache memory 1020.

<4.2. Virtualization Program 6030 and Virtualization Information 6070>

The virtualization information 6070 contains information relating to the following configuration of each virtualization volume.

(1) Following information concerning areas in the volume of the storage apparatus 1500, and address space in the virtual volume as which the foregoing areas is provided to the host 1100. In case of the virtual volume constituting a plurality of volumes, the following information will also exist in a plurality.

(1-1) Identifier of the storage apparatus 1500 (or identifier of the port), identifier of the volume, and areas (start address and end address) in the volume, constituted of the virtual volume (1-2) Areas (start address and end address) in the virtual volume (2) Capacity of the virtual volume The virtualization program 6030 is a program for the virtual storage apparatus 1000 to provide a volume to the host 1100 by using the volume provided by the storage apparatus 1500. Incidentally, there are the following patterns as the correspondence of the virtual volume provided by the virtualization program 6030 and the relating volume in the storage apparatus 1500.

(A) A case of using the overall volume in the storage apparatus 1500 as the storage area of the virtual volume. In this case, capacity of the virtual volume will be roughly the same capacity as the selected volume ('roughly same' is a case of storing the control information and redundant information in a volume of the storage apparatus 1500. When there is no such information, this will be the same capacity).

(B) A case of using a part of the volume in the storage apparatus 1500 as the storage area corresponding to the virtualization volume. Here, capacity of the virtual volume will be roughly the same as the area capacity to be used.

(C) A case of combining and using a plurality of volumes in a plurality of storage apparatuses 1500 as the storage area of the virtual volume. Here, capacity of the virtual volume will be roughly the same capacity as the total value of the capacity of the respective volumes. Incidentally, as this kind of combination method, there are striping, concatenate (method of linking a plurality of volumes and treating them as a single volume) and so on.

(D) In addition to pattern (C), further storing parity information or mirror data. Here, capacity of the virtual volume will be half of (C) when storing mirror data, or depend on the parity calculation method when storing parity. Reliability of data stored in the virtual volume can be improved through combination with high-reliability based on RAID inside the storage apparatus 1500.

Incidentally, regarding every pattern, the storage apparatus identifier (or port identifier) and the volume identifier (information for identifying volumes in the virtual storage apparatus or controlled by ports used in the I/O request, such as LUN (Logical Unit Number), CKD-format CU number, LDEV (Logical DEVice) number, and the like), designated in the I/O request, differ from the original volume.

The virtualization program 6030 is called by the I/O processing program 6020 when the data to be subject to staging or destaging corresponds to the virtual volume, and uses the virtualization information 6070 to execute the following processing.

(A) Staging: Deciding which data stored in the volume of which storage apparatus 1500 should be copied to the cache memory 1020 based on the correspondence of the virtualization volume and the volume of the storage apparatus 1500, and thereafter copying such data to the cache memory 1020.

(B) Destaging: Deciding which volume of the storage apparatus 1500 should be target to copy data in the cache memory 1020 to, based on the correspondence of the virtual volume and the volume of the storage apparatus 1500, and thereafter copying such data to the storage apparatus 1500. Incidentally, as the pre-processing thereof, redundant data based on RAID technology may also be created.

<4.3. Remote Copy Program 6010 and Copy Pair Information 6040>

The copy pair information 6040 possesses the following information for each copy pair (hereinafter sometimes abbreviated as a "pair") of the copy source volume and the copy destination volume of remote copy. Incidentally, in this embodiment, volumes that are the target of high availability are designated as the copy source volume and the copy destination volume.

(1) Identifier of the virtual storage apparatus 1000 having the copy source volume, and identifier of the volume (2) Identifier of the virtual storage apparatus 1000 having the copy destination volume, and identifier of the volume (3) Status of the copy pair (details will be described later)

The remote copy program 6010 is a program for mirroring the data stored in the copy source volume to the copy destination volume, and refers to the copy pair information 6040 to perform the processing. The processing overview and pair status of remote copy (in particular synchronous remote copy) are explained below.

<4.3.1. Copy Processing Operation of Synchronous Remote Copy>

As the method of the synchronous remote copy described above, when the virtual storage apparatus 1000 of the copy source receives a write request for writing into the copy source volume from the host 1100, the virtual storage apparatus 1000 of the copy source sends write data to the virtual storage apparatus 1000 of the copy destination and thereafter returning a write request completion notice to the host 1100.

Figure 7:
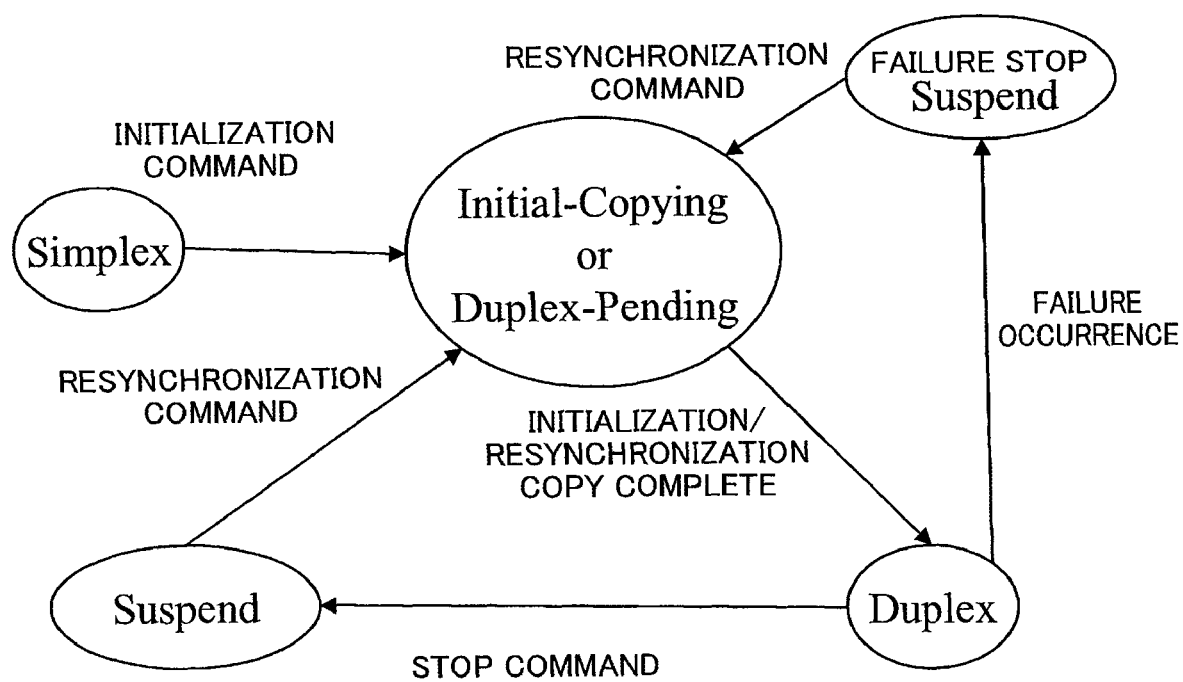
FIG. 7 is a conceptual diagram representing the pair status of remote copy and the transition of pair status.

When synchronous remote copy is to be executed, the controller 1010 of the virtual storage apparatus 1000 manages information referred to as a copy pair status (Simplex, Initial-Copying, Duplex, Suspend and Duplex-Pending), in order to display the status of remote copy between the pair of copy source volume and copy destination volume on a management screen 1200 or operate the status of remote copy. FIG. 7 shows a status transition diagram relating to the pair status of synchronous remote copy. The respective pair statuses are explained below.

<4.3.1.1. Simplex Status>

The Simplex status is a status where copy between the copy source volume and the copy destination volume configuring a pair has not been started.

<4.3.1.2. Duplex Status>

The Duplex status is a status where synchronous remote copy has been started, the initialization copy described later is complete and the data contents of the copy source volume and the copy destination volume configuring a pair are the same. In this status, excluding the areas that are currently being written, data contents of the copy source volume and data contents of the copy destination volume will be the same. Incidentally, during the Duplex status and in the Duplex-Pending and Initial-Copying statuses, write requests from the host 1100 to the copy destination volume are denied.

<4.3.1.3. Initial-Copying Status>

The Initial-Copying status is an intermediate status during the transition from the Simplex status to the Duplex status, and initialization copy from the copy source volume to the copy destination volume (copy of data already stored in the copy source volume to the copy destination volume) is performed as required during this period. When initialization copy is complete and processing necessary for making the transition to the Duplex status is complete, the pair status becomes a Duplex status.

<4.3.1.4. Suspend Status>

The Suspend status is a status where the contents written into the copy source volume are not reflected in the copy destination volume. In this status, data contents of the copy source volume and the copy destination volume configuring a pair are not the same. Triggered by a command from the user or the host 1100, the pair status makes a transition from another status to the Suspend status. In addition, a case may be considered where, when it is no longer possible to perform synchronous remote copy due to a network failure or the like between the virtual storage apparatuses 1000, the pair status makes an automatic transition to the Suspend status.

In the following explanation, the latter case; that is, the Suspend status caused by a failure will be referred to as a Failure Suspend status. Representative examples that cause such Failure Suspend status are, in addition to a network failure, failures in the copy source volume and the copy destination volume, and failure of the controller 1010.

When entering the Suspend status, although the copy source storage 1000 receives write data according to a write request and stores it in the copy source volume when such write request is issued to the copy source volume subsequent to entering the Suspend status, the copy source storage 1000 does not send the write data to the virtual storage apparatus 1000 of the copy destination. Further, the virtual storage apparatus 1000 of the copy source stores the writing location of the written write data in the copy source volume as a differential bitmap or the like.

Incidentally, when a write request is issued to the copy source volume subsequent to entering the Suspend status, the virtual storage apparatus 1000 of the copy destination also performs the foregoing operation. Further, when a setting referred to as "fence" is configured in a pair before such pair enters the Failure Suspend status, writing of the copy source volume is denied after the pair status makes a transition to the Failure Suspend status. Incidentally, the virtual storage apparatus 1000 of the copy destination may also deny the write request to the copy destination volume during the Failure Suspend status.

<4.3.1.5. Duplex-Pending Status>

The Duplex-Pending status is the intermediate status during the transition from the Suspend status to the Duplex status. In this status, data copy from the copy source volume to the copy destination volume is executed in order to make the data contents of the copy source volume and the copy destination volume coincide. After the data contents of the copy source volume and the copy destination volume become identical, the pair status becomes a Duplex status.

Incidentally, data copy during the Duplex-Pending status is executed, via differential copy of copying only the portions that need to be updated (in other words, the inconsistent data between the copy source volume and the copy destination volume) by using the writing location (for instance, the foregoing differential bitmap or the like) recorded in the virtual storage apparatus 1000 of the copy source or the virtual storage apparatus 1000 of the copy destination during the Suspend status.

Further, although the Initial-Copying status and the Duplex-Pending status were explained above as being separate statuses, these may also be combined and displayed as one status on the screen of the management host 1200, or subject to transition as one status.

<4.3.1.6. Pair Operation Command>

The pair status makes a transition to another status based on the following commands from the host 1100 or the management host 1200.

(A) Initialization command: When this command is received during the Simplex status, transition is made to the Initial-Copying status.

(B) Resynchronization command: When this command is received during the Suspend status or the Failure Suspend status, transition is made to the Duplex-Pending status.

(C) Partition command: When this command is received during the Duplex status, transition is made to the Suspend status.

(D) Copy direction inversion command: When this command is received during the Duplex status, Suspend status or Failure Suspend status, relationship of the copy source and the copy destination is inverted. In the case of a Duplex status, the copy direction is also inverted when this command is received.

Incidentally, the initialization command is expected to designate the virtual storage apparatus 1000 of the copy source and the copy source volume, and the virtual storage apparatus 1000 of the copy destination and the copy destination volume, and the remaining commands merely need to designate identifiers showing the pair relationship since such pair relationship has already been formed (combination of the virtual storage apparatus 1000 of the copy source and the copy source volume, and the virtual storage apparatus 1000 of the copy destination and the copy destination volume is also one of such identifiers).

5. Programs and Information to be Executed by Storage Apparatus 1500

FIG. 6 illustrates the programs and information to be executed by the storage apparatus 1500, and the respective programs and information perform the same operation as the virtual storage apparatus 1000.

6. Device Relation Table 5001

FIG. 8 is a diagram showing the information contained in the device relation table 5001. The device relation table 5001 manages the following information for each virtual volume (more specifically, for each identifier corresponding to such volume) in the host 1100 provided by the I/O path manager 5000.

(A) Identifiers of the virtual volumes in the host 1100

(B) Related volume identifier list: Identifiers of volumes of the storage apparatus 1500 that may become the entity of virtual volumes in the host 1100 are included. Incidentally, as said individual identifiers, the identifiers allocated by the HBA device drivers 5010 as the lower layer of the I/O path manager 5000 are used. In this embodiment, identifiers of volumes in the primary virtual storage apparatus 1000 (1000L) and volumes in the secondary virtual storage apparatus 1000 (1000R) are listed (if a normal status).

(C) Primary volume: Shows which volume listed at (B) is a primary.

(D) Failure status (E) Pair status

Incidentally, since the identifiers of (A) and the identifiers of (B) are handled the same from the perspective of the file system 5020, overlap of the identifiers of (A) and (B) is not allowed. Further, since overlap is also not allowed in the case of combining (A) and (B), the I/O path manager 5000 needs to create the identifiers of (A) while giving consideration to this point.

7. Initialization Processing

Figure 9:
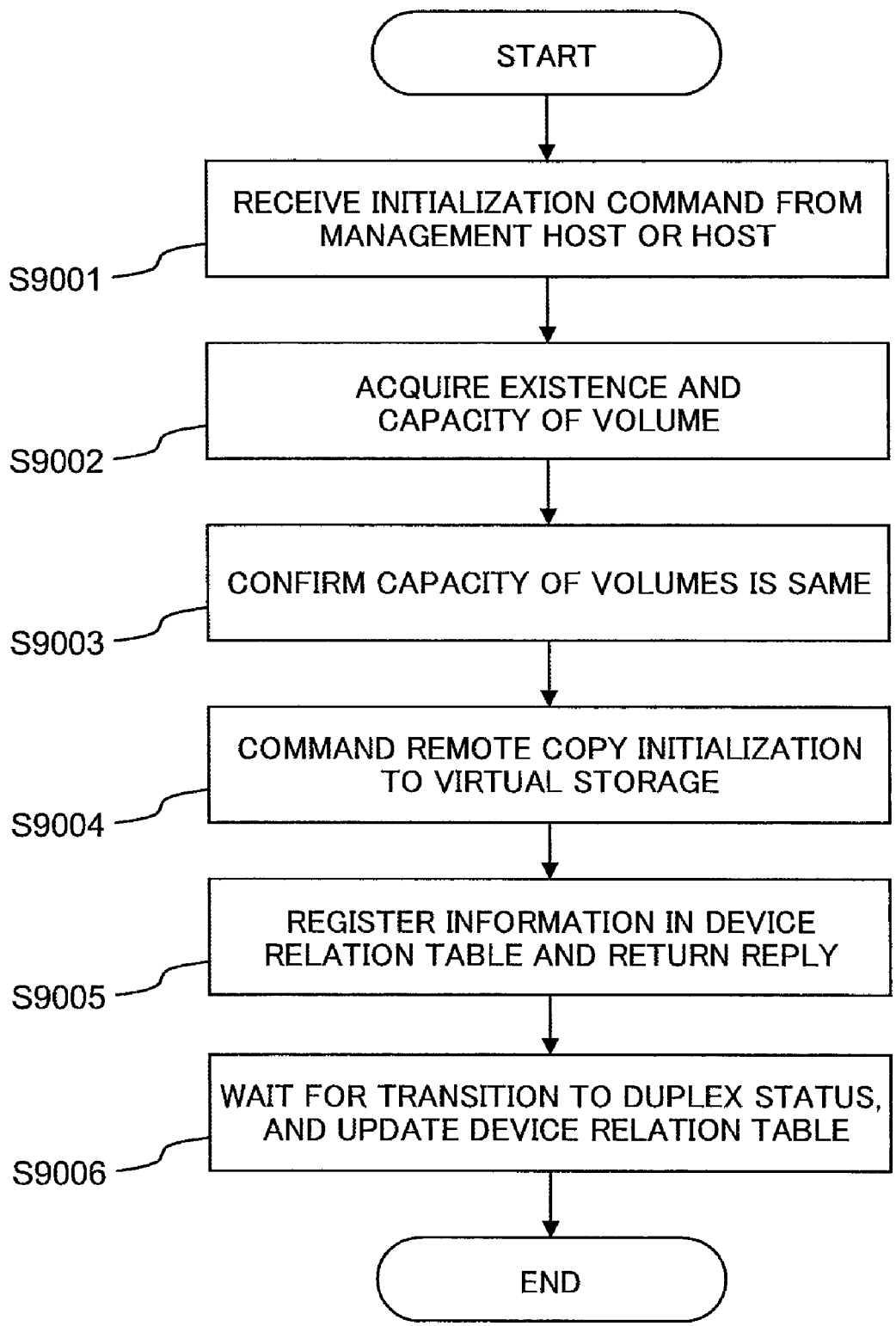
FIG. 9 is a flowchart showing the flow when the I/O path manager performs initialization processing.

FIG. 9 is a flowchart illustrating the initialization processing of the I/O path manager 5000. This initialization processing is now explained with reference to the flowchart. Incidentally, although there are cases below where the processing subject of various processes is explained as the "I/O path manager 5000," in reality, it goes without saying that the processor 1101 (FIG. 1) of the host 1100 executes the corresponding processing based on a program called the "I/O path manager 5000."

(S9001) The I/O path manager 5000 receives an initialization command containing the following information from the user of the management host 1200 or the host 1100. Incidentally, as the initialization processing of a duplex system, this is also referred to as an HA (High Availability) initialization command.

(A) Primary virtual storage apparatus 1000 and its volumes (B) Secondary virtual storage apparatus 1000 and its volumes (S9002) The I/O path manager 5000 communicates with both virtual storage apparatuses 1000 commanded at S9001 and acquires the existence of volumes and the capacity thereof.

(S9003) The I/O path manager 5000 confirms that volumes commanded at S9001 exist and are of the same capacity. When this cannot be confirmed, the I/O path manager 5000 returns an error to the command source.

(S9004) The I/O path manager 5000 sends a remote copy initialization command to one or both virtual storage apparatuses 1000. This initialization command is commanded with the primary volume as the copy source volume and the secondary volume as the copy destination volume. Based on this command, the virtual storage apparatus 1000 starts remote copy.

(S9005) The I/O path manager 5000 registers the following information in the device relation table 5001, and thereafter returns an initialization start reply to the source of the initialization command.

(A) Identifiers of the virtual volumes in the host 1100 (=values created by the I/O path manager 5000)

(B) Related volume identifier list (=two identifiers corresponding to the virtual storage apparatus 1000 and the volume designated at S9001 (both the primary system and secondary system)).

(C) Identifier of the primary volume (=primary volume designated at S9001)

(D) Failure status (=secondary system in preparation)

(E) Pair status (=Initial-Copying)

(S9006) The I/O path manager 5000 monitors the pair status of remote copy, and updates the device relation table 50001 to the following information upon transition to the Duplex status.

(D) Failure status (=normal status)

(E) Pair status (=Duplex)

As a result of the foregoing processing, the I/O path manager 5000 is able to start the preparation for high availability including the setting of remote copy according to the user's command. Incidentally, in reality, since the I/O path manager 5000 is able to provide the virtual volume in the host 1100 immediately after S9005, users who wish to make access in a file format is able to start file I/O by issuing a mount command to the volume. Further, as a different method, the I/O path manager 5000 may define the virtual volume in the host 1100 corresponding to the volume to realize high availability before the setting of remote copy, and the file system 5020 may also start the foregoing processing from a state of mounting the volume by the user designating a volume to become a secondary system.

8. Write Request Processing Flow

Figure 10:
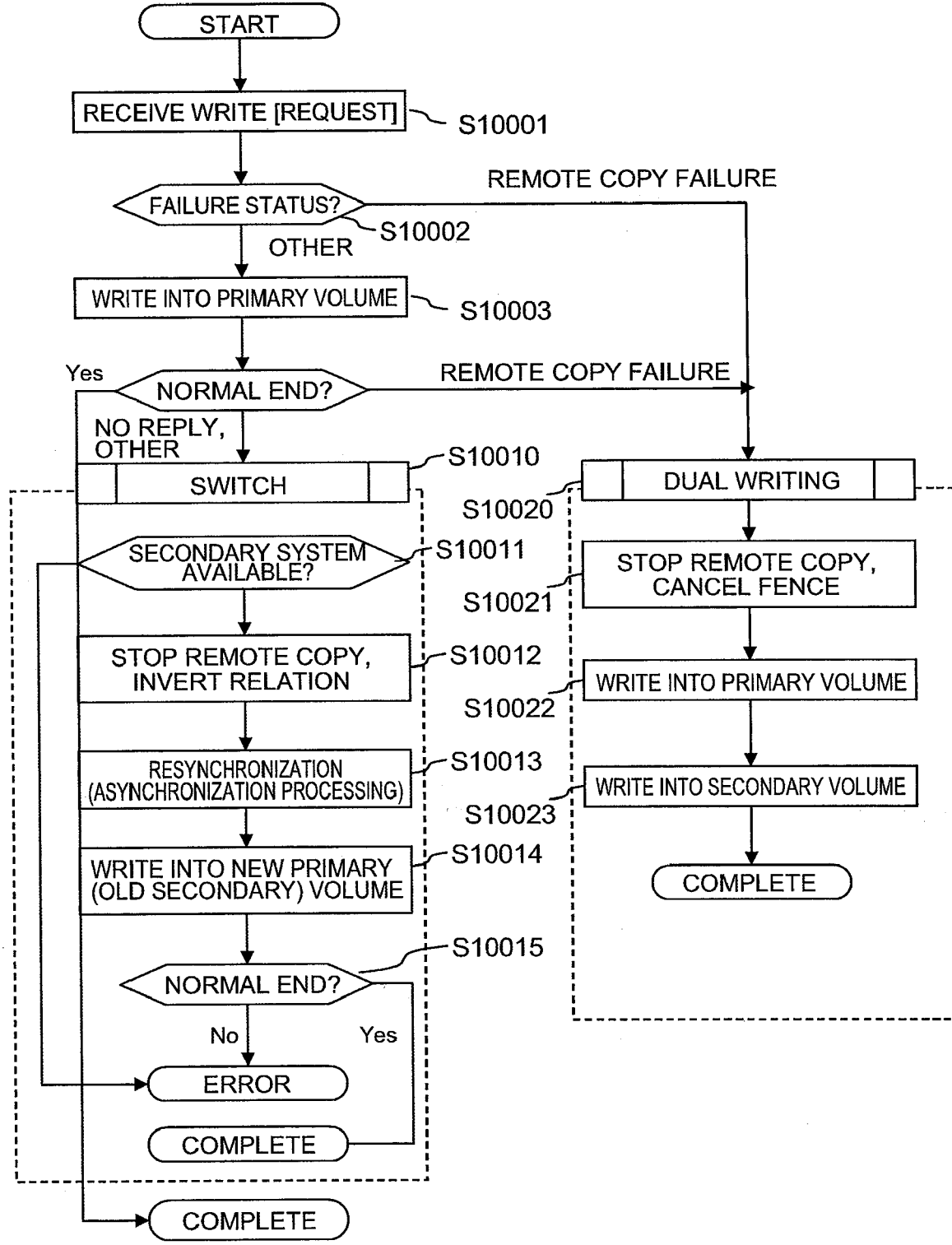
FIG. 10 is a flowchart showing the flow when the I/O path manager performs write processing.

FIG. 10 is a diagram showing the processing flow when the I/O path manager 5000 receives a write request from the file system 5020.

(S10001) From the file system 5020, the I/O path manager 5000 is called (or receives a message of) a write request function including the identifier of the virtual volume in the host 1100 to become the write destination, write location of the volume, and the write length.

(S10002) The I/O path manager 5000 confirms the failure status of the virtual volume and, if it is a remote copy failed status, transfers the control to the dual write processing at S10020, and otherwise executes S10003.

(S10003) The I/O path manager 5000 issues a write request to the primary volume. Incidentally, issuance of the write request is actually realized by calling the HBA device drive 5010 of the lower layer.

(S10004) The I/O path manager 5000 confirms the reply of the write request, returns a completion reply to the file system 5020 if it is a normal end or transfers the control to the dual write processing at S10020 if it is a remote copy failure or transfers the control to the switch processing at S10010 if it is a no reply or in other cases.

Incidentally, the dual write processing at S10020 is executed at the following steps.

(S10021) If the writing into the primary or secondary volume is denied due to the setting of remote copy, the I/O path manager 5000 cancels this setting.

(S10022) The I/O path manager 5000 issues a write request to the primary volume.

(S10023) The I/O path manager 5000 issues a write request to the secondary volume. The I/O path manager 5000 waits for the arrival of a write request reply from both the primary system and secondary system, and returns a completion reply to the file system 5020.

<8.1. Flow of Switch Processing>

The processing realized by the switch processing is further explained.

(S10011) The I/O path manager 5000 foremost confirms whether the secondary volume is available by referring to the failure status of the device relation table 5001, and returns an error reply to the file system 5020 if it determines that the secondary volume is unavailable, or executes S10012 if the secondary volume is available. Incidentally, a status where there is no secondary system (when the secondary virtual storage apparatus 1000 is not functioning due to a failure, or in a case of a volume in which the secondary virtual storage apparatus 1000 is not set to begin with), and the status of initialization in preparation described above may consider the status of unavailable.

(S10012) The I/O path manager 5000 issues a remote copy stop command to the secondary virtual storage apparatus 1000 and, after confirming that the copy status entered the Suspend status, issues a copy direction inversion command.

(S10013) The I/O path manager 5000 issues a remote copy resynchronization command to the secondary virtual storage apparatus 1000. Incidentally, there is no need to wait until the resynchronization is actually complete and the pair status enters the Duplex status.

(S10014) The I/O path manager 5000 updates the primary volume identifier of the device relation table 5001 to a volume identifier that was a secondary system theretofore, and switches the primary system and the secondary system. Then, the I/O path manager 5000 sends a write request to the new primary volume through the HBA device driver 5010.

(S10015) The I/O path manager 5000 confirms the reply of the write request, returns a completion reply to the file system 5020 if it is a normal end or returns an error reply if it is an error, and ends the processing.

<8.1.1. Countermeasures Against Write Request Failure During Dual Write Processing>

When the write request to the primary volume at S10022 ends in a failure during the dual write processing at S10020, control may be transferred to the switch processing at S10010. Further, when the write request to the secondary volume at S10023 ends in a failure, the failure status of the device relation table 5001 is changed to 'no secondary system,' and writing is thereby completed.

Further, since the pair status is a Failure Suspend status during the dual write processing, a write location is indicated in the volume of the virtual storage apparatus 1000 based on a differential bitmap of remote copy. Nevertheless, since the write data written in both volumes based on the dual write processing are the same, it is desirable to avoid recording in the differential bitmap while the dual write processing is being conducted normally, and to copy only the differential data during the resynchronization processing after recovery of the communication failure. As a solution for the above, while the dual write processing is being conducted normally, a case may be considered of periodically and repeatedly clearing the differential bitmap of the volume of both the primary and secondary virtual storage apparatuses 1000. With this method, there is no need to issue a clear command for each write request, and it is possible to avoid the copy of all areas of the target volume during the resynchronization of remote copy. This is because, although the write request of the dual write after the time of the nearest clearing process and the write request of the dual write during the failure of the dual write will be recorded as a write location in the differential bitmap, there will be no data inconsistency or copy omission area. Because, even when the data area recorded during the dual write is copied with resynchronization, the data contents of the copy destination will not change.

Incidentally, in the foregoing solution, processing of the write request may be temporarily stopped in order to clear the differential bitmap of both the primary and secondary system. As a method of stopping the processing, considered may be a method of the I/O path manager 5000 not transferring the write request received from the file system 5020 to the virtual storage apparatus 1000 until both differential bitmaps are cleared, or a method of pending the write request processing in the primary virtual storage apparatus 1000 until both differential bitmaps are cleared.

As a second solution, there is a method of allocating two differential bitmaps respectively to the primary and secondary volumes. The processing contents thereof are shown below.

(Initial status) The primary and secondary virtual storage apparatuses 1000 respectively record the location of the write request on one side of the two differential bitmaps. Thus, both virtual storage apparatuses 1000 will retain and manage information concerning an active side (this side refers to the side recording the write location when the write request arrives, and the other side of the differential bitmap is referred to as an inactive side). Further, it is desirable that there is nothing recorded on the inactive side of the differential bitmap.

(Step 1) The primary virtual storage apparatus 1000 switches the differential bitmap to become the recording destination of the location of the write request and the subsequent write requests are recorded in the switched differential bitmap by updating the management information of the active side to an alternative differential bitmap that was an inactive side. The secondary virtual storage apparatus 1000 is similarly switched. Incidentally, the trigger for starting the switch processing is given from the I/O path manager 5000 to both virtual storage apparatuses 1000. Incidentally, the switch processing of the primary system and secondary system may be executed in any order, or may be executed in parallel.

(Step 2) The I/O path manager 5000 issues a differential bitmap clear command to both virtual storage apparatuses 1000 upon waiting for a switch completion reply from both virtual storage apparatuses 1000. The virtual storage apparatus 1000 that received the clear command clears the write location of the differential bitmap that is an inactive side, and returns a reply to the I/O path manager 5000. Similar to the switch processing, the clear processing of the primary system and secondary system may be executed in any order, or may be executed in parallel.

(Step 3) The I/O path manager 5000 waits for a clear completion reply from the both virtual storage apparatuses 1000, and re-executes the process from Step 1 after the lapse of a certain period of time.

In the case of this solution, with the resynchronization processing after recovery of the communication failure, the area to perform differential copy can be decided during the Duplex-Pending status by calculating the logical sum of four bitmaps of the primary system and secondary system. Further, although there are many bitmaps in this method, there is no need to pend the write request.

The following third solution is a modified example of the foregoing second solution.

(Initial status) The primary and secondary virtual storage apparatuses 1000 respectively record the location of the write request on both side of the differential bitmaps. Thus, both virtual storage apparatuses 1000 will retain and manage information concerning the differential bitmap side that was previously cleared.

(Step 1) The I/O path manager 5000 issues a differential bitmap clear command to both virtual storage apparatuses 1000. The virtual storage apparatus 1000 that received the clear command clears the write location of the alternative differential bitmap that is not the different bitmap that was cleared previously, and returns a reply to the I/O path manager 5000.

(Step 3) The I/O path manager 5000 waits for a clear completion reply from the both virtual storage apparatuses 1000, and re-executes the process from Step 1 after the lapse of a certain period of time.

9. Read Request Processing Flow

Figure 11:
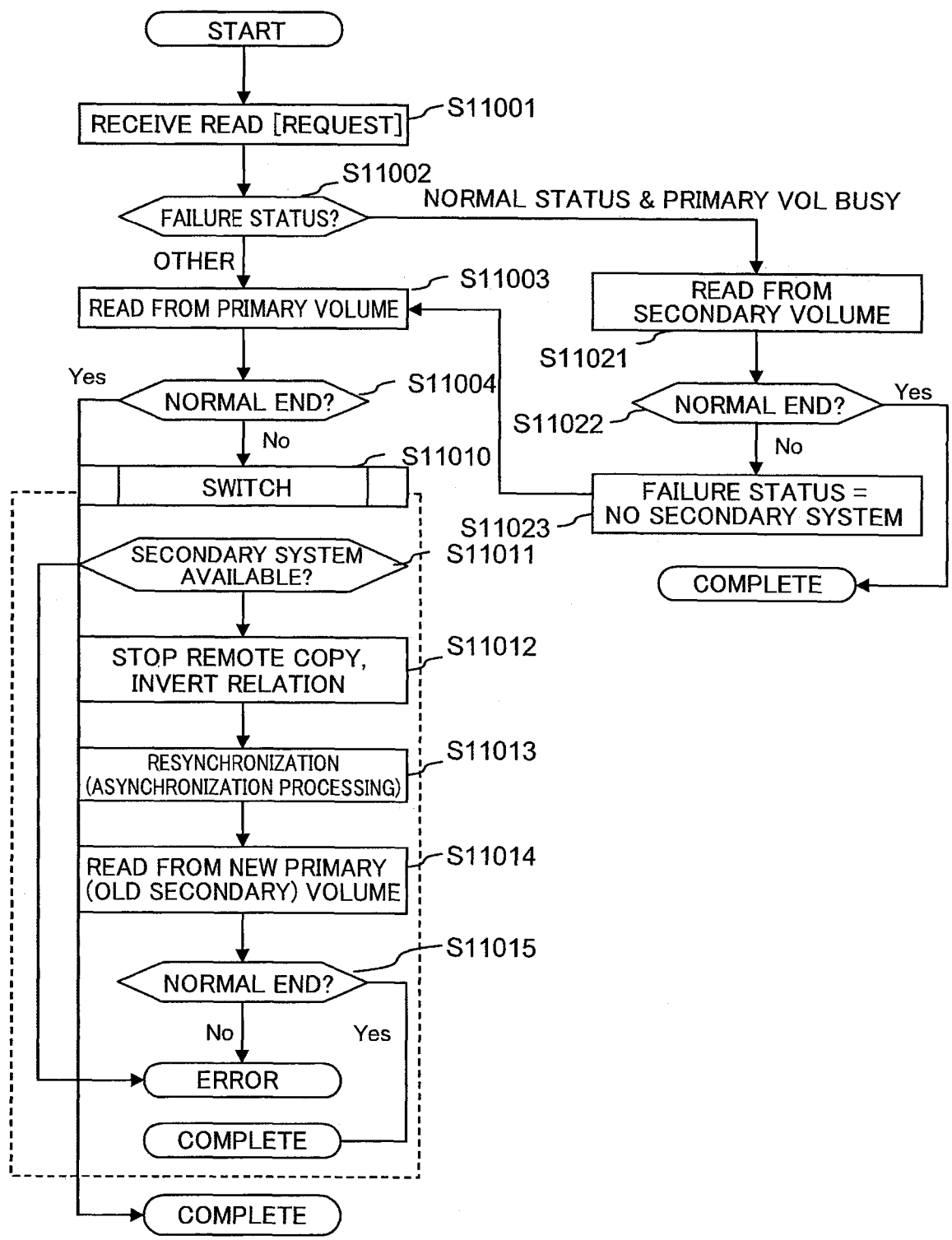
FIG. 11 is a flowchart showing the flow when the I/O path manager performs read processing.

FIG. 11 is a flowchart showing the processing contents when the I/O path manager 5000 receives a read request from the file system 5020.

(S11001) From the file system 5020, the I/O path manager 5000 is called (or receives a message of) a read request function including the identifier of the virtual volume in the host 1100 to become the read destination, read location of the volume, and the read length.

(S11002) The I/O path manager 5000 confirms the failure status of the virtual volume, executes S11021 if it is a normal status and the I/O load against the primary volume is high (for instance, when a given IOPS is exceeded or a given bandwidth is exceeded) or otherwise executes S11003 (no secondary system, secondary system in preparation, normal status, etc.).

(S11003) The I/O path manager 5000 issues a read request to the primary volume.

(S11004) The I/O path manager 5000 confirms the reply of the read request, returns a completion reply to the file system 5020 if it is a normal end or transfers the control to the switch processing at S11010 in other cases.

(S11021) The I/O path manager 5000 issues a read request to the secondary volume.

(S11022) The I/O path manager 5000 confirms the reply of the read request, returns a completion reply to the file system 5020 if it is a normal end or executes S11023 in other cases.

(S11023) The I/O path manager 5000 updates a failure status of the device relation table 5001 to 'no secondary system,' and executes S11003.

<9.1. Flow of Switch Processing>

The processing realized by the switch processing is further explained.

(S11011) The I/O path manager 5000 foremost confirms whether the secondary volume is available by referring to the failure status of the device relation table 5001, and returns an error reply to the file system 5020 if it determines that the secondary volume is unavailable or executes S11012 if the secondary volume is available. Incidentally, as a status of being determined as being unavailable, considered may be a status where there is no secondary system (when the secondary virtual storage apparatus 1000 is not functioning due to a failure, or in a case of a volume in which the secondary virtual storage apparatus 1000 is not set to begin with), and the status of initialization in preparation described above.

(S10012) The I/O path manager 5000 issues a remote copy stop command to the secondary virtual storage apparatus 1000 and, after confirming that the copy status entered the Suspend status, issues a copy direction inversion command.

(S10013) The I/O path manager 5000 issues a remote copy resynchronization command to the secondary virtual storage apparatus 1000. Incidentally, there is no need to wait until the resynchronization is actually complete and the pair status enters the Duplex status.

(S10014) The I/O path manager 5000 updates the primary volume identifier of the device relation table 5001 to a volume identifier that was a secondary system theretofore, and switches the primary system and the secondary system. Then, the I/O path manager 5000 sends a read request to the new primary volume through the HBA device driver 5010.

(S10015) The I/O path manager 5000 confirms the reply of the read request, returns a completion reply to the file system 5020 if it is a normal end or returns an error reply if it is an error and ends the processing.

10. Failure Countermeasure Processing Flow

In this section, the flow of processing from the time the I/O path manager 5000 detects a failure until the recovery is complete is explained. Incidentally, this processing is periodically executed in the background.

<10.1. Network Failure between Virtual Storage Apparatuses 1000>

(Step 1) The I/O path manager 5000 monitors the pair status of remote copy and detects the occurrence of some kind of failure by discovering a Failure Suspend status.

(Step 2) The I/O path manager 5000 issues a remote copy stop command to the secondary virtual storage apparatus 1000, inverts the copy direction after confirming that the copy status entered a Suspend status, and inquires the status to the respective virtual storage apparatuses 1000. Then the I/O path manager 5000 updates the failure status of the device relation table 5001 to 'remote copy failure' after confirming that no failure has occurred to the self virtual storage apparatus 1000 and that the cause is a network failure. Incidentally, this processing may also utilize the work result of the work performed by the storage administrator.

(Step 3) Wait until the network recovers.

(Step 4) The I/O path manager 5000 issues a pair resynchronization command to the primary virtual storage apparatus 1000.

(Step 5) The I/O path manager 5000 updates the failure status of the device relation table 5001 to 'secondary system in preparation.'

(Step 6) The I/O path manager 5000 waits for the pair status to become a Duplex status, and thereafter updates the failure status of the device relation table 5001 to 'normal status.'

<10.2. Failure and Shutdown of Primary Virtual Storage Apparatus 1000>

(Step 1) The I/O path manager 5000 detects the occurrence of a failure by monitoring the status of the primary virtual storage apparatus 1000.

(Step 2) The I/O path manager 5000 switches the subsequent I/O request destination to the secondary virtual storage apparatus 1000 by changing the identifier of the primary volume of the device relation table 5001 to the identifier of the secondary volume, and further updates the failure status to 'no secondary system.'

(Step 3) The I/O path manager 5000 waits until the old primary (currently secondary switched at Step 2) virtual storage apparatus 1000 recovers.

(Step 4) The I/O path manager 5000 issues a pair resynchronization command or initialization command to the primary virtual storage apparatus 1000.

(Step 5) The I/O path manager 5000 updates the failure status of the device relation table 5001 to 'secondary system in preparation.'

(Step 6) The I/O path manager 5000 waits for the pair status to become a Duplex status, and then updates the failure status of the device relation table 5001 to 'normal status.'

<10.3. Failure and Shutdown of Secondary Virtual Storage Apparatus 1000>

(Step 1) The I/O path manager 5000 detects the occurrence of a failure by monitoring the status of the secondary virtual storage apparatus 1000.

(Step 2) The I/O path manager 5000 updates the failure status of the device relation table 5001 to 'no secondary system.'

(Step 3) The I/O path manager 5000 waits until the secondary virtual storage apparatus 1000 recovers.

(Step 4) The I/O path manager 5000 issues a pair resynchronization command or initialization command to the primary virtual storage apparatus 1000.

(Step 5) The I/O path manager 5000 updates the failure status of the device relation table 5001 to 'secondary system in preparation.'

(Step 6) The I/O path manager 5000 waits for the pair status to become a Duplex status, and then updates the failure status of the device relation table 5001 to 'normal status.'

11. Alternative Initialization Method

In the foregoing explanation, although remote copy was configured to the virtual storage apparatus 1000 according to an initialization request issued from the I/O path manager 5000, the opposite method described below can also be considered.

(Step 1) The management host 1200 starts remote copy by issuing a remote copy pair initialization command to the virtual storage apparatus 1000.

(Step 2) The I/O path manager 5000 receives a scanning request.

(Step 3) The I/O path manager 5000 acquires the configuration of remote copy in the respective volumes through the HBA device driver 5010 (status of remote copy configuration, whether it is a copy source or a copy destination, the virtual storage apparatus 1000 to become the other pair and its volume). Incidentally, as the foregoing acquisition method, a SCSI command can be used in the I/O network, or information can be acquired using other communication networks.

(Step 4) The I/O path manager 5000 creates a device relation table 5001 based on the information acquired at the previous step, and starts the processing described above. Incidentally, creation examples of the device relation table 5001 are shown below.

(A) Identifier of the virtual volume in the host 1100=value created by the I/O path manager 5000

(B) Related volume identifier list=identifiers of the copy source volume and the copy destination volume of remote copy (C) Primary volume=copy source volume remote copy (D) Failure status='normal status' when the pair status acquired from the virtual storage apparatus 1000 is a Duplex status, 'secondary system in preparation' when it is an Initial-Copying status or a Duplex-Pending status, 'remote copy failure' when it is a Suspend status or a Failure Suspend status (E) Pair status=pair status acquired from the virtual storage apparatus 1000

High availability is realized in this embodiment based on the operation of the hardware and programs described above. Incidentally, as countermeasures to be taken when much time is required for the switch processing illustrated in FIG. 10 and FIG. 11, a part of the foregoing switch processing can be executed as preliminary processing when it becomes necessary for the I/O path manager 5000 to re-send the I/O request. Here, the preliminarily performed switch processing can be restored if the re-sent I/O request is returned with a normal reply, and the remaining portions of the foregoing switch processing can be executed if the re-sent I/O request is returned with error reply, or there is no reply. Further, in this embodiment, all volumes may be virtualized with the virtual storage apparatus 1000, the entity may be a virtual volume in the storage apparatus 1500, and the virtual storage apparatus 1000 may be an apparatus dedicated to virtualization, or contrarily a constitution where the entity of all volumes is inside the virtual storage apparatus 1000 may be adopted. Moreover, in addition to the capacity, various other attributes may be configured to the volumes provided by the virtual storage apparatus 1000 (for instance, an emulation type or a volume identification number acquirable with an Inquiry command defined based on a SCSI standard).

Such attribute information and attribute change are also transferred from the primary virtual storage apparatus to the secondary virtual storage apparatus based on remote copy, and these may also be managed in both virtual storage apparatuses.

12. Alternative Read/Write Processing

Figure 19:
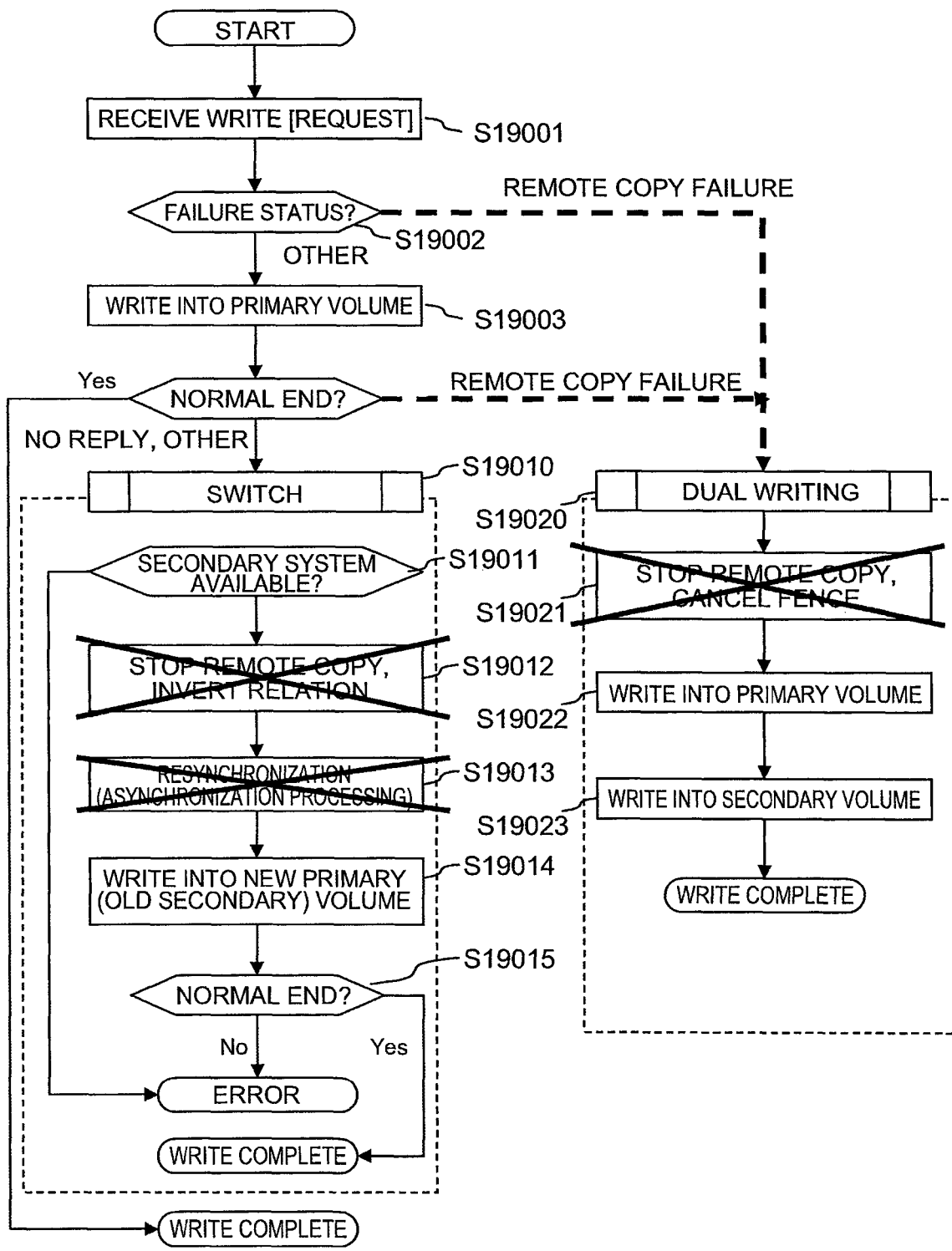
FIG. 19 is a flowchart explaining another read/write processing method in the first embodiment.
Figure 20:
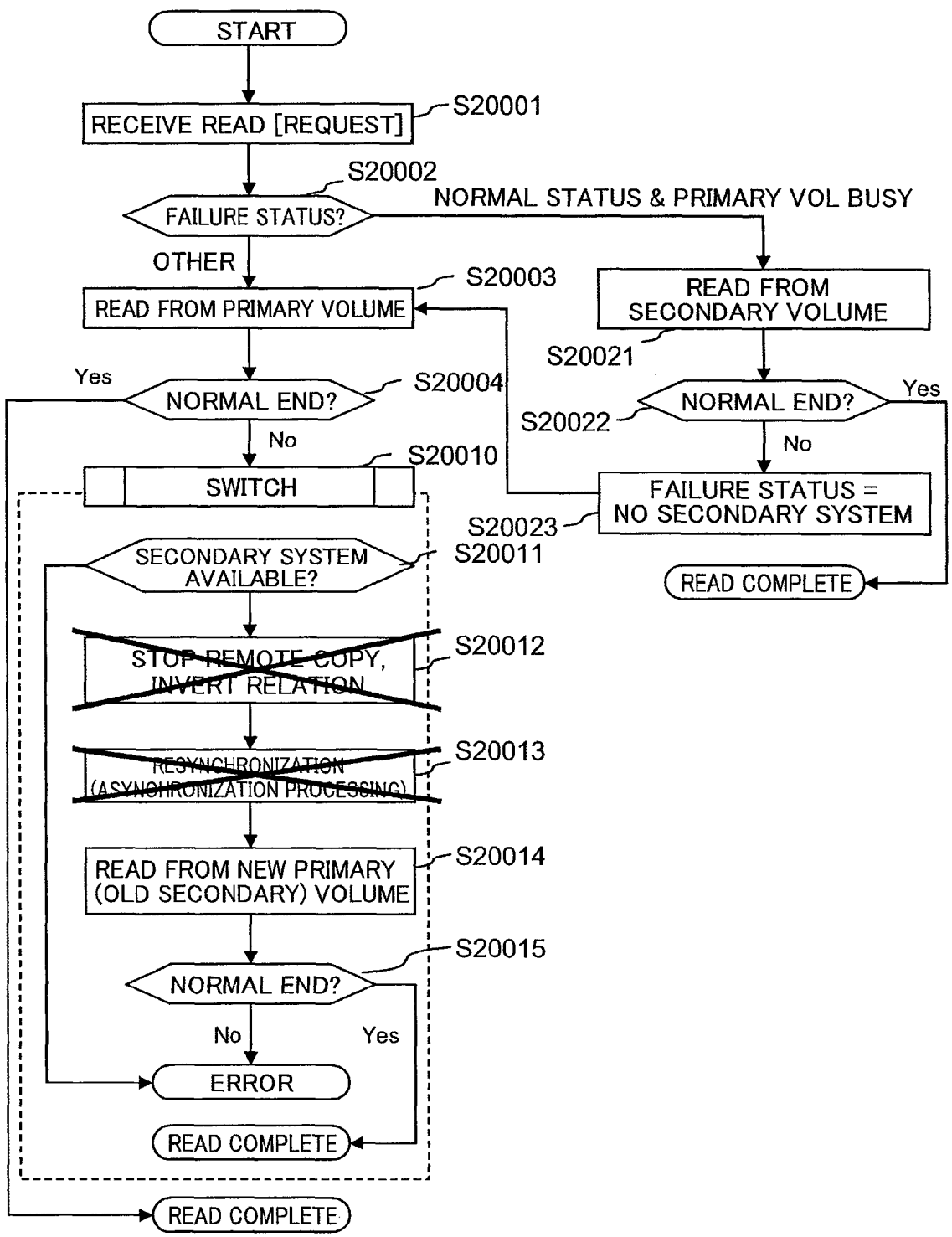
FIG. 20 is a flowchart explaining another read/write processing method in the first embodiment.
Figure 21:
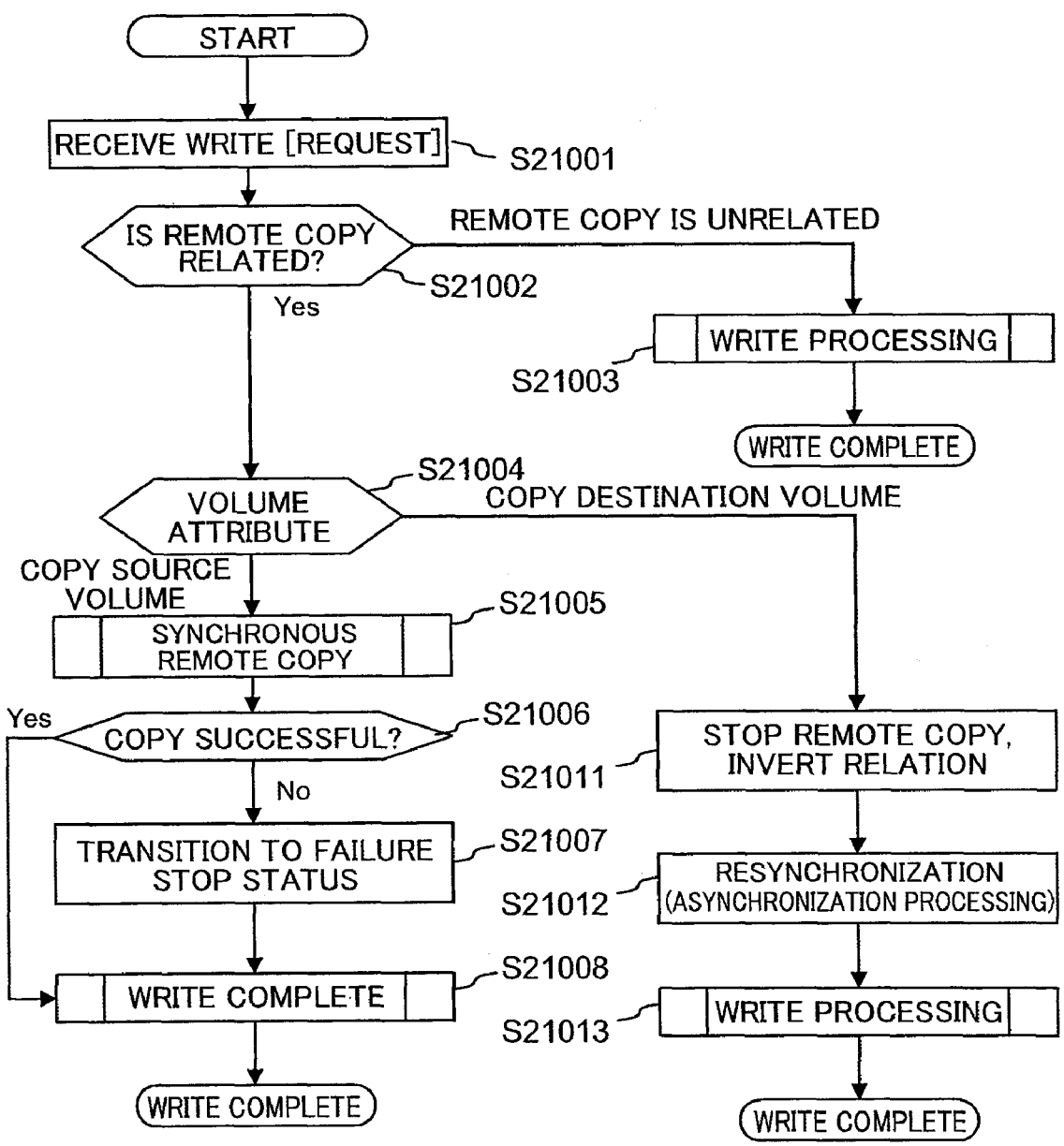
FIG. 21 is a flowchart explaining another read/write processing method in the first embodiment.

In the write/read processing illustrated in FIG. 10 and FIG. 11, the I/O path manager 5000 specifically transfers the operation of remote copy to the virtual storage apparatus 1000. Nevertheless, since the operation of remote copy may differ for each vendor of the virtual storage apparatus 1000, there are cases when it would be more preferable not to include such operation in the write processing and read processing of the I/O path manager 5000. FIG. 19 to FIG. 21 show the processing contents of such a form. Incidentally, although there are cases below where the processing subject of various processes is explained as the "virtual storage apparatus 1000," in reality, it goes without saying that the processor 1101 (FIG. 1) of the virtual storage apparatus 1000 executes the corresponding processing based on programs stored in the memory 1012 (FIG. 1).

<12.1. Write Processing of I/O Path Manager>

FIG. 19 is a flowchart showing the processing contents of write processing to be executed by the I/O path manager 5000. The processing contents at the respective steps of S19001 to S19023 in FIG. 19 are the same as the processing contents at the respective steps of S10001 to S10023 in FIG. 10. FIG. 19 differs from the FIG. 10 in the following points.

(Difference 1) The operation of remote copy at steps S19012, S19013 and S19021 is skipped.

(Difference 2) The routine does not reach step S19020 of the flow during remote copy failure. Nevertheless, these differences only occur when it is not possible to identify an error message signifying remote copy failure in normal read/write processing.

<12.2. Processing of Storage Apparatus 1000>

FIG. 21 is a diagram showing the operation of remote copy to be performed when the virtual storage apparatus 1000 receives a write request.

(S21001) The virtual storage apparatus 1000 receives a write request.

(S21002) The virtual storage apparatus 1000 determines whether the target volume of the write request is related to remote copy, and executes S21003 when it is unrelated, and executes S21004 when it is related.

(S21003) The virtual storage apparatus 1000 performs normal write processing, returns a reply to the host 1100 and ends this processing.

(S21004) The virtual storage apparatus 1000 determines the remote copy attribute of the target volume of the write request, and executes S21005 when it is a copy source attribute, and executes S21011 when it is a copy destination attribute.

(S21005) The virtual storage apparatus 1000 executes synchronous remote copy processing, transfers write data to the secondary storage, and waits for a reply.

(S21006) The virtual storage apparatus 1000 determines whether the copy was successful, and executes S21008 if the copy was successful, and executes S21007 is the copy was unsuccessful.

(S21007) The virtual storage apparatus 1000 changes the status of the remote copy pair in which the target volume will become the copy source to a Failure Suspend status. However, writing to this volume is not prohibited.

(S21008) The virtual storage apparatus 1000 performs normal write processing, returns a reply to the host 1100, and ends this processing.

(S21011) The virtual storage apparatus 1000 stops remote copy, and inverts the relationship of the copy source and the copy destination.

(S21012) The virtual storage apparatus 1000 starts the resynchronization processing.

(S21013) The virtual storage apparatus 1000 performs normal write processing, returns a reply to the host 1100, and then ends this processing.

Incidentally, it is not necessary to wait until the resynchronization processing at S21012 is complete. This is because the virtual storage apparatus 1000 executing S21012 is a secondary system, the primary virtual storage apparatus 1000 is not necessarily operating normally, and much time may be required until the resynchronization processing is complete. Incidentally, the foregoing case is the same in that it can be recovered with the processing described in <10. Failure Measure Processing Flow>.

<12.3. Read Processing of I/O Path Manager>

FIG. 20 is a flowchart showing the processing contents of read processing to be executed by the I/O path manager 5000. The processing contents at the respective steps of S20001 to S20023 in FIG. 20 are the same as the processing contents at the respective steps of S11001 to S11023 in FIG. 11. FIG. 20 differs from the FIG. 11 in the following point.

(Difference 1) The operation of remote copy at steps S20012 and S20013 is skipped.

Incidentally, although in FIG. 11 the direction of remote copy was inverted according to the read processing, the remote copy direction is not inverted in this processing. This is because, in addition to cases where the primary virtual storage apparatus 1000 will not return a reply to the read request to the secondary virtual storage apparatus 1000 (including cases caused by a communication failure between hosts=virtual storage apparatuses), there are cases where this is caused by the excess load of the primary virtual storage apparatus 1000. Thus, if the secondary virtual storage apparatus 1000 performs the pair inversion of remote copy triggered by the read request to the copy destination volume, the pair will be inverted with the read request that just happened to be issued to the secondary virtual storage apparatus 1000, and the pair will be inverted once again with the subsequent read request, and the read performance will deteriorate as a result.

Nevertheless, when the execution of S20021 is inhibited, the virtual storage apparatus 1000 may perform pair inversion of remote copy by performing the following processing upon read processing.

(Step 1) The virtual storage apparatus 1000 receives a read request.

(Step 2) The virtual storage apparatus 1000 performs normal read processing.

(Step 3) The virtual storage apparatus 1000 determines whether the read-target volume is the copy destination volume of remote copy, and executes subsequent Step 4 if so, and ends this processing if not.

(Step 4) The virtual storage apparatus 1000 stops remote copy, and inverts the relationship of the copy source and the copy destination.

(2) Second Embodiment

Figure 12:
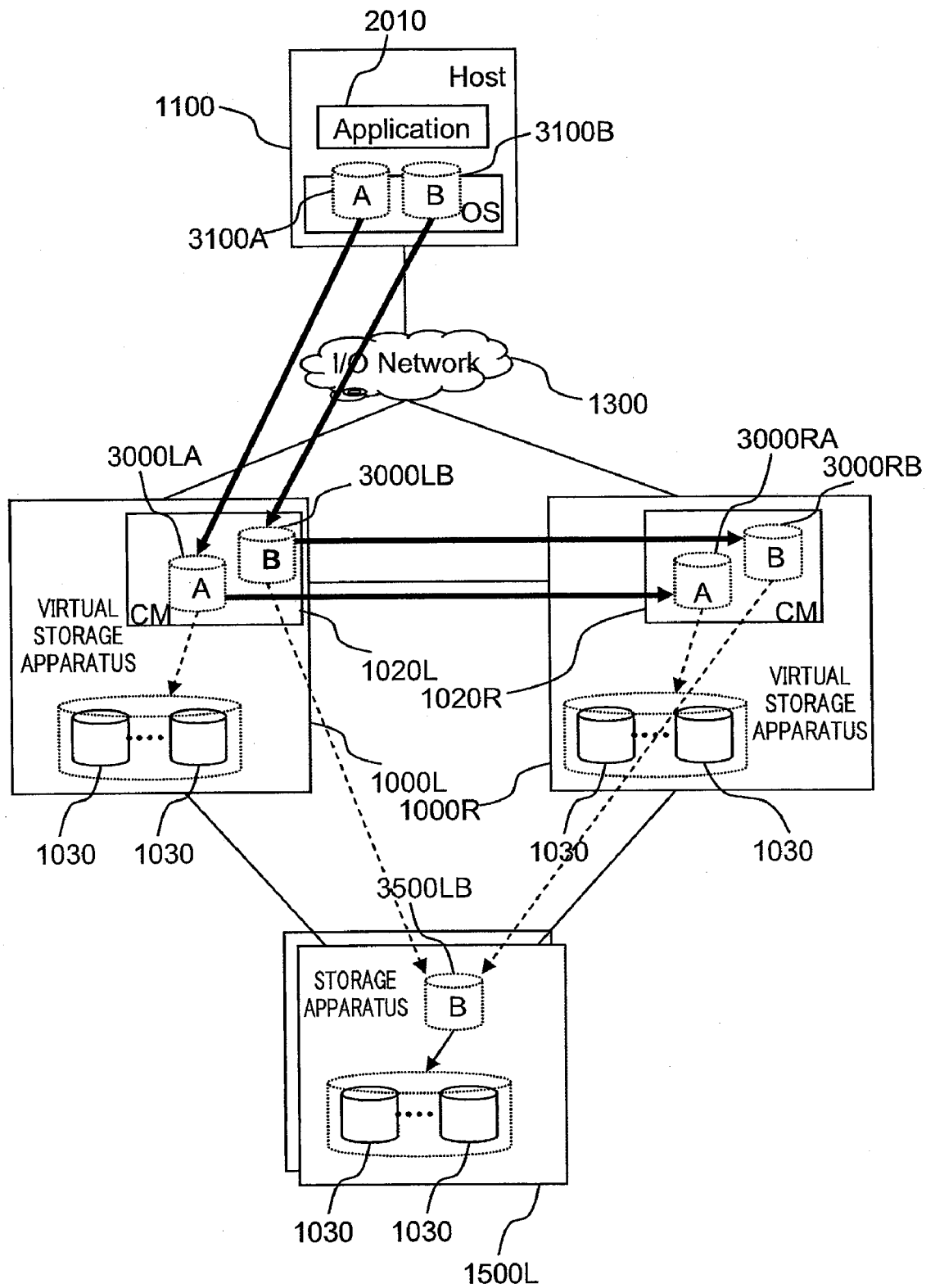
FIG. 12 is a conceptual diagram showing the overview of a second embodiment of the present invention.

The second embodiment is now explained with reference to FIG. 12. The second embodiment differs from the first embodiment in that the storage apparatus 1500L is coupled to a plurality of virtual storage apparatuses 1000L, 1000R, and these virtual storage apparatuses 1000L, 1000R share the volumes in the storage apparatus 1500L to enable the continuation of service at a lower cost than the first embodiment even when one of the virtual storage apparatuses 1000L, 1000R shuts down.

Nevertheless, since the virtual storage apparatuses 1000L, 1000R include cache memories 1020L, 1020R, in preparation for a case when the primary virtual storage apparatus 1000L shuts down due to a disaster immediately after write data is written into the virtualization volume, it is necessary to also store the write data into the cache memory 1020R of the secondary virtual storage apparatus 1000R, and the destaging and staging of both virtual storage apparatuses 1000L, 1000R must be devised accordingly.

A write request in a normal status is processed according to the following steps.

(Step 1) The primary virtual storage apparatus 1000L that received a write request from the host 1100 determines whether the write request is addressed to the volume 3000LA corresponding to the HDD 1030 inside the virtual storage apparatus 1000L, addressed to the virtualization volume (hereinafter referred to as the "shared virtualization volume") 3000LB provided by both virtual storage apparatuses 1000L, 1000R by sharing the volume 3500L of the storage apparatus 1500L, or addressed to the normal virtualization volume. Incidentally, processing other than the shared virtualization volume 3000LB is the same as the processing of the first embodiment.

(Step 2) The primary virtual storage apparatus 1000L stores the write data in its internal cache memory 1020L, stores the write data in the cache memory 1020R of the secondary virtual storage apparatus 1000R based on a remote copy program, and thereafter returns a normal reply to the host 1100.

(Step 3) The caching algorithm of the primary virtual storage apparatus 1000L decides the data in the cache memory 1020L to be destaged, and destages the data to the volume of the storage apparatus 1500L.

(Step 4) After destaging is complete, the primary virtual storage apparatus 1000L commands the secondary virtual storage apparatus 1000R to discard the address of data in the destaged cache memory 1020L. Incidentally, the secondary virtual storage apparatus 1000R that received the command discards the target data from the cache memory 1020R.

Incidentally, in this constitution, when switching of the I/O request is conducted to the secondary virtual storage apparatus 1000R in a state where the network between the virtual storage apparatuses 1000L, 1000R is disconnected, there are cases where the virtual storage apparatuses 1000L, 1000R will both autonomously perform destaging as primary systems. In order to avoid this kind of situation, when both virtual storage apparatuses 1000L, 1000R are to perform processing as primary systems, they may foremost perform exclusion control using a function such as SCSI Reserve or the like to the volume 3500L shared in the storage apparatus 1500L. Further, as another method, caching of virtual storage apparatus 1000L may be invalidated regarding the shared virtualization volume 3000LB, and, in such a case, when the access authority of the shared virtual volume 3000LB is changed to a read-only access authority, caching may be validated according to such change.

(3) Third Embodiment

Figure 13:
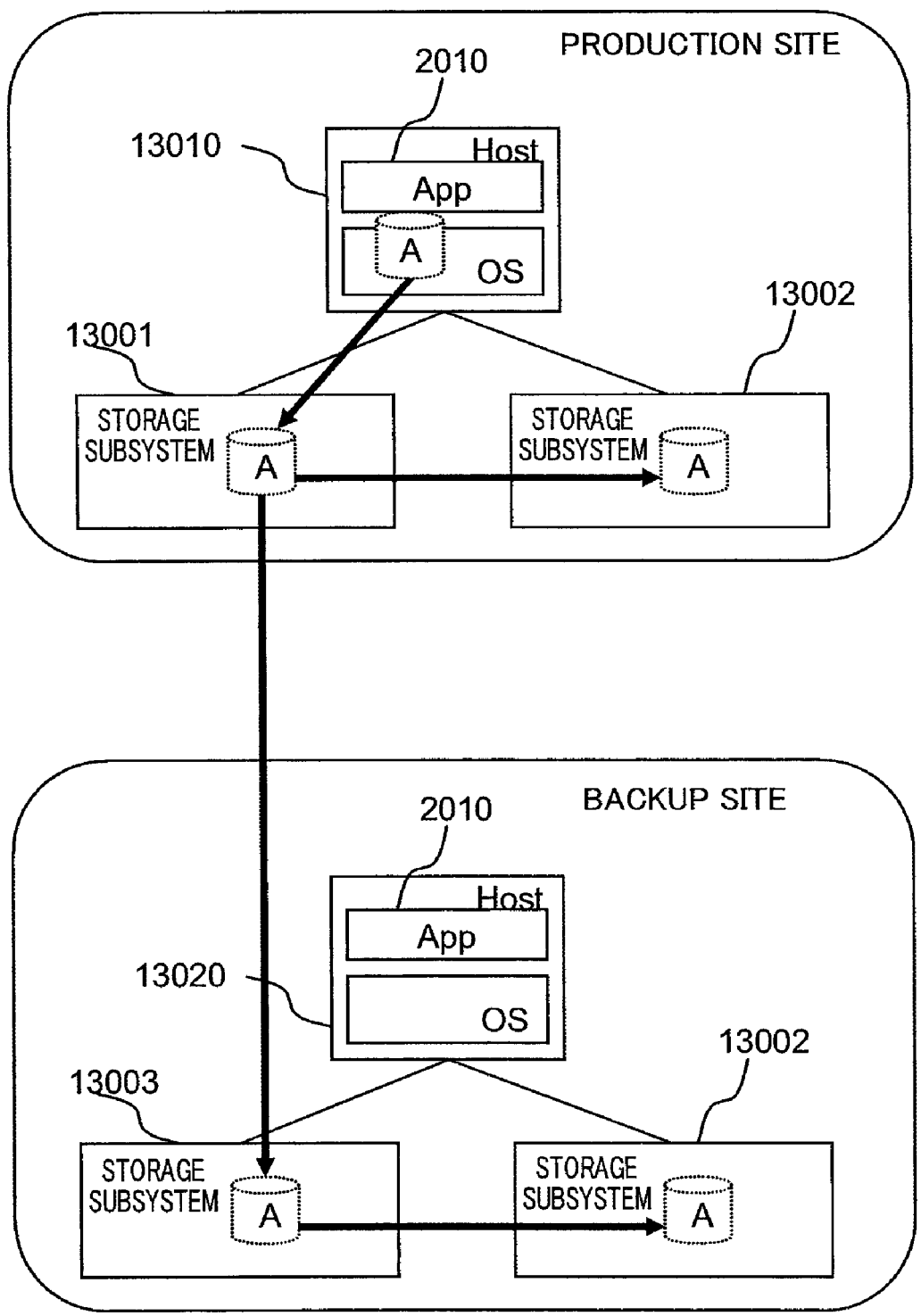
FIG. 13 is a conceptual diagram showing the overview of a third embodiment of the present invention.

The third embodiment is now explained with reference to FIG. 13. In this embodiment, the information system described in the foregoing embodiments is separately prepared at a remote site (backup site) that is different from the production site to perform remote copy, and the service can be resumed at the backup site when the production site is subject to a disaster.

Incidentally, in the following explanation, there are cases where the foregoing "virtual storage apparatus" is referred to as a storage apparatus, the "copy source volume" as a primary volume, the "copy destination volume" as a secondary volume, the "primary system" as an active side, and the "secondary system" as a standby side. Further, the information systems of the production site and the backup site may be collectively referred to as a remote copy system.

<1. Constitution of Remote Copy System>

In this embodiment, each site is constituted of hosts 13010, 13020 and a plurality of storage subsystems 13001, 13002, 13003, 13004. At the production site, the storage subsystems 13001, 13002 jointly adopt the high availability constitution described above. Moreover, at the backup site also, the storage subsystems 13003, 13004 jointly adopt the high availability constitution.

Further, in this embodiment, synchronous or asynchronous remote copy is performed from the active-side storage subsystem (with a copy source volume) 13001 of the production site to the active-side storage subsystem (with a copy destination volume) 13003 of the backup site. When the production site is subject to a disaster, the host 1310 of the backup site issues an I/O request to active side of the storage subsystems 13003, 13004 of a high availability constitution, and the re-booted application 2010 thereby resumes the processing.

Incidentally, as described above, a storage subsystem refers to both concepts including a constitution that does not use the virtualization function of the virtual storage apparatus 1000 (FIG. 1), as well as to a constitution where the virtual storage apparatus 1000 provides a virtualization volume using the virtualization function based on a combination of the virtual storage apparatus 1000 and the storage apparatus 1500 (FIG. 1). Further, in this embodiment, each storage subsystem 13001, 13002, 13003, 13004 may adopt separate internal constitutions (for instance, configuring only the storage subsystem 13001 with the virtual storage apparatus 1000 without using the virtualization function, or sharing the storage apparatus 1500 (FIG. 1) with the storage subsystems 13003 and 13004 of the backup site, but not sharing the same on the production site side).

Incidentally, although there are cases below where the processing subject of various processes is explained as the "storage subsystem," in reality, it goes without saying that the processor of the storage subsystem executes the corresponding processing based on programs stored in the memory of the storage subsystem.

<2. Processing>

When the application 2010 of the host 1301 of the production site issues a write request, the OS determines the active-side storage subsystem in the production site, and transfers the write request thereto. Incidentally, the storage subsystem 13001 corresponds to this in FIG. 13.

The active-side storage subsystem 13001 of the production site transfers write data to the standby-side storage subsystem (13002 corresponds to this in FIG. 13) in the production site based on synchronous remote copy. Further, the active-side storage subsystem 13001 transfers write data to the active-side storage subsystem (13003 corresponds to this in FIG. 13) of the backup site as synchronous or asynchronous remote copy (since only the active side processes the write request in the high availability constitution in this embodiment, remote copy is also similarly processed on the active side). The active-side storage subsystem 13003 in the backup site that received the write data transfers the received write data to the standby-side storage subsystem 13004 in the site based on synchronous remote copy.

Thus, the storage subsystems 13001, 13002 of the production site are keeping track of the active-side storage subsystem of the backup site, and the storage subsystems 13003, 13004 of the backup site are also keeping track of the active storage subsystem (storage subsystem 1301) of the production site so that they will not accept remote copy from an unexpected storage subsystem.

As a result of the foregoing processing, high availability is realized in both the production site and the backup site. However, the backup site may be of a constitution that does not adopt the high availability constitution for reduction of costs.

<3. Asynchronous Remote Copy>

Unlike with synchronous remote copy described above, asynchronous remote copy does not transfer write data at the time a write request arrives from the host 13010, but rather transfers such write data after the request completion reply (to put it differently, asynchronous remote copy transfers write data in a timing independent from the request reply to the host 13010). Thus, with asynchronous remote copy, it is possible to perform remote copy without deteriorating the response time of the write request even when the communication delay is significant because the distance between the sites is long. Nevertheless, with asynchronous remote copy, it is necessary to buffer write data in the storage subsystem 13001 on the side of the production site. The following methods for buffering write data may be considered.

(1) The storage subsystem 13001 of the production site creates a journal containing write data to the copy source volume and sequence information of such write data, stores this in its own cache memory or a dedicated volume, transfers this journal to the storage subsystem 13003 of the backup site, and the storage subsystem 13003 of the backup site stores write data in the copy destination volume by referring to the sequence information of the journal. Thereby, when the production site is subject to a disaster, it is possible to provide data with a protected write sequence (more specifically, write data with dependence on the side of the backup site.

(2) The storage subsystem 13001 of the production site groups the data written into the copy source volume every given period and stores such group in its own cache memory or a dedicated volume, transfers this asynchronously to the storage subsystem 13003 of the backup site, and stores data in group units in the copy destination volume of the storage subsystem 13003 of the backup site.

Thus, unless the write data to be buffered for asynchronous remote copy is also retained in the standby-side storage subsystem 13002, it will not be possible to succeed the asynchronous remote copy when the active-side storage subsystem 13001 shuts down. Thus, the active-side storage subsystem 13001 of the production site conveys, in addition to write data, information of the copy destination volume, foregoing sequence information or timing of performing the grouping process to the standby-side storage subsystem 13002, and the standby-side storage subsystem 13002 creates buffering data for asynchronous remote copy as the same as the active side according to such information.

Incidentally, since the storage subsystem 13003 of the backup site buffers the write data received from the production site without immediately storing it in the copy destination volume, the standby side needs to similarly create buffering data according to commands from the active side as with the production site, and store the write data in the copy destination volume at the same timing.

(4) Fourth Embodiment

The fourth embodiment is now explained with reference to FIG. 14. This embodiment explains the constitution of an interface (function I/F) for controlling the function provided by a storage apparatus in an information system configured redundantly by two storage apparatuses using synchronous remote copy described above.

Incidentally, from this embodiment to the fourteenth embodiment, the components referred to as virtual storage apparatuses 1000L, 1000R and storage apparatuses 1500L, 1500R heretofore are respectively referred to as storage apparatuses 15000A, 15000B and external storage apparatuses 16000A, 16000B. Further, although there are cases below where the processing subject of various processes is explained as the "storage apparatuses 15000A, 15000B" or the "external storage apparatuses 16000A, 16000B," in reality, it goes without saying that the processors (not shown) of the storage apparatuses 15000A, 15000B or the processors (not shown) of the external storage apparatuses 16000A, 16000B execute the corresponding processing based on programs stored in the memory of the storage apparatuses 15000A, 15000B or the external storage apparatuses 16000A, 16000B.

This embodiment illustrates an example where, after a function control request from the host 14000 is sent to the storage apparatus 15000A, the storage apparatus 15000A transfers the function control request to the storage apparatus 15000B, and both storage apparatuses 15000A, 15000B interpreting and executing such function control request.

The command device 15002A and the command device 15002B are respectively the logical volumes provided by the storage apparatus 15000A and the storage apparatus 15000B, and act as an interface with the host 1400 that controls the function. Incidentally, in this embodiment, it is hypothesized that the command device 15002A is the active side.

Further, based on synchronous remote copy, contents of the command device 15002A and contents of the command device 15002B will constantly coincide. The command device 15002A and the command device 15002B are provided to the function management program 14003 as one volume 14004 based on the path management function (corresponds to the function provided by the I/O path manager 5000 (FIG. 1)) provided by the operating system 14001.

The logical volume 15001A and the logical volume 15001B are respectively logical volumes provided by the storage apparatus 15000A and the storage apparatus 15000B, and logical volumes that are subject to the function control. Incidentally, in this embodiment, the logical volume 15001A is hypothesized as the active side.

Further, based on synchronous remote copy, contents of the logical volume 15001A and contents of the logical volume 15001B will constantly coincide. The logical volume 15001A and the logical volume 15001B are provided to the application program 14002 as one volume 14006 based on the path management function provided by the operating system 14001.

Incidentally, there may be a plurality of logical volumes to be subject to the function control described above.

The function control request processing unit 14005 of the function management program 14003 receives a function control request from the user or another program in the host 14000 or a program in a separate host (management host or the like) from the host 14000. The function control request processing unit 14005 that received the function control request reads/writes contents of the control request to the volume 14004 from and into the volume 14004. In this embodiment, since the command device 15002A is an active side, the write/read command is issued to the command device 15002A.

Writing into the command device 15002A is used to boot the function control, and reading from the command device 15002A is used to obtain the output value of the result of the function control.

The control request received by the function control request processing unit 14005 contains information (also referred to as "apparatus information") for uniquely identifying the control-target storage apparatuses 15000A, 15000B, information (also referred to as "volume information") for uniquely identifying the control-target logical volumes 15001A, 150001B, and information incidental to the function control.

The control I/F processing unit 15003A of the storage apparatus 15000A detects that a control request has been written into the command device 15002A. The control I/F processing unit 15003A determines whether the apparatus information of the control request coincides with the self-storage apparatus (storage apparatus 15000A) (determination 100). In this embodiment, since the command device 15002A is the active side, the determination result will be "Match." In the case of a match, the control I/F processing unit 15003A calls the function processing unit 15004A to execute prescribed function control to the logical volume 15001A corresponding to the volume information. As a specific example, there is a referral operation of a pair status of a certain logical copy function (described later) as one function provided by the storage apparatus 15000A. When this operation is called to the logical volume 15001A, the function processing unit 15004A refers to the management information of the local copy function, and, after acquiring the pair status, sends the pair status to the function control request processing unit 14005 via the control I/F processing unit 15003A, the command device 15002A and the volume 14004.

Meanwhile, although the control I/F processing unit 15003B of the storage apparatus 15000B performs similar processing, in this embodiment, since the command device 15002B is the standby side, the result of determination 100 will be "No Match." In this case, the control I/F processing unit 15003B refers to the pair management information of synchronous remote copy, and specifies the logical volume (corresponds to the logical volume 15001B) in the self-storage apparatus (storage apparatus 15000B) corresponding to the volume information (corresponds to the logical volume 15001A). Then, the control I/F processing unit 15003B calls the function processing unit 15004B to execute prescribed function control to the logical volume 15001B.

It is thereby possible to execute prescribed function control to the logical volume 15001A of the storage apparatus 15000A and the logical volume 15001B of the storage apparatus 15000B.

In this embodiment, although a case was explained relating to the referral operation of the pair status of the local copy function provided by the storage apparatuses 15000A, 15000B, this embodiment can be applied to the operation of various functions provided by the storage apparatuses 15000A, 15000B such as (1) other pair operations (pair creation, pair split, etc.) of the local copy function, (2) various pair operations of the local copy function provided by the storage apparatuses 15000A, 15000B, (3) operation of the security function (LDEV guard function described later) to the logical volumes 15001A, 15001B provided by the storage apparatuses 15000A, 15000B, (4) operation of the logical snapshot function (explained later) provided by the storage apparatuses 15000A, 15000B, and so on.

Incidentally, as a different mode of execution, upon receiving a command to be issued to both storage apparatuses 15000A, 15000B on the active side and standby side, a case may be considered where the active-side storage apparatus 15000A processes the received command and transfers it to the standby-side storage apparatus 15000B to perform the command processing, and start both storage processing with a single command from the host 14000. Further, in the case of a command concerning the acquisition of the program status, a case may also be considered where the active-side storage apparatus 15000A that received the command transfers the same command to the standby-side storage apparatus 15000B to acquire the status, and the active-side storage apparatus 15000A returning the status to the command source after comparing both statuses.

(5) Fifth Embodiment

Figure 15:
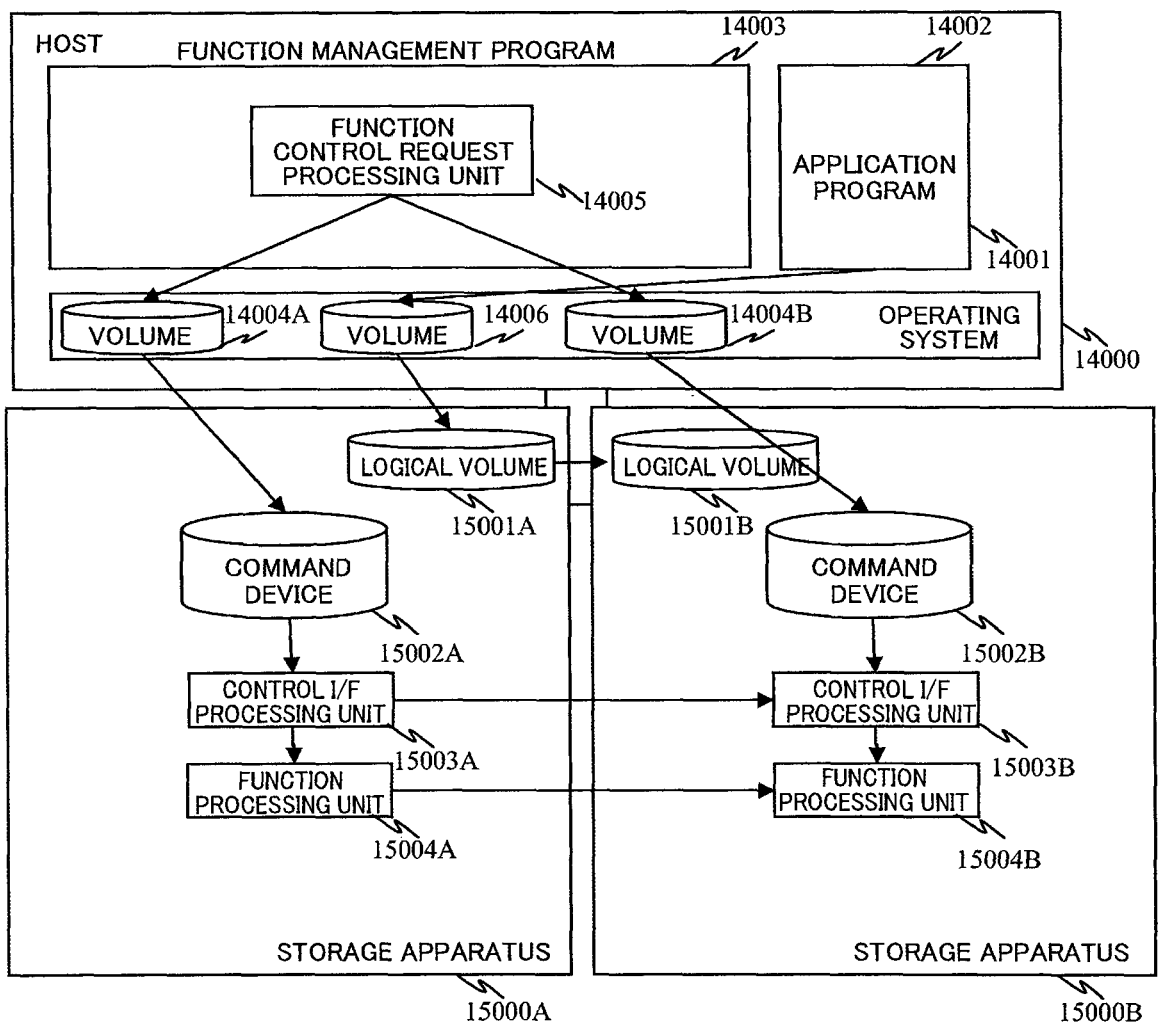
FIG. 15 is a conceptual diagram showing the overview of a fifth embodiment of the present invention.

This embodiment describes a separate constitution of the function I/F. The constitution of this embodiment is explained with reference to FIG. 15.

Figure 14:
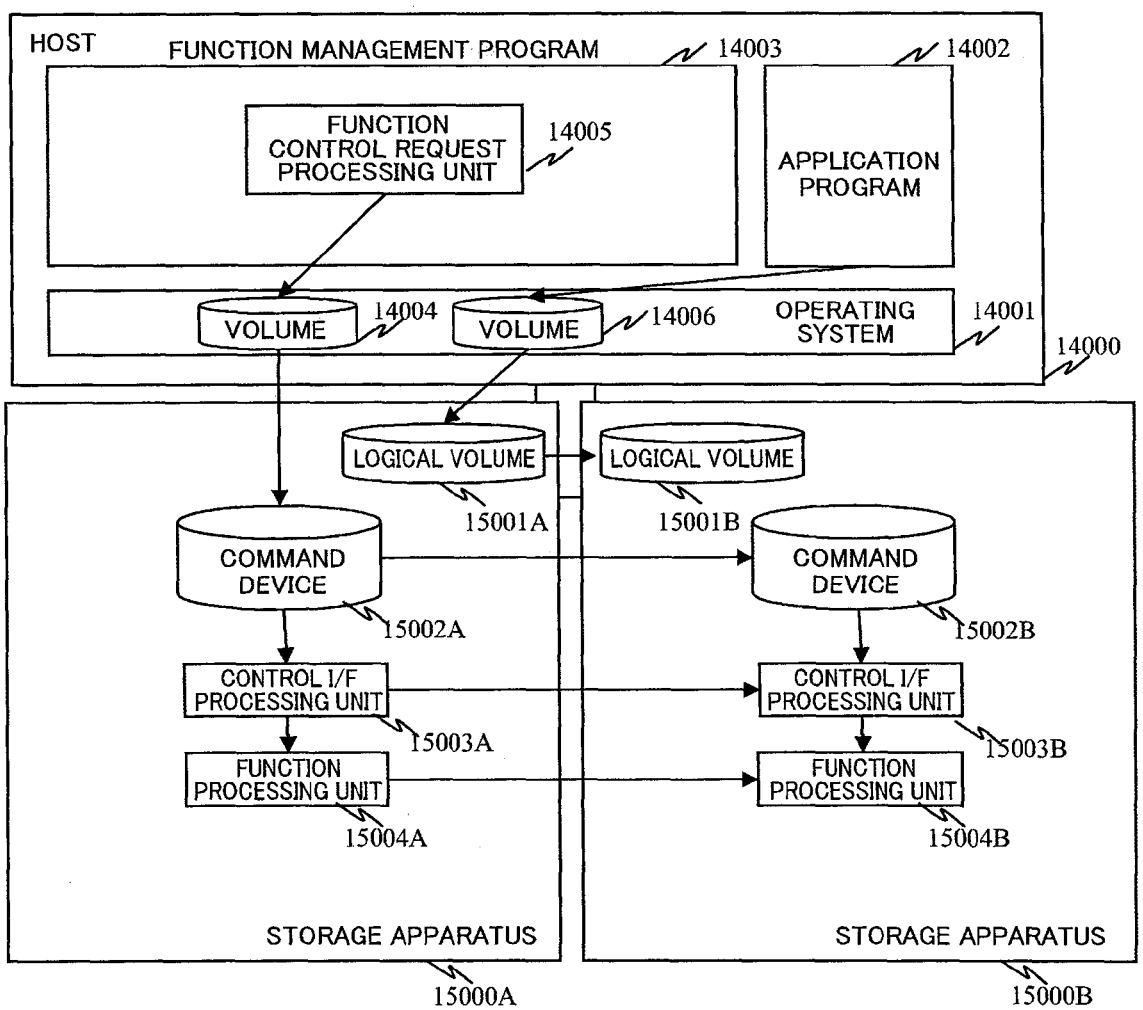
FIG. 14 is a conceptual diagram showing the overview of a fourth embodiment of the present invention.

The constitution of this embodiment is roughly the same as the constitution illustrated in FIG. 14. The differences with FIG. 14 are as following three points:

(1) The command device 15002A and the command device 15002B are not a pair of synchronous remote copy;

(2) The function management program 14003 recognizes the command device 15002A and the command device 15002B as separate volumes 14004A, 14004B; and (3) The function control request processing unit 14005 sends the function control request to the command device 15002A and the command device 15002B.

In this embodiment, as with the fourth embodiment, the control request received by the function control request processing unit 14005 contains information (also referred to as "apparatus information") for uniquely identifying the control-target storage apparatuses 15000A, 15000B, information (also referred to as "volume information") for uniquely identifying the control-target logical volumes 15001A, 150001B, and information incidental to the function control.

In this embodiment, unlike the fourth embodiment, as described above, the function control request processing unit 14005 that received the function control request from the user or another program in the host 14000 or a program in a separate host from the host 14000 sends a control request to both command devices 15002A, 15002B.

Incidentally, the control request may also be rewritten such that the function control request processing unit 14005 determines the apparatus information, designates the logical volume 15001A as the volume information to the command device 15002A, and designates the logical volume 15001B as the volume information to the command device 15002B.

Further, the user or another program in the host 14000 or a program in a separate host from the host 14000 may identify the storage apparatuses 15000A, 15000B, and issue different control requests in duplicate to the storage apparatuses 15000A, 15000B. In other words, a control request of the logical volume 15001A is issued to the command device 15002A, and a control request of the logical volume 15001B is issued to the command device 15002B.

(6) Sixth Embodiment

Figure 16:
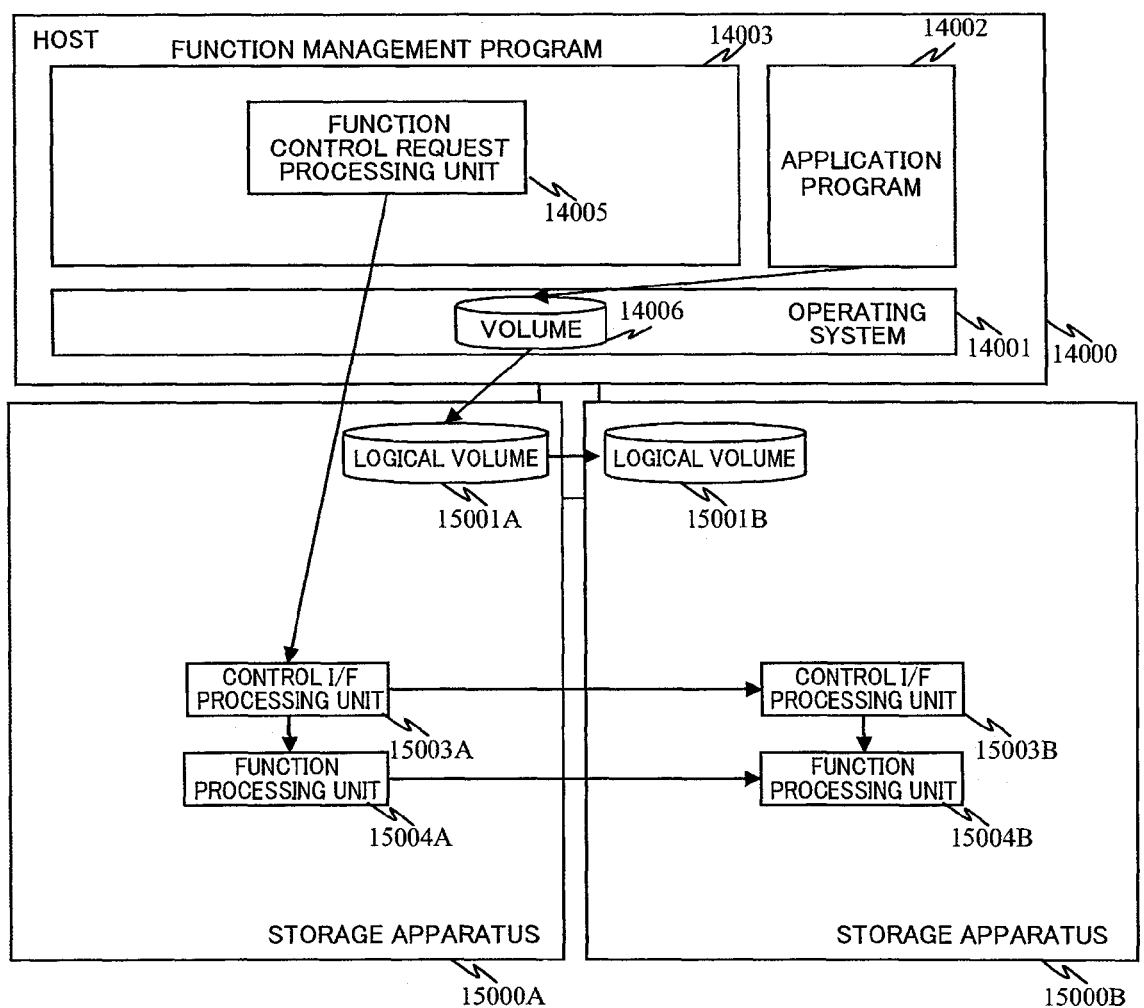
FIG. 16 is a conceptual diagram showing the overview of a sixth embodiment of the present invention.

This embodiment describes a separate constitution of the function I/F. The constitution of this embodiment is explained with reference to FIG. 16.

The sixth embodiment is roughly the same as the fourth embodiment. The differences with the fourth embodiment are as follows.

(1) The host 14000, the storage apparatus 15000A, and the storage apparatus 15000B are mutually connected with an interconnection network such as a LAN (Local Area Network). Incidentally, these components may be directly connected via a LAN, or connected via a switch.

(2) The constitution does not include a command device, and the communication among the three components (host 14000, storage apparatus 15000A and storage apparatus 15000B) is conducted via the LAN.

(3) The function control request processing unit 14005 sends a control request to the control I/F processing unit 15003A via the LAN.

(4) The control I/F processing unit 15003A that received the control request sends a control request to the control I/F processing unit 15003B via the LAN.

The point of processing the control request received by the control I/F processing units 15003A, 15003B is the same as the fourth embodiment, and the sixth embodiment is able to provide an equivalent function I/F as the fourth embodiment.

(7) Seventh Embodiment

Figure 17:
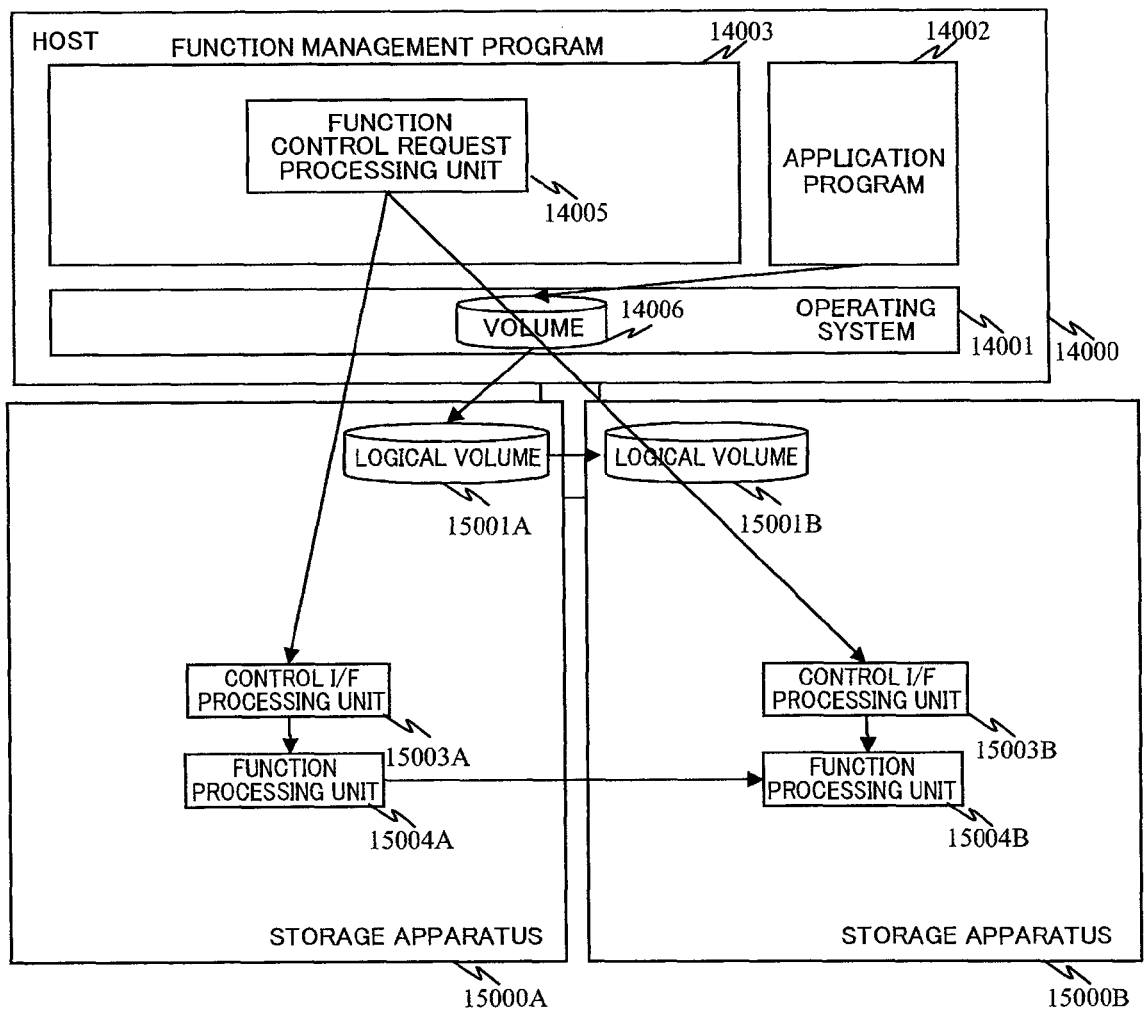
FIG. 17 is a conceptual diagram showing the overview of a seventh embodiment of the present invention.

This embodiment describes a separate constitution of the function I/F. The constitution of this embodiment is explained with reference to FIG. 17.

The seventh embodiment is roughly the same as the sixth embodiment. The differences with the sixth embodiment are as follows.

(1) The function control request processing unit 14005 sends a control request to both control I/F processing units 15003A, 15003B via the LAN.

(2) The control I/F processing unit 15003A does not sends a control request to the control I/F processing unit 15003B.

The point of processing the control request received by the control I/F processing units 15003A, 15003B is the same as the sixth embodiment, and the seventh embodiment is able to provide an equivalent function I/F as the sixth embodiment.

(8) Eighth Embodiment

In this embodiment, a case is explained of applying a security function (LDEV security function) to the logical volumes in the storage apparatus.

Figure 18:
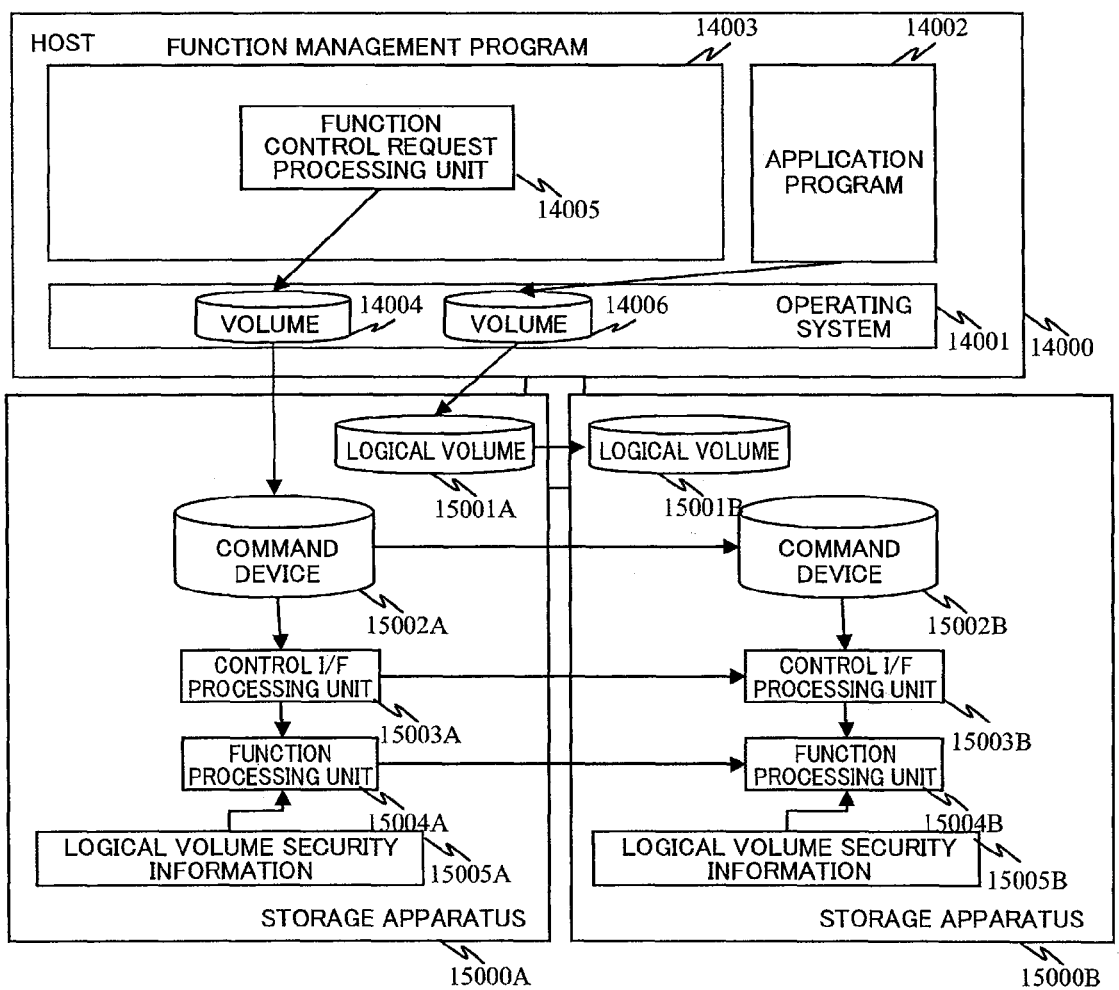
FIG. 18 is a conceptual diagram showing the overview of a eighth embodiment of the present invention.

FIG. 18 shows an embodiment of the LDEV security function. The constitution of this embodiment is roughly the same as FIG. 14. The difference with FIG. 14 is the addition of logical volume security information 15005A, 15005B. The logical volume security information 15005A, 15005B is used for access control from the host 14000 to the logical volumes 15001A, 15001B in the storage apparatuses 15000A, 15000B. As an example of access control, in order to inhibit the falsification of data in the logical volumes 15001A, 15001B, there is control for completely prohibiting the write access to the logical volumes 15001A, 15001B. Further, as a separate example, there is a function of prohibiting writing for a prescribed period to data obligated to be stored for a given period of time under laws and ordinances. Moreover, as another example, there is a function of prohibiting the read/write access from a specific host from the perspective of protecting confidential information.

Even in a constitution that seeks redundancy based on synchronous remote copy using the two storage apparatuses 15000A, 15000B as shown in FIG. 18, there are cases where it would be desirable to apply the LDEV security function. In this case also, it is possible to control the LDEV security function using the function I/F explained in the fourth embodiment. Specifically, it will suffice to set parameters concerning the LDEV security in the logical volume security information 15005A, 15005B storing security information of the target volume and referring to the same in the function processing unit 15004.

(9) Ninth Embodiment

In this embodiment, explained is a case of applying a local copy function to the logical volumes in the storage apparatus.

A local copy function is the function of creating a replication of a volume designated by the user in the storage apparatus that is the same as the copy source volume. The replication of the volume created using this function is accessed by the host for data mining or tape backup, or stored for a long time as backup data. When using the local copy function, a volume in which a replication is to be created and the volume of the replication destination are designated as a copy pair (hereinafter sometimes abbreviated as a "pair"), and a replication can be created by the user operating the pair. In the following explanation, the replication-target volume is sometimes referred to as a primary volume, and the replication destination volume is sometimes referred to as a secondary volume. In this embodiment, the availability is improved by coordinating the local copy function with the active-side storage apparatus and the standby-side storage apparatus.

Figure 22:
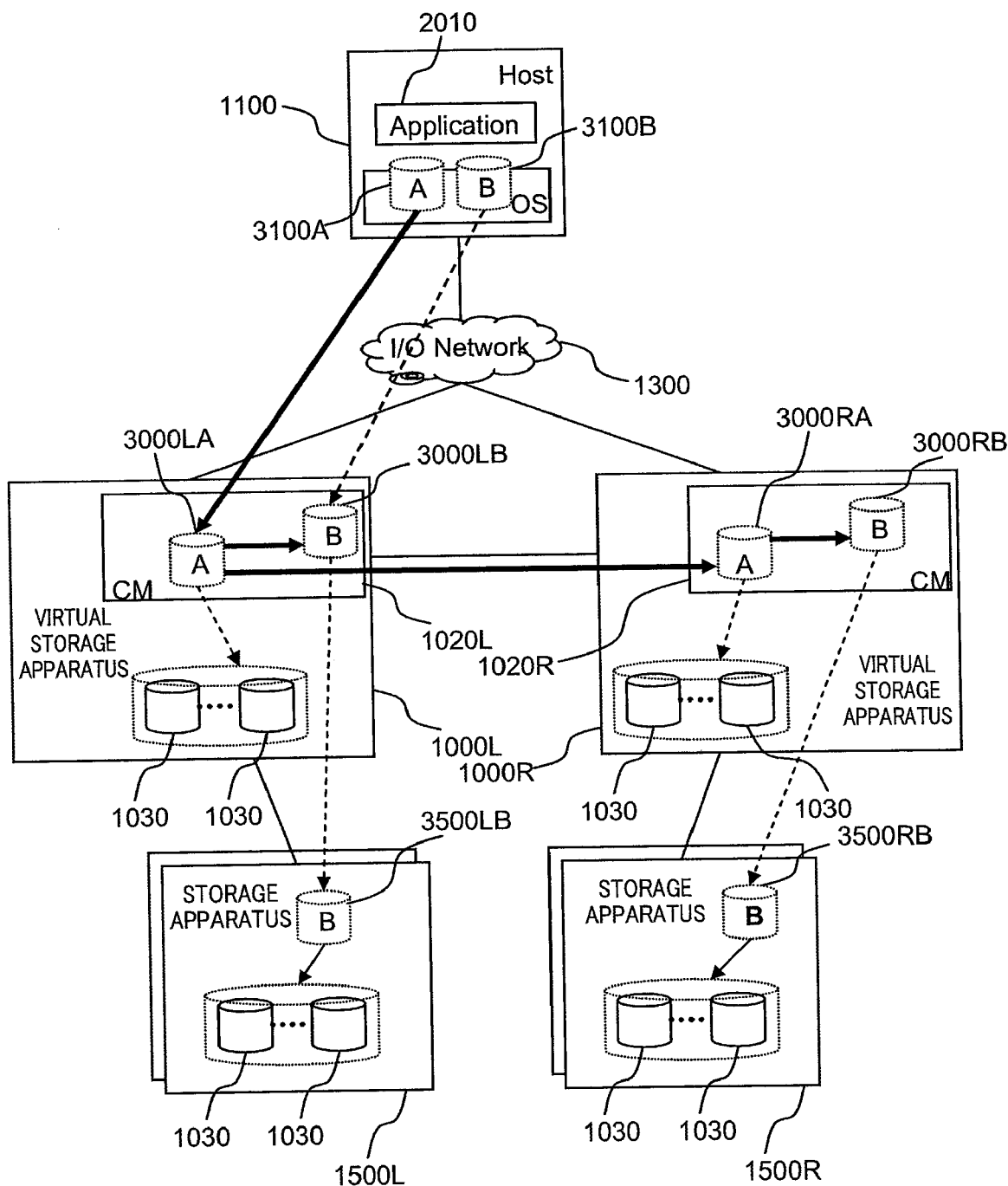
FIG. 22 is a conceptual diagram showing local copy pair information in a ninth embodiment of the present invention.

FIG. 22 shows an embodiment of the information system equipped with a local copy function. In FIG. 22, the host 1100 is coupled to the virtual storage apparatus 1000L and the virtual storage apparatus 1000R. Further, the virtual storage apparatus 1000L is coupled to the storage apparatus 1500L, and the virtual storage apparatus 1000R is coupled to the storage apparatus 1500R. Moreover, the local copy function and the differential bitmap (information showing the differential status between the primary volume and the secondary volume) are executed and managed by the virtual storage apparatus 1000L and the virtual storage apparatus 1000R. Details concerning the local copy function and the differential bitmap will be explained later.

In this embodiment, a constitution example is shown where the primary volume is in the virtual storage apparatuses 1000L, 1000R, and the entity of the secondary volume is in the storage apparatuses 1500L, 1500R. The primary volume 3000LA and the secondary volume 3000LB are a pair, and the entity of the secondary volume 3000LB is in the volume 3500LB. Similarly, the primary volume 3000RA and the secondary volume 3000RB are a pair, and the entity of the secondary volume 3000RB is in the volume 3500RB.

Foremost, the local copy pair information 6080, which is information for managing the local copy function, is explained with reference to FIG. 23. The local copy pair information 6080 is retained in the controller 1010 (FIG. 1) of the virtual storage apparatuses 1000L, 1000R. The local copy pair information 6080 includes the following information.

(A) Pair number: Number for uniquely identifying the local copy pair in the virtual storage apparatuses 1000L, 1000R.

(B) Primary volume information (B-1) Apparatus identifier: Information for uniquely identifying the storage apparatus retaining data of the primary volume. In this embodiment, the information will suffice so as long as it is able to identify the virtual storage apparatuses 1000L, 1000R and the storage apparatuses 1500L, 1500R.

(B-2) Volume identifier: Information for uniquely identifying the volumes in the storage apparatus identified with the apparatus identifier of the primary volume.

(C) Secondary volume information (C-1) Apparatus identifier: Information for uniquely identifying the storage apparatus retaining data of the secondary volume. In this embodiment, the information will suffice so as long as it is able to identify the virtual storage apparatuses 1000L, 1000R and the storage apparatuses 1500L, 1500R.

(C-2) Volume identifier: Information for uniquely identifying the volumes in the storage apparatus identified with the apparatus identifier of the secondary volume.

(D) Pair status: Information retaining the status of the local copy pair described later. As the pair status, there are Duplex status, Suspend status (sometimes referred to as a Split status), Simplex status, Initial-Copying status, and Duplex-Pending status.

(E) Differential bitmap: Information showing the differential location of the primary volume and the secondary volume. 1 (ON) is set to the location with a differential, and 0 (OFF) is set to the location without a differential.

The basic operation of the local copy function is now explained.

<Operation in Duplex Status>

The Duplex status is one of the pair statuses, and is a status where background copy described later is being performed from the primary volume to the secondary volume.

The read/write processing in the Duplex status is explained below. Incidentally, the following explanation of the read/write processing is subject to the active side of the read/write processing being the virtual storage apparatus 1000, and the volume 3000LA being the primary volume.

The read processing is foremost explained. In the host 1100, the operating system (OS) that received the read request from the application program 2010 determines whether the active side is the virtual storage apparatus 1000L or the virtual storage apparatus 1000R based on the function of the I/O path manager 5000 (FIG. 5) (in relation to the read-target primary volume), and issues a read request to the active-side virtual storage apparatus 1000L. The virtual storage apparatus 1000L that received the read request sends read data to the host 1100. The application program 2010 receives the read data via the operating system. This read processing is thereby complete.

Overview of the write processing is now explained. In the host 1100, the operating system (OS) that received the write request from the application program 2010 determines whether the active side is the virtual storage apparatus 1000L or the virtual storage apparatus 1000R based on the function of the I/O path manager 5000 (in relation to the write-target primary volume), and issues a write request to the active-side virtual storage apparatus 1000L. The virtual storage apparatus 1000L that received the write request receives the write data, stores the write data in the cache memory 1050 (FIG. 1), and sets the bit of the differential bit corresponding to the write data to 1 (ON).

Further, the write data is thereafter copied (synchronous remote copy) from the cache memory 1050 in the virtual storage apparatus 1000L to the primary volume 3000RA in the virtual storage apparatus 1000R based on the remote copy function. Incidentally, the method of synchronous remote copy is as explained above. The virtual storage apparatus 1000R that received the write data from the virtual storage apparatus 1000L based on synchronous remote copy stores the write data in the cache memory 1050, and sets the bit of the differential bitmap corresponding to the write data to 1 (ON). Thereafter, the virtual storage apparatus 1000R sends a write completion report to the virtual storage apparatus 1000L, and the virtual storage apparatus 1000L that received the write completion report sends a write completion report to the host 1100. When the virtual storage apparatus 1000L receives the write completion report, it stores the write data stored in the cache memory 1050 in its internal primary volume 3000LA.

Incidentally, the write data written respectively in the primary volume 3000LA of the virtual storage apparatus 1000L and the primary volume 3000RA of the virtual storage apparatus 1000R is copied to the secondary volumes 3000LB, 3000RB in the virtual storage apparatuses 1000L, 1000R asynchronously with the writing in the primary volumes 3000LA, 3000RA (this processing is hereinafter referred to as "background copy processing").

In reality, as the background copy processing, the active-side virtual storage apparatus 1000L periodically monitors the differential bitmap, copies the data of areas recorded as having a differential (in other words, bit is ON or 1) from the primary volumes 3000LA, 3000RA to the secondary volumes 3000LB, 3000RB, and clears the bit after the copy is complete (OFF or 0). The standby-side storage apparatus 1000R also performs similar processing triggered at the time the write data arrived based on synchronous remote copy.

Incidentally, the primary volumes 3000LA, 3000RA may be in the storage apparatuses 1500L, 1500R, or may be in the virtual storage apparatuses 1000L, 1000R. The same applies to the secondary volumes 3000LB, 3000RB.

When some kind of failure occurs and the read/write request to the primary volume 3000LA in the active-side virtual storage apparatus 1000L can no longer be processed, as described above, the operating system of the host 1100 continues access by switching the target of the read/write request to the primary volume 3000RA in the standby-side virtual storage apparatus 1000R. In this case also, since a local copy pair exists in the virtual storage apparatus 1000R, backup processing and the like described above can be performed using the secondary volume 3000RB.

<Operation of Pair Split and Suspend Status>

The Suspend status is one of the pair statuses, and indicates a status where the image of the secondary volumes 3000LB, 3000RB is decided. In this status, contents of the primary volumes 3000LA, 3000RA and contents of the secondary volumes 3000LB, 3000RB do not coincide, and the differentials between the primary volumes 3000LA, 3000RA and the secondary volumes 3000LB, 3000RB are managed with the differential bitmaps. Further, in this status, since the secondary volumes 3000LB, 3000RB are in a stationary status, the user is able to perform backup processing and the like described above.

The host 1100 stops the operation of background copy explained above when making the pair of the Duplex status of local copy to a Suspend status (this is referred to as a "Pair Split"). The Pair Split is implemented via the function I/F explained in the fourth to seventh embodiments.

(1) The host 1100 issues a stop command of local copy to the virtual storage apparatuses 1000L, 1000R via the function I/F. Normally, on the side of the host 1100, issuance of the I/O request is stopped immediately before the foregoing stop command.

(2) The active-side and standby-side virtual storage apparatuses 1000L, 1000R complete the background copy of areas that are turned on in the differential bitmap. The host 1100 receives a message indicating that the background copy in both virtual storage apparatuses 1000L, 1000R is complete from the active-side virtual storage apparatus 1000L or from both storage apparatuses 1000L, 1000R.

(3) The host 1100 receives the message, and thereafter resumes the I/O issuance.

As a result of the processing up (2) above, the volume pair existing respectively in the active-side and standby-side virtual storage apparatuses 1000L, 1000R becoming a Suspend status is confirmed. At this point, the pair status in both storages will be a Suspend status.

The subsequent read/write request processing is roughly the same as the Duplex status. The difference from the Duplex status is that the background copy processing is not operated.

<Pair Creation>

The status where the primary volume and the secondary volume are not of a pair relationship is referred to as a Simplex status. The processing for changing the Simplex status to the Duplex status is referred to as a pair creation. The transient state of changing the pair status from the Simplex status to the Duplex status is referred to as an Initial-Copying status.

The pair creation command is implemented via the function I/F explained with reference to fourth to seventh embodiment.

(1) The host 1100 issues a pair creation command to the virtual storage apparatuses 1000L, 1000R via the function I/F. As a result, the pair creation processing is started in both the active-side and standby-side virtual storage apparatuses 1000L, 1000R.

(2) Both virtual storage apparatuses 1000L, 1000R set the pair status to an Initial-Copying status, turns ON all differential bitmaps, and starts background copy.

(3) When the background copy is completed until the end of the differential bitmap, the virtual storage apparatuses 1000L, 1000R set the pair status to the Duplex status.

Incidentally, the read/write processing in the Initial-Copying status is the same as the read/write processing in the Duplex status.

<Pair Resynchronization>

The operation of changing the pair status from a Suspend status to a Duplex status is referred to as pair resynchronization. The transient status of changing the pair status from the Suspend status to the Duplex status is referred to as a Duplex-Pending status.

The pair resynchronization command is implemented via the function I/F explained in the fourth to seventh embodiments.

(1) The host 1100 issues a pair resynchronization command to the virtual storage apparatuses 1000L, 1000R via the function I/F. As a result, the pair resynchronization processing is started at both the active-side and standby-side virtual storage apparatuses 1000L, 1000R.

(2) The both virtual storage apparatuses 1000L, 1000R set the pair status to Duplex-Pending, and starts background copy.

(3) When the background copy is completed until the end of the differential bitmap, the virtual storage apparatuses 1000L, 1000R set the pair status to the Duplex status.

Incidentally, the read/write processing in the Duplex-Pending status is the same as the read/write processing in the Duplex status.

Subsequently, operation of a case when a write request is issued from the host 1100 to the virtual storage apparatuses 1000L, 1000R to which the local copy function was applied is explained in detail with reference to the flowchart.

Figure 24:
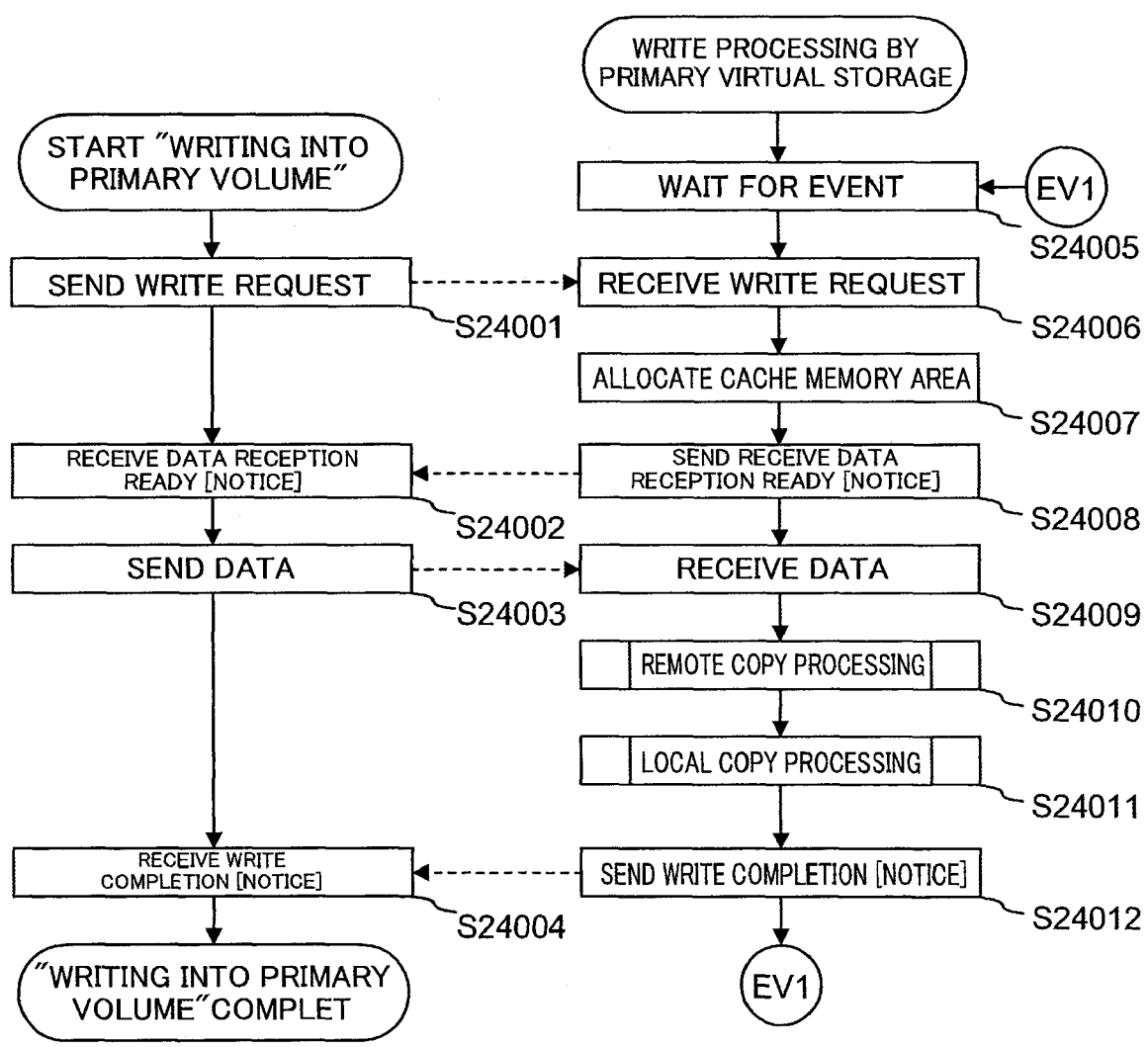
FIG. 24 is a flowchart explaining the write processing to be performed by a primary virtual storage apparatus in the ninth embodiment.

Foremost, referring to FIG. 24, operation of the host 1100 at step S10003 "Writing Into Primary Volume" of FIG. 10, and operation during the write processing of the active-side virtual storage apparatus (this is hereafter referred to as the "primary virtual storage apparatus") 1000L based on the write processing program (not shown) as a subprogram of the I/O processing program 6020 (FIG. 6) are explained.

<Operation of Step S10003 "Writing Into Primary Volume">

(S24001) The operating system of the host 1100 sends a write request to the primary virtual storage apparatus 1000L.

(S24002) The operating system of the host 1100 receives a data reception preparation completion report from the primary virtual storage apparatus 1000L.

(S24003) The operating system of the host 1100 sends write data to the primary virtual storage apparatus 1000L.

(S24004) The operating system of the host 1100 receives a write completion report from the primary virtual storage apparatus 1000L.

<Operation of Write Processing by Primary Virtual Storage Apparatus>

(S24005) The primary virtual storage apparatus 1000L waits for a write request event from the host 1100.

(S24006) The primary virtual storage apparatus 1000L receives a write request from the host 1100.

(S24007) The primary virtual storage apparatus 1000L allocates a cache memory area for storing the write data.

(S24008) The primary virtual storage apparatus 1000L sends a data reception preparation completion report to the host 1100.

(S24009) The primary virtual storage apparatus 1000L receives the write data from the host 1100, and stores it in the cache memory area.

(S24010) The primary virtual storage apparatus 1000L executes the remote copy processing described later.

(S24011) The primary virtual storage apparatus 1000L executes the local copy processing described later.

(S24012) The primary virtual storage apparatus 1000L sends a write completion report to the host 1100, and thereafter returns to S24005 and waits for an event.

Incidentally, the remote copy processing (S24010) and the local copy processing (S24011) may be executed in a reverse sequence.

Figure 25:
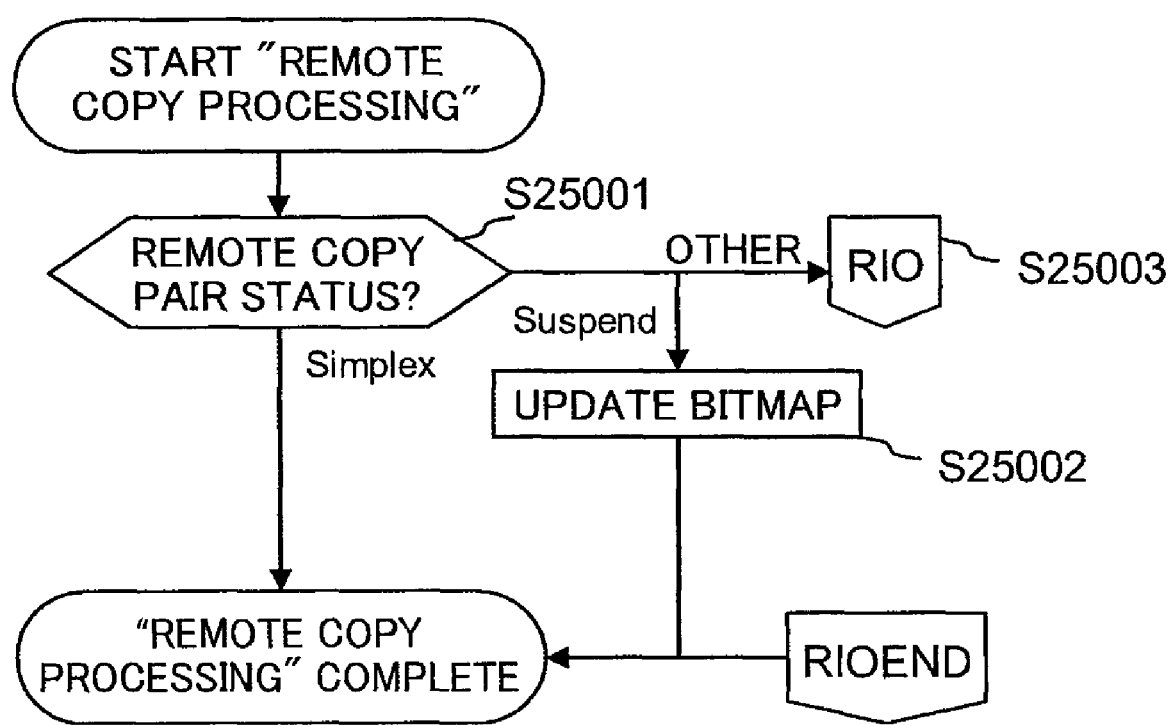
FIG. 25 is a flowchart explaining the remote copy processing in the ninth embodiment.

Subsequently, specific processing contents of remote copy processing performed at step S24010 of FIG. 24 is now explained with reference to FIG. 25. This remote copy processing is performed by the virtual storage apparatuses 1000L, 1000R based on the remote copy processing program 6090 (FIG. 6).

<Operation of Remote Copy Processing>

(S25001) The virtual storage apparatus 1000L refers to the pair status of the copy pair information 6040 (FIG. 6) corresponding to the write request from the host 1100, and performs processing corresponding to the pair status. When the pair status is a Simplex status, the remote copy processing is ended.

(S25002) When the pair status is a Suspend status, the virtual storage apparatus 1000L turns on (or sets 1 to) the bit of the differential bitmap corresponding to the write request.

(S25003) When the pair status is other than the foregoing pair statuses, processing below RIO of FIG. 26 explained later is executed.

Subsequently, operation of the primary virtual storage apparatus 1000L at step S25003 and the write processing operation of the secondary virtual storage apparatus (this is hereinafter referred to as the "secondary virtual storage apparatus") are explained with reference to FIG. 26. Incidentally, the write processing in the secondary virtual storage apparatus 1000R is performed based on the write processing program as a subprogram of the I/O processing program 6020.

<Operation of Step S25003>

(S26001) The primary virtual storage apparatus 1000L sends a write request to the secondary virtual storage apparatus 1000R.

(S26002) The primary virtual storage apparatus 1000L receives a data reception preparation completion report from the secondary virtual storage apparatus 1000R.

(S26003) The primary virtual storage apparatus 1000L sends write data to the secondary virtual storage apparatus 1000R.

(S26004) The primary virtual storage apparatus 1000L receives a write completion report from the secondary virtual storage apparatus 1000R.

<Operation of Write Processing by Secondary Virtual Storage Apparatus>

(S26005) The secondary virtual storage apparatus 1000R waits for a write request event from the primary virtual storage apparatus 1000L.

(S26006) The secondary virtual storage apparatus 1000R allocates a cache memory area for storing the write data.

(S26007) The secondary virtual storage apparatus 1000R sends a data reception preparation completion report.

(S26008) The secondary virtual storage apparatus 1000R sends the data reception preparation completion report to the primary virtual storage apparatus 1000L.

(S26009) The secondary virtual storage apparatus 1000R receives the write data from the primary virtual storage apparatus 1000L, and stores it in the cache memory area.

(S26010) The secondary virtual storage apparatus 1000R executes the local copy processing program described later.

(S26011) The secondary virtual storage apparatus 1000R sends a write completion report to the primary virtual storage apparatus 1000L, and thereafter returns to S26005 and waits for a write request event.

Figure 27:
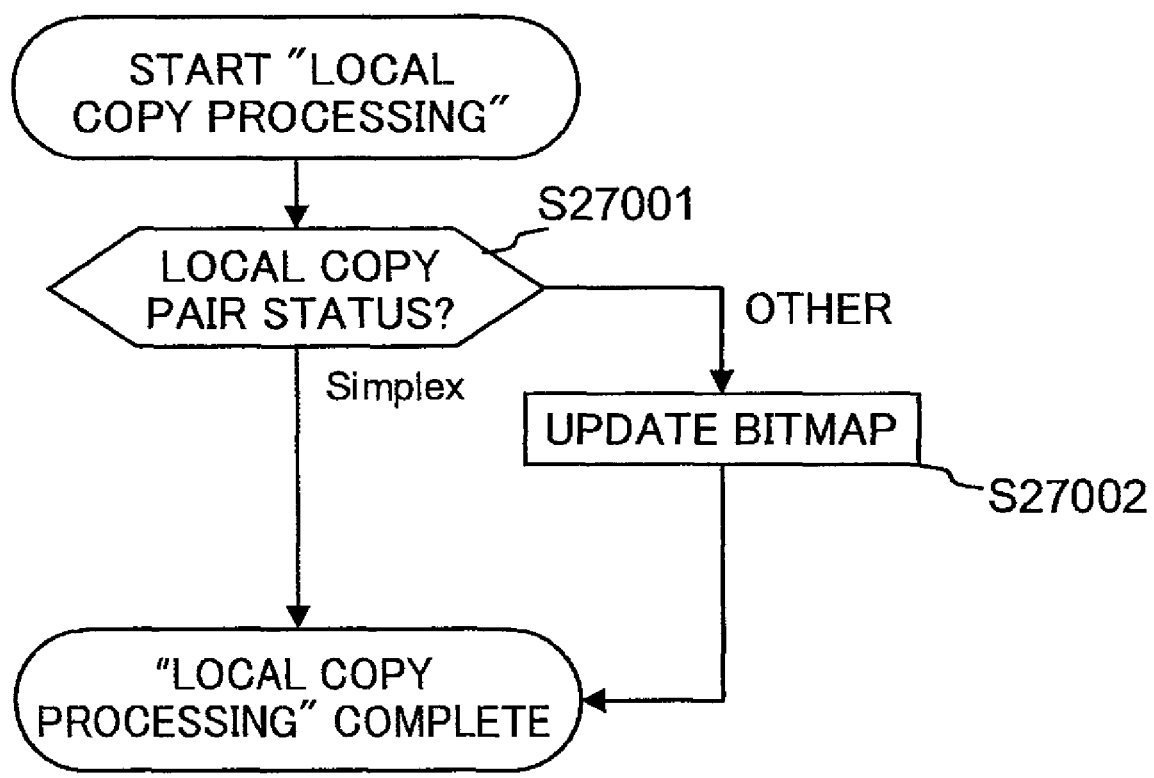
FIG. 27 is a flowchart explaining the local copy processing in the ninth embodiment.

Subsequently, operation of the local copy processing in the virtual storage apparatuses 1000L, 1000R is explained with reference to FIG. 27. This local copy processing is performed in the virtual storage apparatuses 1000L, 1000R based on the local copy processing program 6100 (FIG. 6).

<Operation of Local Copy Processing>

(S27001) The virtual storage apparatuses 1000L, 1000R refer to the pair status of the local copy pair information 6080 (FIG. 23) corresponding to the write request, and performs processing corresponding to the pair status. When the pair status is a Simplex status, the local copy processing is ended.

(S27002) When the pair status is other than the foregoing pair status, the virtual storage apparatuses 1000L, 1000R turn on (or set 1 to) the bit of the differential bitmap of the local copy pair information 6080 corresponding to the write request.

Figure 28:
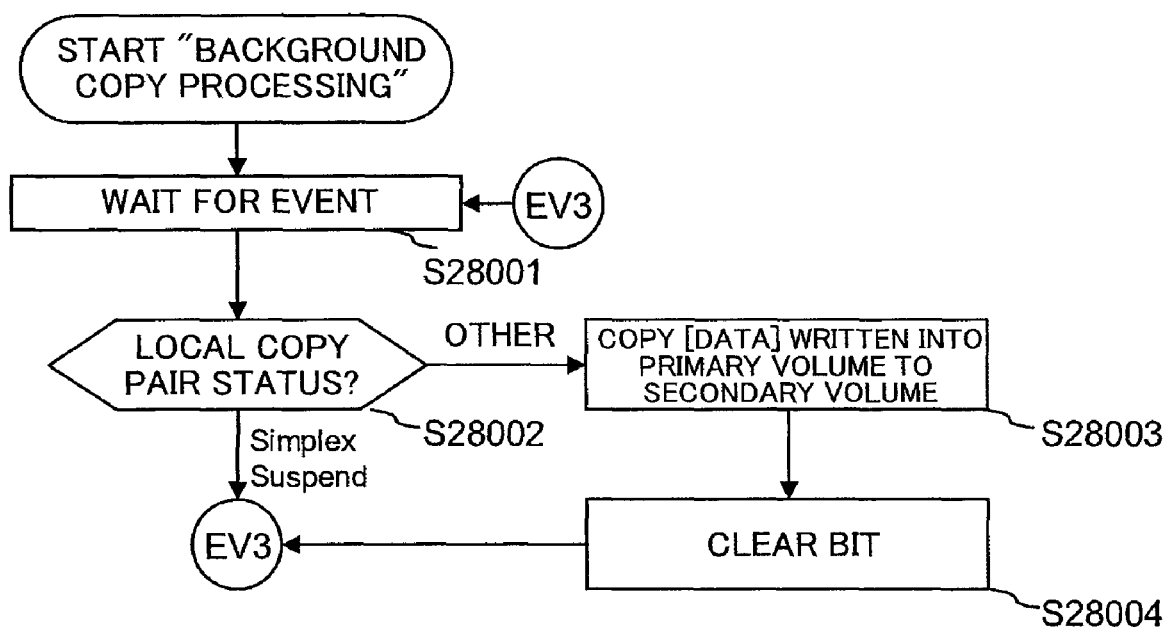
FIG. 28 is a flowchart explaining the background copy processing in the ninth embodiment.

Subsequently, operation of the background copy processing in the virtual storage apparatuses 1000L, 1000R is explained with reference to FIG. 28. This background copy processing is performed in the virtual storage apparatuses 1000L, 1000R based on the background copy processing program 6110 (FIG. 6).

<Operation of Background Copy Processing>

(S28001) The virtual storage apparatuses 1000L, 1000R periodically monitor the differential bitmap, and waits for an event that will update the differential bit to ON (or 1).

(S28002) Upon detecting a differential bit that is ON (or 1), the virtual storage apparatuses 1000L, 1000R refer to the pair status of the local copy pair information 6080 (FIG. 23) corresponding to the differential bit, and perform processing corresponding to the pair status. When the pair status is a Simplex status or a Suspend status, the routine returns to S28001 and waits once again for an event.

(S28003) When the pair status is other than the foregoing pair statuses, the virtual storage apparatuses 1000L, 1000R copy the write data to the primary volume stored in the cache memory 1050 (FIG. 1) or the HDD 1030 (FIG. 1) corresponding to the differential bit to a corresponding location in the cache memory 1020R of the virtual storage apparatus 1000R having the corresponding secondary volume. Incidentally, the virtual storage apparatus 1000R allocates a cache memory area for storing the write data before the foregoing copy.

(S28004) The virtual storage apparatuses 1000L, 1000R clear (OFF or update to 0) the differential bit, and thereafter returns to step S28001 and waits for an event that updates the differential bit to ON (or 1).

Figure 29:
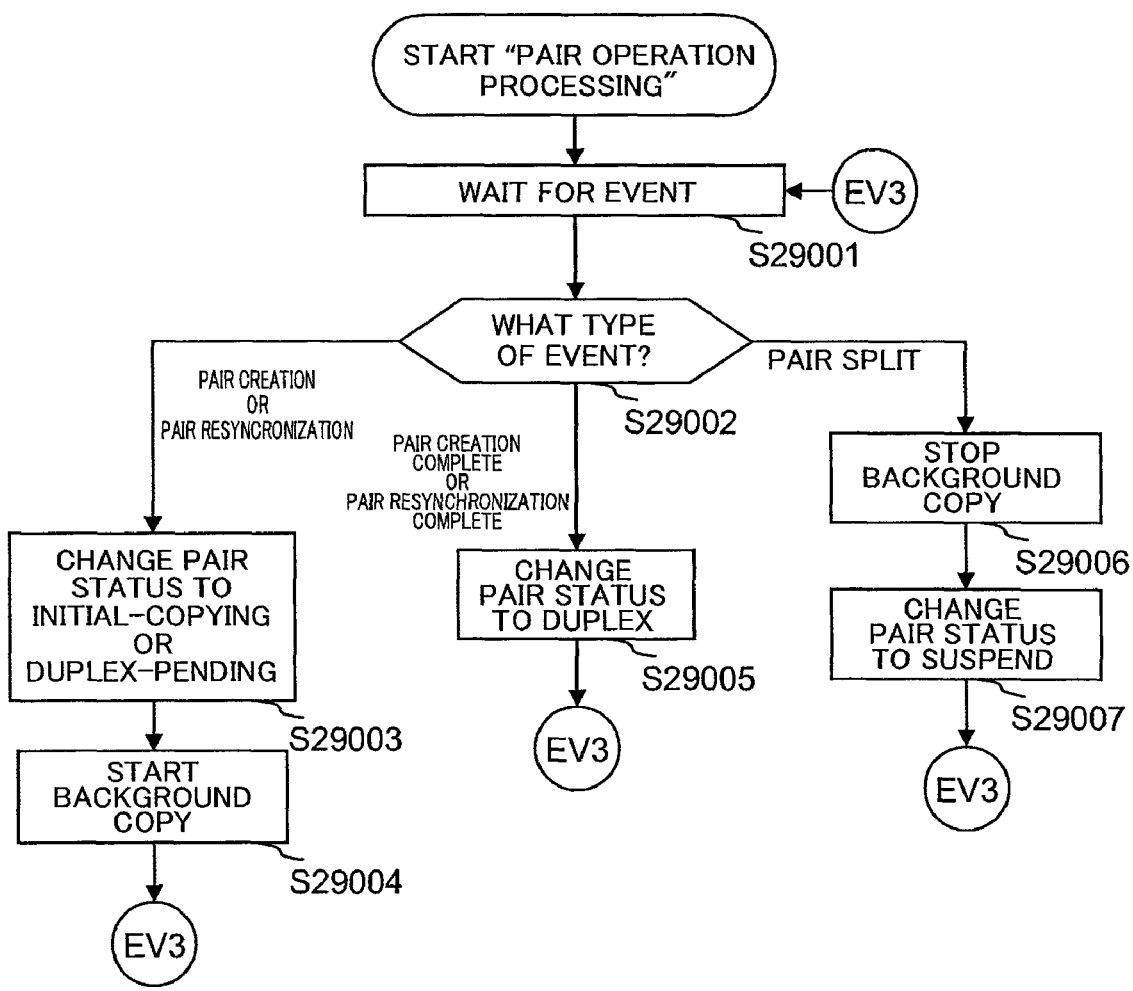
FIG. 29 is a flowchart explaining the pair operation processing in the ninth embodiment.

Subsequently, operation of the pair operation processing is explained with reference to FIG. 29. This pair operation processing is performed in the virtual storage apparatuses 1000L, 1000R based on the pair operation processing program 6120 (FIG. 6).

<Operation of Pair Operation Processing>

(S29001) The virtual storage apparatuses 1000L, 1000R wait for an event concerning the pair operation. There are the following types of events; namely, (A) a pair creation command from the user via the function I/F, (B) a pair resynchronization command from the user via the function I/F, (C) a pair split command from the user via the function I/F, (D) pair creation complete, and (E) pair resynchronization complete.

(S29002) The virtual storage apparatuses 1000L, 1000R determine the type of event and decide the subsequent operation.

(S29003) When the event is pair creation, the virtual storage apparatuses 1000L, 1000R change the pair status of the local copy pair information 6080 (FIG. 23) corresponding to the target local copy pair to an Initial-Copying status. When the event is pair resynchronization, the pair status is changed to a Duplex-Pending status.

(S29004) The virtual storage apparatuses 1000L, 1000R thereafter start the background copy processing concerning the target local copy pair.

(S29005) When the event is pair creation complete or pair resynchronization complete, the virtual storage apparatuses 1000L, 1000R change the pair status of the local copy pair information 6080 corresponding to the target local copy pair to a Duplex status.

(S29006) When the type of event is a pair split, the virtual storage apparatuses 1000L, 1000R complete the background copy processing of areas turned ON in the differential bitmap in relation to the target local copy pair, stop background copy, and send a completion message to the host 1100.

(S29007) The virtual storage apparatuses 1000L, 1000R thereafter change the pair status of the local copy pair information 6080 corresponding to the target local copy pair to a Suspend status.

Figure 30:
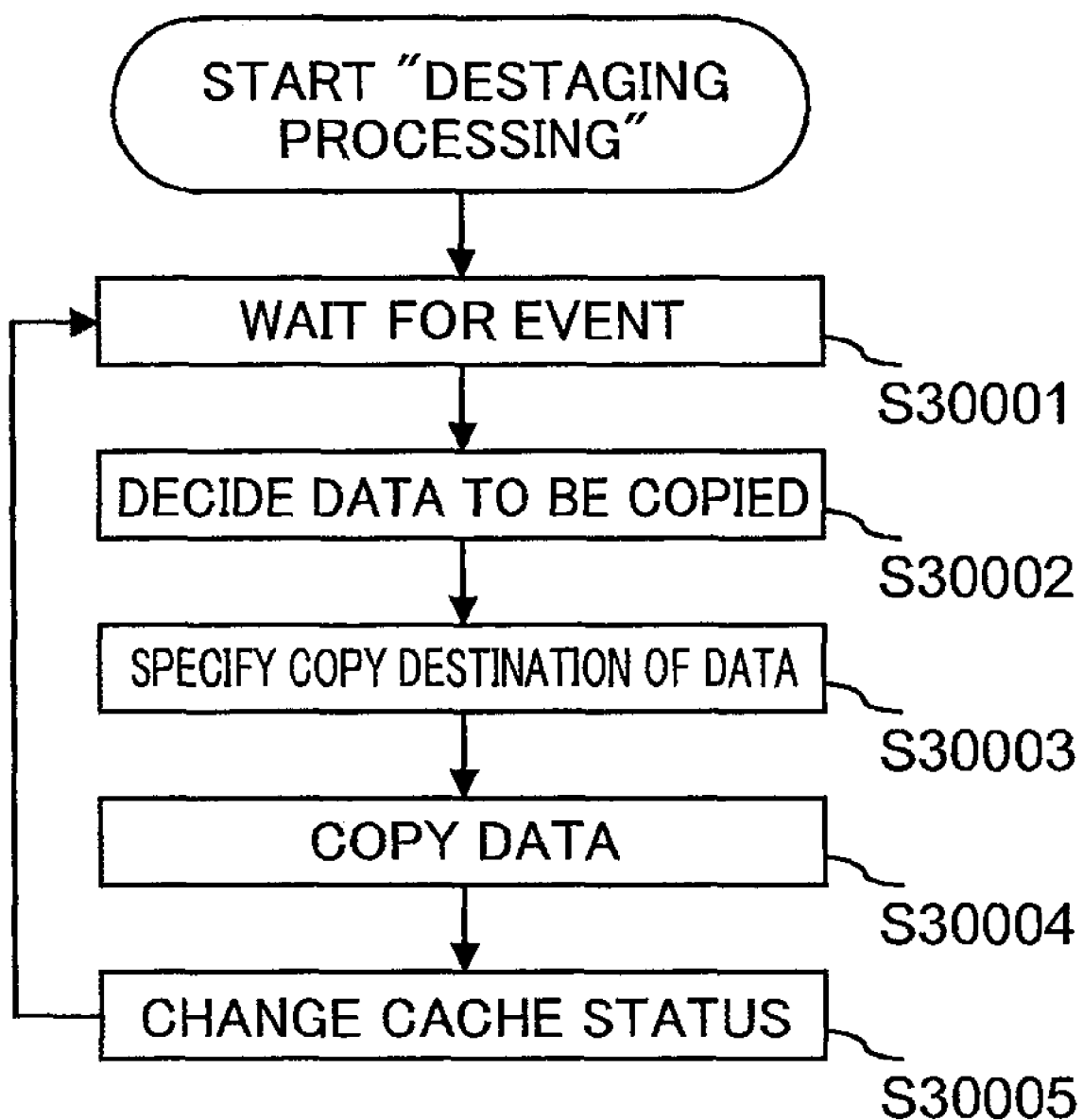
FIG. 30 is a flowchart explaining the destaging processing in the ninth embodiment.

Subsequently, operation of the destaging processing is explained with reference to FIG. 30. This destaging processing is performed in the virtual storage apparatuses 1000L, 1000R based on the destaging processing program as a subprogram of the I/O processing program 6020.

<Operation of Destaging Processing>

(S30001) The virtual storage apparatuses 1000L, 1000R determine, every given period of time, whether the total volume of data (data of a dirty status) which is write data in the cache memories 1020L, 1020R and which is data has not yet been copied to the HDD 1030 (FIG. 1) or the storage apparatuses 1500L, 1500R has reached a given volume. When an event indicating that the total volume reached a given volume, the routine proceeds to the subsequent step.

The virtual storage apparatuses 1000L, 1000R determine, every given period of time, whether the total volume of data of a dirty status in the cache memories 1020L, 1020R has reached a given volume. Here, data of a dirty status refers to the write data from the host 1100 stored in the cache memories 1020L, 1020R which is (A) data that has not yet been copied to the HDD 1030 of the virtual storage apparatuses 1000L, 1000R, or (B) data that has not yet been copied to the storage apparatuses 1500L, 1500R. When an event indicating that the data of a dirty status reached a given volume, the routine proceeds to the subsequent step.

(S30002) The virtual storage apparatuses 1000L, 1000R decide the data to be copied to the HDD 1030 or the storage apparatuses 1500L, 1500R based on an LRU algorithm or the like.

(S30003) The virtual storage apparatuses 1000L, 1000R refer to the cache management information 6220 (FIG. 6) and specify the copy destination of the data.

(S30004) The virtual storage apparatuses 1000L, 1000R copy the foregoing data.

(S30005) The virtual storage apparatuses 1000L, 1000R change the status of data to a clean status. Here, data of a clean status refers to the data stored in the cache memories 1020L, 1020R and which is (A) data in the HDD 1030 of the virtual storage apparatuses 1000L, 1000R, or (B) data that coincides with the data in the storage apparatuses 1500L, 1500R. Incidentally, instead of changing the status of data, data in the cache memories 1020L, 1020R may be discarded.

Subsequently, operation of the host 1100 during a failure (failure of the primary system or failure in the line between the primary and secondary systems) and operation of the write processing in the secondary virtual storage apparatus 1000R are explained with reference to FIG. 31.

<Operation of Host>

Figure 26:
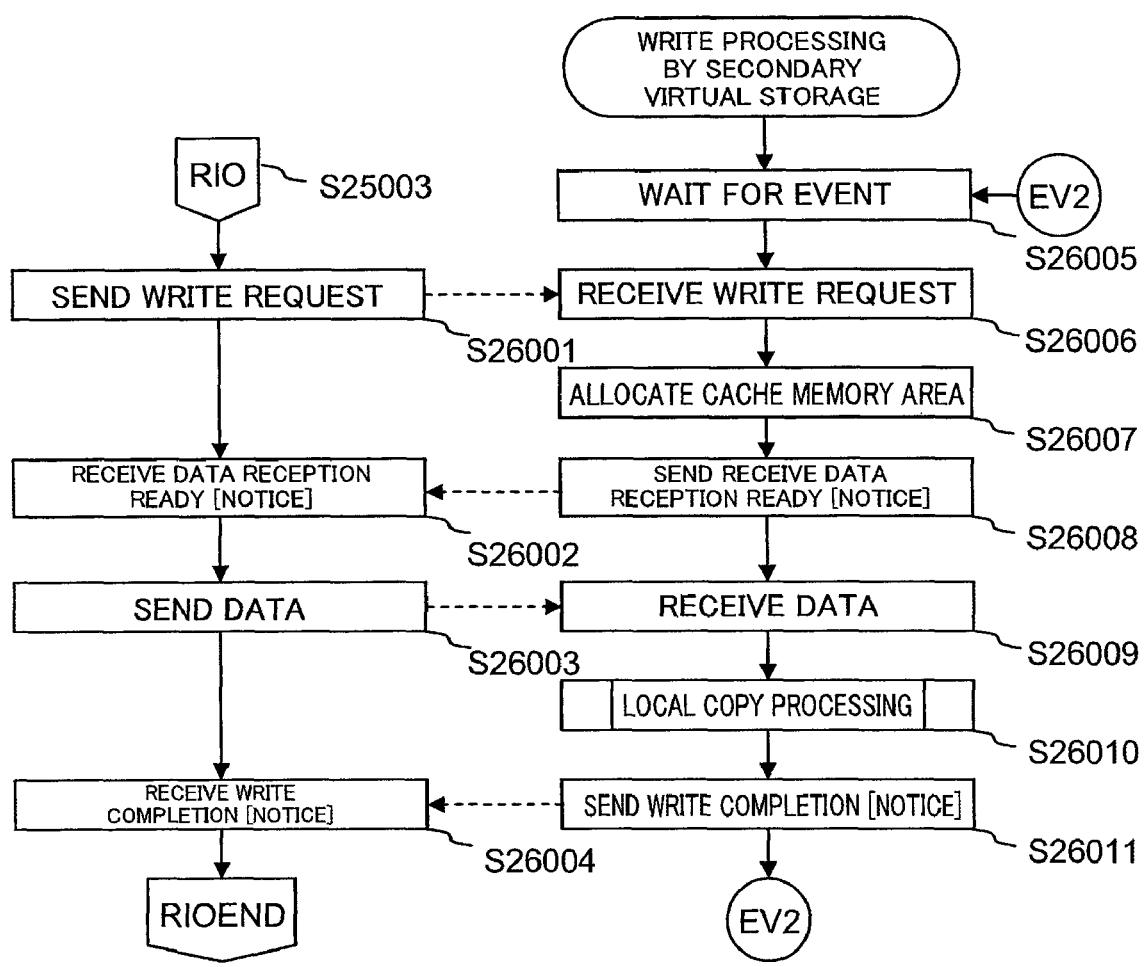
FIG. 26 is a flowchart explaining the write processing to be performed by a secondary virtual storage apparatus in the ninth embodiment.
Figure 31:
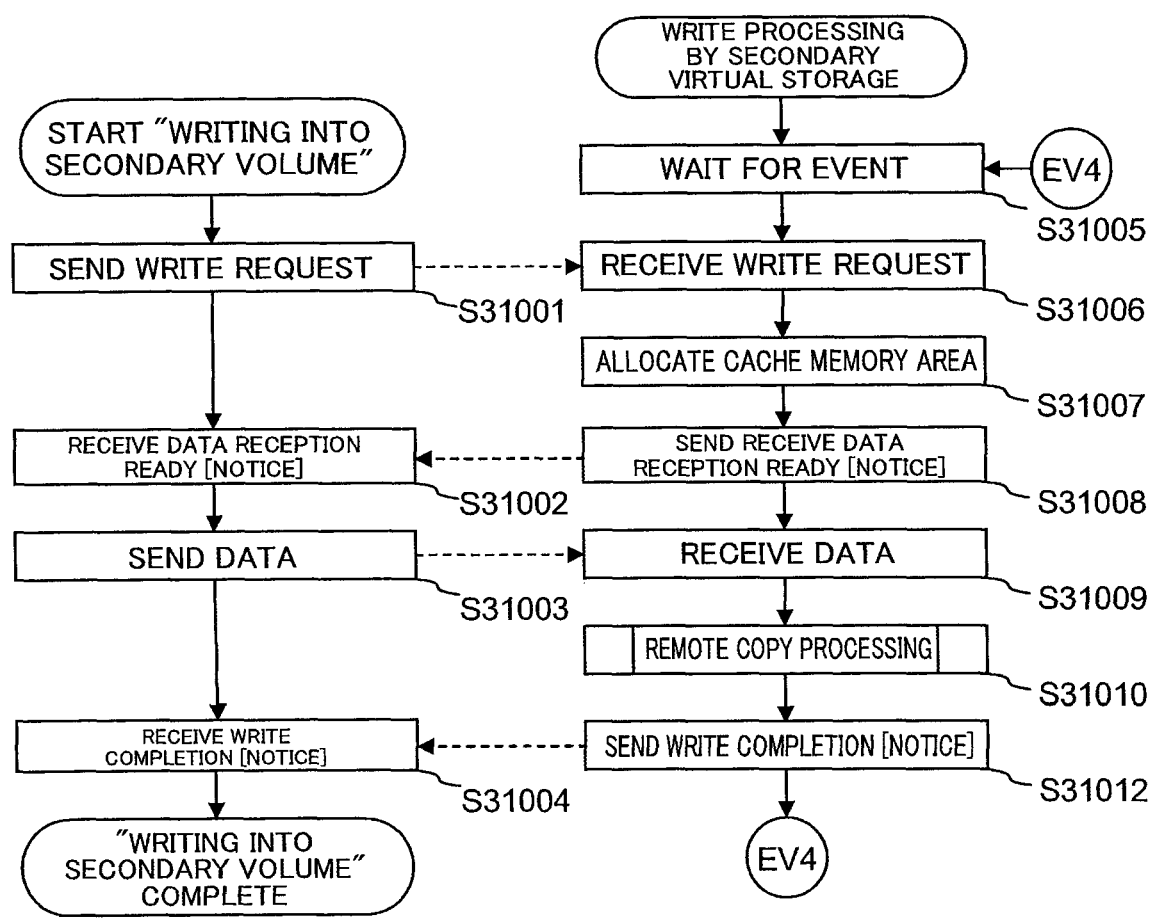
FIG. 31 is a flowchart explaining the write processing to be performed by the secondary virtual storage apparatus during a failure in the ninth embodiment.

The processing at step S31001 to step S31004 of FIG. 31 is the same as the processing at step S26001 to S26004 of FIG. 26.

<Operation of Write Processing by Secondary Virtual Storage Apparatus>

The processing at step S31005 to step S31009, step S310011 and step S31012 of FIG. 31 is the same as the processing at step SP26005 to step S26009, step S26010 and step S26011 of FIG. 26.

(10) Tenth Embodiment

Figure 32:
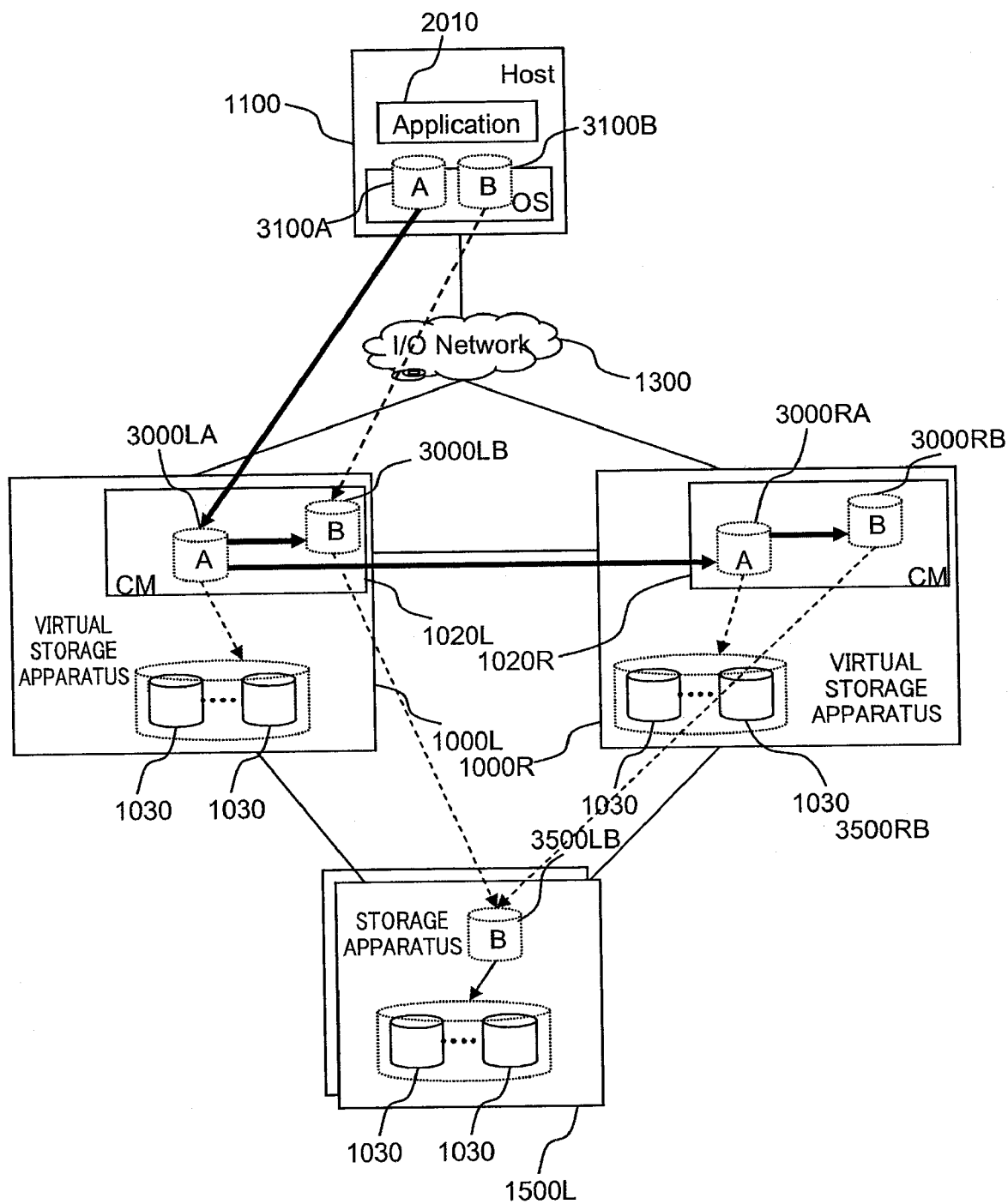
FIG. 32 is a conceptual diagram showing the overview of a tenth embodiment of the present invention.

This embodiment explains a local copy function that is different from the ninth embodiment. FIG. 32 shows a constitution example of the information system according to this embodiment.

Foremost, the difference in constitution between this embodiment and the ninth embodiment is that there is no storage apparatus 1500R, the virtual storage apparatus 1000R and the storage apparatus 1500 are connected via an I/O network, and the entities of the secondary volumes 3000LB, 3000RB are all mapped to become the volume 3500LB in the storage apparatus 1500L. The remaining constitution is the same as the ninth embodiment. As a result of adopting the foregoing constitution, it is possible to eliminate the physical storage apparatus required by the secondary volumes 3000LB, 3000RB.

The major difference in the processing operation between this embodiment and the ninth embodiment is that the standby-side virtual storage apparatus 1000R does not perform background copy to the volume 3500LB, and only operates the pair status and differential bitmap as control information concerning the pair through communication with the storage apparatus 1000L. The overview of this processing operation is explained below.

<Operation in Duplex Status>

The read/write processing in the Duplex status is explained below.

The read processing is the same as the read processing of the ninth embodiment. The write processing is as follows.

In the host 1100, the operating system that received the write request from the application program 2010 determines whether the active side is the virtual storage apparatus 1000L or the virtual storage apparatus 1000R based on the function of the I/O path manager 5000 (in relation to the write-target primary volume), and issues a write request to the active-side virtual storage apparatus 1000L. The virtual storage apparatus 1000L that received the write request receives write data, stores the write data in the cache memory 1020L, and sets the bit of the corresponding differential bitmap to 1 (ON).

Thereafter, the write data is copied from the primary volume 3000LA in the virtual storage apparatus 1000L to the primary volume 3000RA in the virtual storage apparatus 1000R based on the synchronous remote copy function. Incidentally, the method of synchronous remote copy is as described above.

The virtual storage apparatus 1000R that received the write data from the virtual storage apparatus 1000R based on the synchronous remote copy function stores the write data in the cache memory 1020R, and sets the bit of the differential bitmap corresponding to the write data to 1 (ON). The virtual storage apparatus 1000R thereafter sends a write completion report to the virtual storage apparatus 1000L, and the virtual storage apparatus 1000L that received the write completion report sends a write completion report to the host 1100.

Incidentally, the data written into the primary volume 3000LA of the virtual storage apparatus 1000L is background-copied to the secondary volume 3000LB asynchronously with the writing into the primary volume 3000LA. Unlike the write processing in the ninth embodiment, the data written into the primary volume 3000RA of the virtual storage apparatus 1000R is not subject to background copy.

The background copy processing in the virtual storage apparatus 1000L periodically monitors the differential bitmap, copies the data of areas recorded as having a differential (in other words, bit is ON) from the primary volume 3000LA to the secondary volume 3000LB, and clears the bit after the copy is complete (OFF or 0). Incidentally, this embodiment, unlike the write processing in the ninth embodiment, background copy is not performed on the side of the virtual storage apparatus 1000R.

Subsequently, unlike the write processing in the ninth embodiment, the virtual storage apparatus 1000L notifies the location information of the cleared bit to the virtual storage apparatus 1000R. The virtual storage apparatus 1000R that received the notice clears the differential bit in the virtual storage apparatus 1000R corresponding to the foregoing bit.

Incidentally, notification of the location information of the differential bit is conducted via a command device in the virtual storage apparatus 1000R. Nevertheless, in a constitution where the storage apparatuses 1500L, 1500R are connected via a LAN, the notification may also be made through communication via the LAN. In the following explanation, let it be assumed that the communication concerning the control information of functions such as the differential bit and pair status between the virtual storage apparatus 1000L and the virtual storage apparatus 1000R is conducted via the command device or the LAN.

When some kind of failure occurs and the read/write request to the active-side primary volume 3000LA can no longer be processed, the operating system of the host 1100, as with the ninth embodiment, continues access by switching the target of the read/write request to the primary volume 3000RA.

<Operation of Pair Split and Suspend Status>

When the host 1100 is to change the pair of the Duplex status of local copy to a Suspend status, it performs pair split as in the ninth embodiment. Incidentally, although stop processing of background copy is performed in pair split, in this embodiment, stop processing is not actually performed since background copy is not performed in the virtual storage apparatus 1000R.

The subsequent read/write request processing is roughly the same as in the Duplex status. The difference with the Duplex status is that the background copy processing does not operate in the virtual storage apparatus 1000R.

<Pair Creation>

The pair creation command is the same as the ninth embodiment in that it is implemented via the function I/F explained in the fourth to seventh embodiments.

(1) The host 1100 issues a pair creation command to the virtual storage apparatuses 1000L, 1000R via the function I/F. As a result, the pair creation processing is started at both the active-side and standby-side virtual storage apparatuses 1000L, 1000R.

(2) Both virtual storage apparatuses 1000L, 1000R set the pair status to an Initial-Copying status. The virtual storage apparatus 1000L turns ON all differential bitmaps and starts background copy. Unlike the ninth embodiment, the virtual storage apparatus 1000R turns ON all differential bitmaps, but does not perform background copy.

(3) Operation for clearing the differential bit corresponding to areas to which background copy in the virtual storage apparatus 1000L is complete, and the incidental operations (notification of the location information of the differential bit and clearing of the differential bit) are the same as the operations in the Duplex status.

(4) Unlike the ninth embodiment, when the background copy is completed until the end of the differential bitmap, the virtual storage apparatus 1000L sets the pair status to a Duplex status, and notifies the virtual storage apparatus 1000R that the pair status has changed to a Duplex status. The storage apparatus 1000R that received the notification sets the pair status to a Duplex status.

The read/write processing in the Initial-Copying status is the same as the read/write processing in the Duplex status.

<Pair Resynchronization>

The pair resynchronization command is the same as the ninth embodiment in that it is implemented via the function I/F described in the fourth to seventh embodiments.

(1) The host 1100 issues a pair resynchronization command to the virtual storage apparatuses 1000L, 1000R via the function I/F. As a result, the pair resynchronization processing is started at both the active-side and standby-side virtual storage apparatuses 1000L, 1000R.

(2) The virtual storage apparatus 1000L sets the pair status to a Duplex-Pending status, and starts background copy. Unlike the ninth embodiment, the virtual storage apparatus 1000R does not perform background copy.

(3) When the background copy is completed until the end of the differential bitmap, the virtual storage apparatus 1000L sets the pair status to a Duplex status. Nevertheless, unlike the ninth embodiment, only the virtual storage apparatus 1000L performs this processing. The virtual storage apparatus 1000L thereafter notifies the virtual storage apparatus 1000R that the pair status has changed to a Duplex status. The virtual storage apparatus 1000R that received the notification sets the pair status to a Duplex status.

The read/write processing in the Duplex-Pending status is the same as the read/write processing in the Duplex status.

Subsequently, the operation where a write request is issued from the host 1100 to the virtual storage apparatus 1000L to which the local copy function was applied is explained in detail with reference to the flowchart.

The specific processing contents of the write processing in the primary virtual storage apparatus 1000L are the same as FIG. 24. The specific processing contents of the remote copy processing are the same as the operation of FIG. 25.

Operation at step S25003 of FIG. 25 and operation of the write processing of the secondary virtual storage apparatuses 1000L, 1000R in the tenth embodiment are now explained with reference to FIG. 33. This write processing is performed in the primary virtual storage apparatus 1000L and the secondary virtual storage apparatus 1000R based on the I/O processing program 6020 (write processing program (not shown) as a subprogram of FIG. 6).

Figure 33:
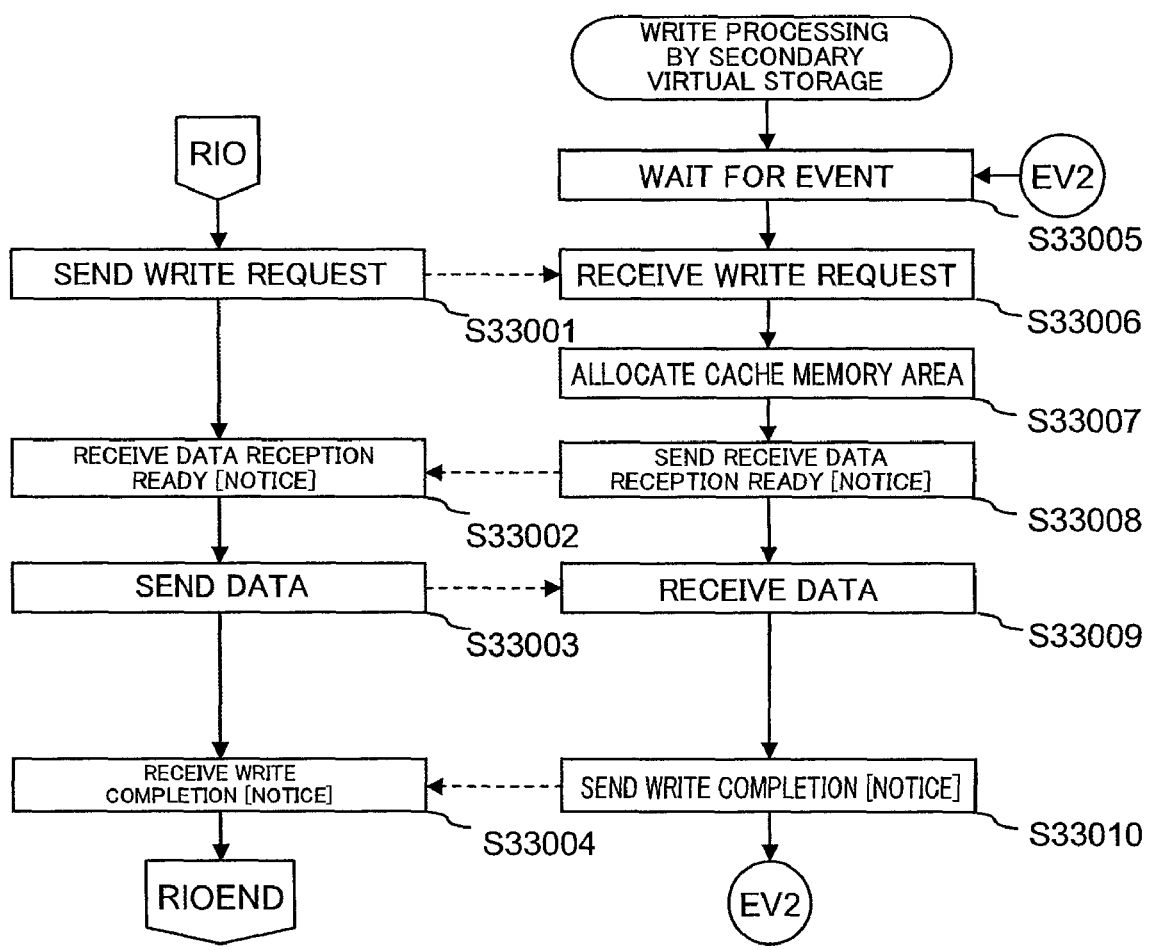
FIG. 33 is a diagram showing the write processing to be performed by the secondary virtual storage apparatus in the tenth embodiment.

The processing at S33001 to S33009 and S33010 of FIG. 33 is the same as the processing at S26001 to S26009 and S260011 of FIG. 26, and, FIG. 33 differs from FIG. 26 in that step S26010 (local copy processing during the write processing of the secondary virtual storage apparatus 1000R) of FIG. 26.

Figure 34:
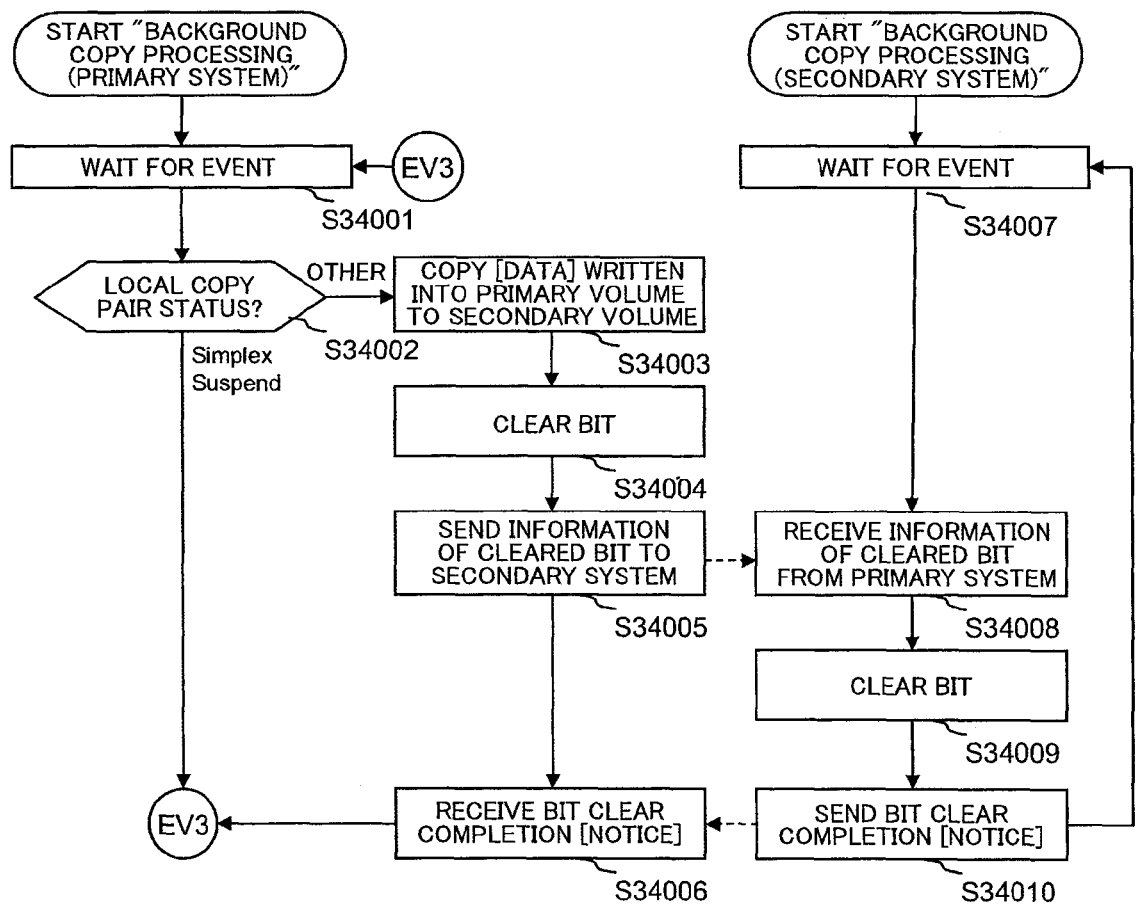
FIG. 34 is a flowchart explaining the background copy processing in the tenth embodiment.

Subsequently, operation of the background copy processing (primary) and the background copy processing (secondary) in the tenth embodiment is explained with reference to FIG. 34.

<Operation of Primary Virtual Storage Apparatus>

(S34001) The primary virtual storage apparatus 1000L periodically monitors the differential bitmap, and waits for an event where the differential bit is updated to ON (or 1).

(S34002) Upon detecting a differential bit that is ON (or 1), the virtual storage apparatus 1000L refers to the pair status of the local copy pair information 6080 (FIG. 23) corresponding to the differential bit, and performs processing corresponding to the pair status. When the pair status is a Simplex status or a Suspend status, the routine returns to S34001 and waits once again for an event where the differential bit is updated to ON (or 1).

(S34003) When the pair status is other than the foregoing pair statuses, the virtual storage apparatus 1000L copies the write data to the primary volume stored in the cache memory 1020L or the HDD 1030 (FIG. 3) corresponding to the differential bit to a corresponding location in the cache memory 1020L of the secondary volume. Incidentally, the primary virtual storage apparatus 1000L allocates a cache memory area for storing the write data before the foregoing copy.

(S34004) The primary virtual storage apparatus 1000L clears the differential bit clear (OFF or updates to 0).

(S34005) The primary virtual storage apparatus 1000L sends the information of the differential bit cleared in the previous step to the secondary virtual storage apparatus 1000R, and makes a request so that the differential bit is similarly cleared in the secondary virtual storage apparatus 1000R.

(S34006) The primary virtual storage apparatus 1000L receives a differential bit clear completion report from the secondary virtual storage apparatus 1000R, and thereafter returns to step S34001 and waits for an event.

<Operation of Secondary Virtual Storage Apparatus>

(S34007) The secondary virtual storage apparatus 1000R waits for an event of the differential bit clear request from the primary virtual storage apparatus 1000L.

(S34008) The secondary virtual storage apparatus 1000R receives information of the differential bit clear from the primary virtual storage apparatus 1000L.

(S34009) The secondary virtual storage apparatus 1000R clears the differential bit of the local copy pair information 6080 (FIG. 23) corresponding to the differential bit.

(S31010) The secondary virtual storage apparatus 1000R sends a differential bit clear completion report to the primary virtual storage apparatus 1000L.

Figure 35:
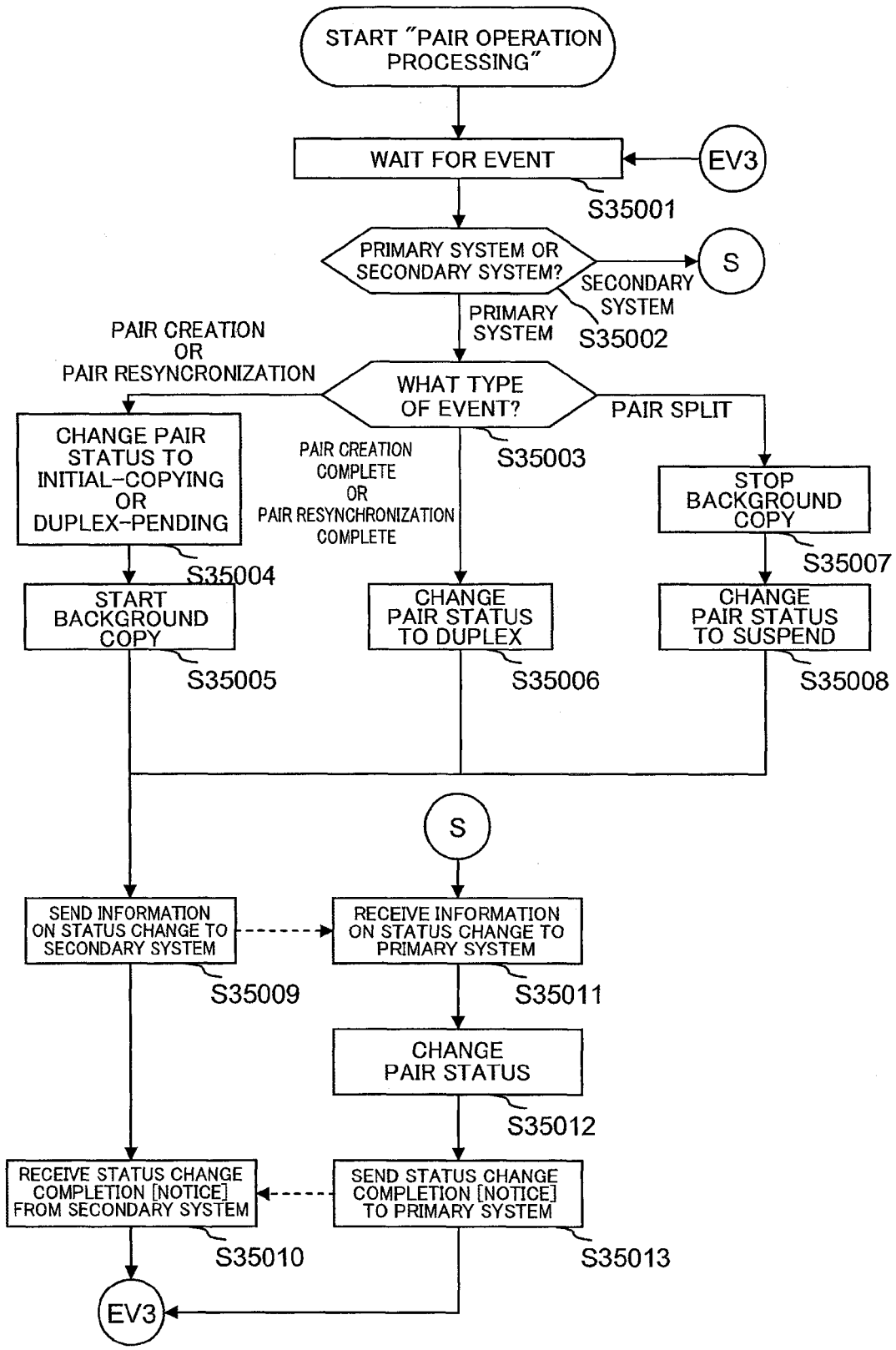
FIG. 35 is a flowchart explaining the pair operation processing in the tenth embodiment.

Subsequently, operation of the pair operation processing is explained with reference to FIG. 35.

<Operation of Pair Operation Processing>

(S35001) The primary or secondary virtual storage apparatus 1000L, 1000R waits for an event concerning the pair operation. Here, as the types of events, there are a pair creation command, a pair resynchronization command, pair creation complete, pair resynchronization complete, a pair split command, and a pair status change command from the primary system.

(S35002) The virtual storage apparatuses 1000L, 1000R determine whether they are primary or secondary system concerning the pair operation target volume, and perform the subsequent processing according to the determination result.

<Operation of Primary Virtual Storage Apparatus>

(S35003) When the determination is a primary system, the primary virtual storage apparatus 1000L determines the type of event, and performs the subsequent processing according to the type of event.

(S35004) When the type of event is a pair creation command or a pair resynchronization command, the primary virtual storage apparatus 1000L changes the pair status of the local copy pair information 6080 corresponding to the command from the Initial-Copying status to the Duplex-Pending status.

(S35005) The primary virtual storage apparatus 1000L starts background copy of the local copy pair corresponding to the foregoing command.

(S35006) When the type of event is pair creation complete or pair resynchronization complete, the primary virtual storage apparatus 1000L changes the pair status of the local copy pair information 6080 corresponding to the foregoing command to the Duplex status.

(S35007) When the type of event is a pair split operation, the primary virtual storage apparatus 1000L stops background copy of the local copy pair corresponding to the foregoing command. The operation of pair split is as explained in the ninth embodiment.

(S35008) The primary virtual storage apparatus 1000L changes the pair status of the local copy pair information 6080 corresponding to the foregoing command to the Suspend status.

(S35009) The primary virtual storage apparatus 1000L thereafter sends the change information of the pair status to the secondary virtual storage apparatus 1000R.

(S35009) The primary virtual storage apparatus 1000L receives a pair status change completion report from the secondary virtual storage apparatus 1000R, and thereafter returns to S35001 and waits for an event.

<Operation of Secondary Virtual Storage Apparatus>

(S35011) When the determination at S35002 is a secondary system, the secondary virtual storage apparatus 1000R receives change information of the pair status from the primary virtual storage apparatus 1000L.

(S35012) The secondary virtual storage apparatus 1000R changes the pair status of the local copy pair information 6080 based on the foregoing change information.

(S35013) The secondary virtual storage apparatus 1000R sends a pair status change completion report to the primary virtual storage apparatus 1000L, thereafter returns to S35001 and waits for an event.

Figure 36:
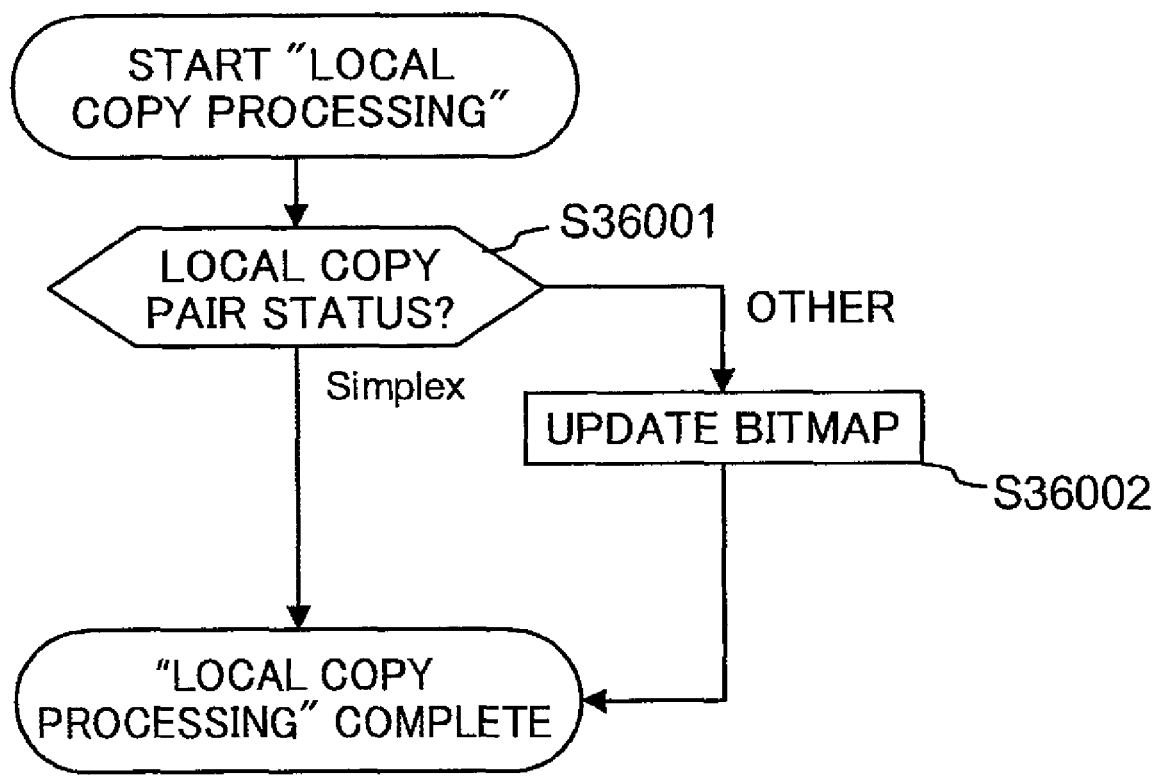
FIG. 36 is a flowchart explaining the local copy processing in the tenth embodiment.

FIG. 36 shows the processing contents of the local copy processing according to the tenth embodiment. This local copy processing is performed in the primary virtual storage apparatus 1000L and the secondary virtual storage apparatus 1000R based on the local copy processing program 6100 (FIG. 6), and the contents thereof are similar to the ninth embodiment.

Figure 37:
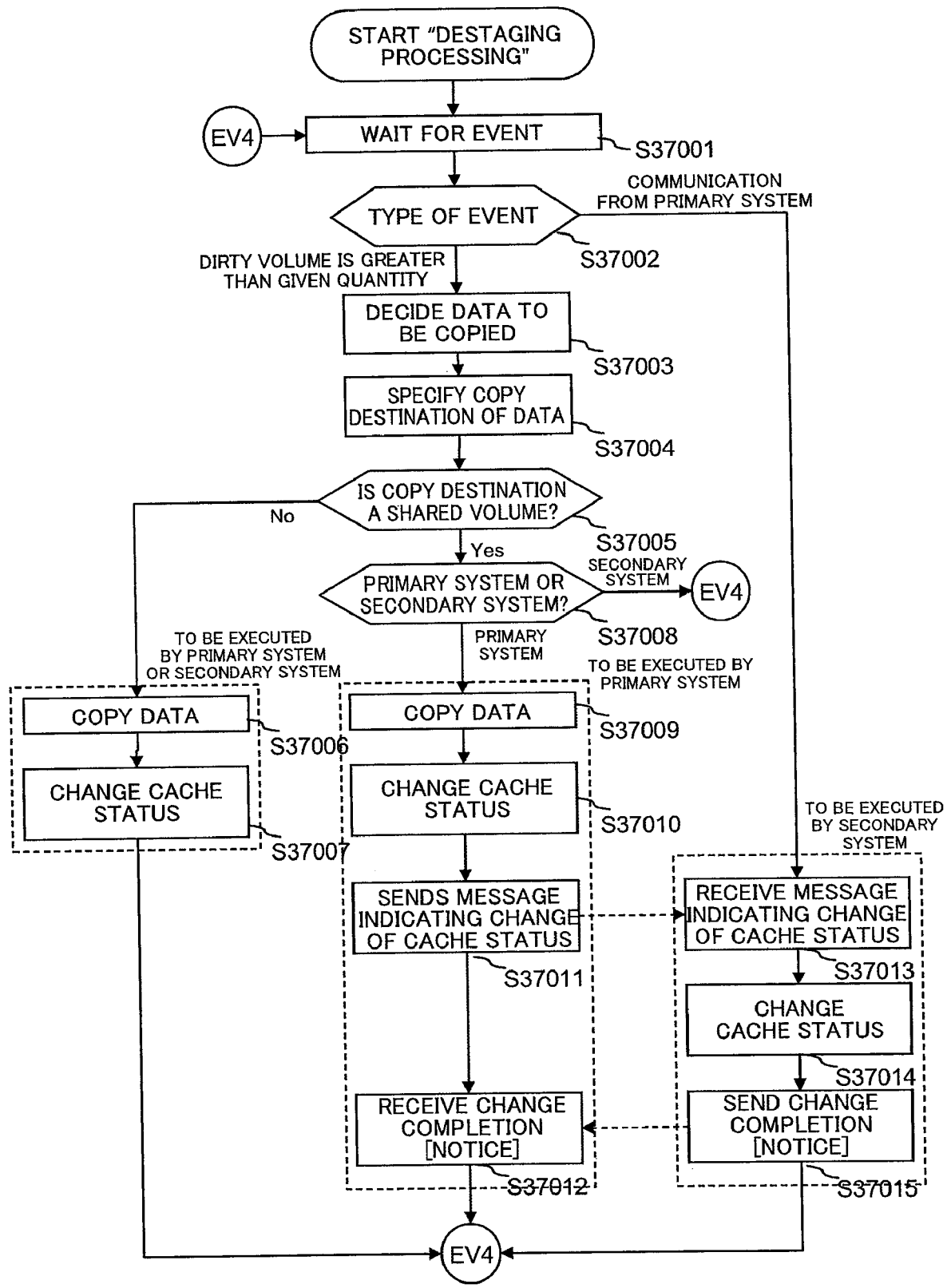
FIG. 37 is a flowchart explaining the destaging processing in the tenth embodiment.

Subsequently, the destaging processing in the tenth embodiment is explained with reference to FIG. 37. This destaging processing is performed in the virtual storage apparatuses 1000L, 1000R based on a destaging processing program (not shown) as a subprogram of the I/O processing program 6020 (FIG. 6).

(S37001) The virtual storage apparatuses 1000L, 1000R wait for an event concerning destaging. As the types of events, there is an event where the total volume of data (data of a dirty status) that has not yet been copied to the HDD 1030 (FIG. 1) or the storage apparatuses 1500L, 1500R becoming greater than a given volume, and an event of receiving communication from the primary virtual storage apparatus.

(S37003) In the case of an event where the total volume of data of a dirty status become greater than a given volume, the virtual storage apparatuses 1000L, 1000R decide the data to be copied to the HDD 1030 or the storage apparatuses 1500L, 1500R among the data of a dirty status.

(S37004) The virtual storage apparatuses 1000L, 1000R refer to the cache management information 6220 and specify the copy destination of the copy-target data.

(S37005) Subsequently, whether the specified copy destination is a shared volume in the storage apparatus 1500L is determined.

(S37006) If the foregoing determination result is not a shared volume, the (primary or secondary) virtual storage apparatus 1000L, 1000R copies the data in the cache memories 1020L, 1020R to the specified copy destination.

(S37007) The (primary or secondary) virtual storage apparatus 1000L, 1000R changes the status of data in the cache memories 1020L, 1020R to a clean status (status where the write data is reflected in the HDD 1030 or the storage apparatuses 1500L, 1500R). Incidentally, instead of changing the status of data, data in the cache memories may be discarded. The routine thereafter returns to S37001 and waits once again for an event.

(S37008) When the determination result at S37005 is a shared volume, the virtual storage apparatuses 1000L, 1000R determine whether they are primary or secondary systems concerning the copy-target data.

(S37009) When the determination result is a secondary system, the routine returns to step S37001 and waits for an event. In other words, destaging is not performed in this case.

(S37009) When the determination result is a primary system, the primary virtual storage apparatus 1000L copies the data in the cache memory 1020L to the specified copy destination.

(S37010) The primary virtual storage apparatus 1000L changes the status of data in the cache memory 1020L to a clean status. Incidentally, instead of changing the status of data, data in the cache memory 1020L may be discarded.

(S37011) The primary virtual storage apparatus 1000L notifies the secondary virtual storage apparatus 1000R that the status of data in the cache memory 1020L has been changed (or the data has been discarded).

(S37012) The primary virtual storage apparatus 1000L receives a data status change completion report (or data discard completion report) of data in the cache memory 1020R from the secondary virtual storage apparatus 1000R. Thereafter, the routine returns to step S37001 and waits once again for an event.

(S37013) When the type of event at step S37002 is communication from the primary virtual storage apparatus 1000L, the secondary virtual storage apparatus 1000R receives the data status change completion report (or data discard completion report) of data in the cache memory 1020L from the secondary virtual storage apparatus 1000L.

(S37014) The secondary virtual storage apparatus 1000R changes the status of data (or discards data) in its cache memory 1020R based on the received information.

(S34015) The secondary virtual storage apparatus 1000R notifies the primary virtual storage apparatus 1000L of the data status change completion (or data discard completion). Thereafter, the routine returns to step S37001 and waits once again for an event.

(11) Eleventh Embodiment

In this embodiment, an example is explained where the logical snapshot function is applied to the volumes in the storage apparatuses 1500L, 1500R.

A logical snapshot function is a function that is similar to the local copy function, and a function for providing the user with replication data at the time designated by the user. Nevertheless, the secondary volume having replicated data is a virtual volume provided using the write data subsequent to the replication creation command stored in the area of the real volume belonging to the pool, and data of the primary volume. The entity of the virtual secondary volume is retained in a pool that is an aggregate of real volumes. The relationship of the primary volume and the secondary volume may be referred to as a snapshot pair or simply as a pair. In the logical snapshot function, from the perspective that a logical volume having the same contents as the primary volume at the stationary point is not actually created, the secondary volume is virtual. The logical snapshot function, unlike the local copy function described above, does not need a secondary volume that is the same size as the size of the primary volume. Thereby, it is possible to eliminate storage apparatuses (HDDs and the like) required for retaining the contents of the secondary volume.

In this embodiment, the availability can also be improved by coordinating the active-side storage apparatus and the standby-side storage apparatus regarding this logical snapshot function.

Figure 38:
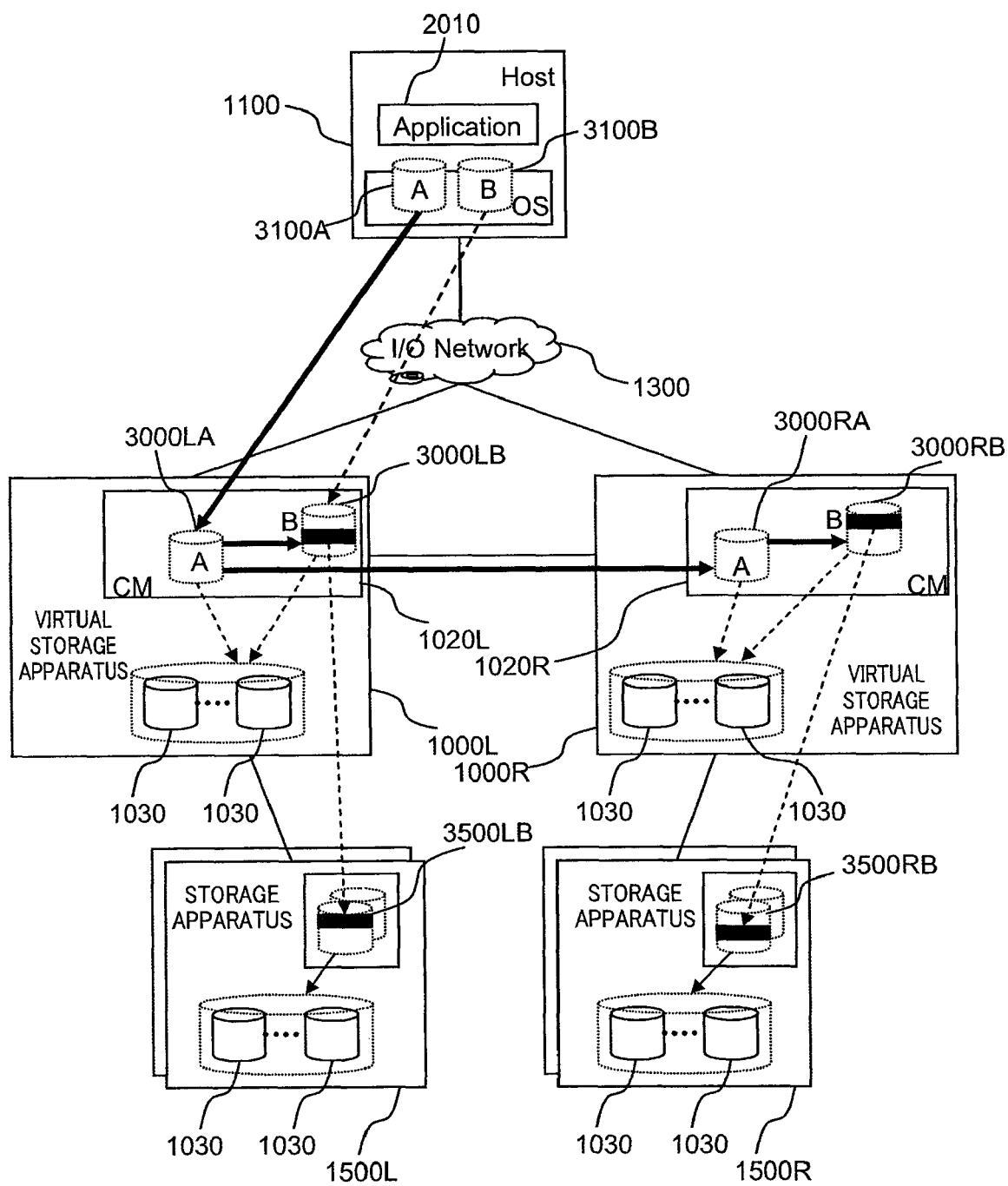
FIG. 38 is a conceptual diagram showing the overview of an eleventh embodiment of the present invention.

FIG. 38 shows an embodiment of the snapshot function. Overview of this embodiment is now explained with reference to FIG. 38.

In FIG. 38, the host 1100 is coupled to the virtual storage apparatus 1000L and the virtual storage apparatus 1000R. Further, the virtual storage apparatus 1000L is coupled to the storage apparatus 1500L, and the virtual storage apparatus 1000R is coupled to the storage apparatus 1500R. Further, the snapshot function and the differential bitmap (information showing the status of differential between the primary volume at the stationary point and the primary volume at the current time) and the virtual address/real address mapping table (table for managing the location of the entity of the virtual secondary volume) 6130 (FIG. 6) are executed and managed by the virtual storage apparatus 1000L and the virtual storage apparatus 1000R. Further, the primary volume 3000LA in the virtual storage apparatus 1000L and the primary volume 3000RA in the virtual storage apparatus 1000R are constituted to form a remote copy pair.

This embodiment shows a constitution example where the primary volume is in the virtual storage apparatuses 1000L, 1000R and the pool is in the storage apparatuses 1500L, 1500R.

Here, as the local copy pair information, which is information for managing the snapshot function, the local copy pair information 6080 explained in the ninth embodiment with reference to FIG. 23 is used. However, it should be noted that the significance of the differential bitmap in the local copy pair information 6080 is different from the ninth embodiment. Subsequently, the virtual address/real address mapping table 6130 as the other information for managing the snapshot function is explained with reference to FIG. 39. The virtual address/real address mapping table 6130 contains the following types of information.

(A) Virtual address (A-1) Volume identifier: Information for uniquely identifying the secondary volume in the virtual storage apparatus.

(A-2) Address: Information showing the start address of data of the virtual address.

(A-3) Data length: Information showing the data length of data of the virtual address.

(B) Real address (B-1) Apparatus identifier: Information for uniquely identifying the storage apparatus retaining real data corresponding to the virtual address. In this embodiment, the information will suffice so as long as it is able to identify the virtual storage apparatuses 1000L, 1000R and the storage apparatuses 1500L, 1500R.

(B-2) Volume identifier: Information for uniquely identifying the volumes in the storage apparatus retaining the real data corresponding to the virtual address.

(B-3) Address: Information showing an address in the volume retaining the read data corresponding to the virtual address.

Subsequently, overview of the operation of the logical snapshot function is explained.

<Logical Snapshot Creation Command>

When the user using the host 1100 issues a logical snapshot creation command, a creation command is issued to the active-side virtual storage apparatus 1000L and the standby-side virtual storage apparatus 1000R according to the methods described in the previous embodiments. The virtual storage apparatuses 1000L, 1000R that received the creation command prepares a virtual secondary volume, and allocates differential bitmaps that are all 0 (meaning no differential) (in the local copy pair information 6080) and the virtual address/real address mapping table 6130.

<Read Processing to Primary Volume>

This is the same as the previous embodiments.

<Write Processing to Primary Volume>

In the host 1100, the operating system that received the write request from the application program 2010 determines whether the active side is the virtual storage apparatus 1000L or the storage apparatus 1000R based on the function of the I/O path manager 5000 (FIG. 38) (in relation to the write-target primary volume), and issues a write request to the active-side storage apparatus 1000L. The virtual storage apparatus 1000L that received the write request checks the differential bitmap of the write-target address. If the result is 1, data sent from the host 1100, together with the write request, is stored as write data of the primary volume in the cache memory 1020L. Meanwhile, if the result is 0, the following Copy-On-Write processing is performed for using the pre-updated data of the primary volume 3000LA as data for the secondary volume 3000LB.

(Step 1) The storage area of the real volume belonging to the pool is allocated.

(Step 2) The pre-updated data is copied from the primary volume 3000LA to the storage area while using the cache memory 1020L.

(Step 3) The pool management information (virtual address/real address mapping table 6130 (FIG. 39)) for managing the storage destination of the pre-updated data to be saved is updated to clarify which area of the real volume in the pool that data has been stored. Further, the bit of the differential bitmap corresponding to the data is updated to 1.

(Step 4) The received write data is stored as data to the address of the primary volume 3000LA in the cache memory 1020L, and a write completion reply is returned.

In parallel with this, the write data is copied from the primary volume 3000LA in the virtual storage apparatus 1000L to the primary volume 3000RA in the storage apparatus 1000R based on the remote copy function, and similar processing is performed. Thus, the virtual storage apparatuses 1000L, 1000R respectively manage the virtual address/real address mapping table 6130 and the differential bitmap.

<Read Processing to Secondary Volume>

In the host 1100, the operating system that received the write request from the application program 2010 determines whether the active side is the virtual storage apparatus 1000L or the virtual storage apparatus 1000R based on the function of the I/O path manager 5000 (FIG. 5) (in relation to the write-target secondary volume), and issues a read request to the active-side virtual storage apparatus 1000L. The virtual storage apparatus 1000L that received the read request checks the differential bitmap recorded in the primary volume 3000LA. As a result, if the bit of the read-target address is 0, data stored in the same address of the primary volume 3000LA is returned to the host 1100, and the operating system returns the data to the application 2010. Meanwhile, when the bit of the read-target address is 1, the operating system refers to the virtual address/real address mapping table 6130, decides the location of the pre-updated data concerning the read-target address of the primary volume 3000LA, and returns the data from the real volume belonging to the pool to the host 1100 (application program 2010).

<Write Processing to Secondary Volume>

In the host 1100, the operating system that received the write request from the application program 2010 determines whether the active side is the virtual storage apparatus 1000L or the virtual storage apparatus 1000R based on the function of the I/O path manager 5000 (FIG. 5) (in relation to the write-target secondary volume), and issues a write request to the active-side virtual storage apparatus 1000L. The virtual storage apparatus 1000L that received the write request checks the differential bitmap of the write-target address allocated to the primary volume 3000LA. If the result is 1, by referring to the virtual address/real address mapping table 6130, the operating system searches the storage area of a real volume in the pool storing the pre-updated data of the address of the primary volume 3000LA, and stores the write data in the area. Meanwhile, when the result is 0, the following processing is performed.

(A) An area of the real volume belonging to the pool is allocated.

(B) Write data is stored in the allocated area and the virtual address/real address mapping table 6130 is updated in order to clarify which area of the real volume in the pool that data has been stored.

(C) The bit corresponding to the address of the differential bitmap is updated to 1.

In parallel with this, the write data is copied from the primary volume 3000LA in the virtual storage apparatus 1000L to the primary volume 3000RA in the storage apparatus 1000R based on the remote copy function, and similar processing is performed. Thus, the virtual storage apparatuses 1000L, 1000R respectively manage the virtual address/real address mapping table 6130 and the differential bitmap.

<Copy-After-Write Processing>

The virtual storage apparatuses 1000L, 1000R may execute the following Copy-After-Write processing in substitute for the Copy-On-Write processing to be executed upon writing into the primary volumes 3000LA, 3000RA.

(Step 1) The received write data is stored as data to the address of the primary volumes 3000LA, 3000RA in the cache memories 1020L, 1020R, and a write completion reply is returned. However, destaging of the write data is inhibited.

(Step 2) A storage area of the real volume belonging to the pool is allocated.

(Step 3) The pre-updated data is coped from the primary volumes 3000LA, 3000R to the storage area while using the cache memories 1020L, 1020R.

(Step 4) The pool management information (virtual address/real address mapping table 6130 (FIG. 39)) for managing the storage destination of the saved pre-updated data is updated to clarify which area of the real volume in the pool that data has been stored.

(Step 5) Destaging of write data that was inhibited is permitted.

<Failure>

When some kind of failure occurs and the read/write request to the active-side primary volume 3000LA and the secondary volume 3000LB can no longer be processed, as described above, the operating system of the host 1100 is able to continue access by switching the read/write request target to the standby-side primary volume 3000RA or the secondary volume 3000RB. Incidentally, as described above, in order to issue a write request to the same storage apparatuses 1000L, 1000R, preferably, the primary volumes 3000LA, 3000RA and the secondary volumes 3000LB, 3000RB of the snapshot function simultaneously switch the secondary volumes 3000LB, 3000RB when switching of the primary volumes 3000LA, 3000RA is required, and contrarily switch the primary volumes 3000LA, 3000RA as well when switching of the secondary volumes 3000LB, 3000RB is required.

Subsequently, details of the operation of the logical snapshot function are explained with reference to the flowchart. The write processing of the primary virtual storage apparatus 1000L is the same as the processing shown in FIG. 24 in the ninth embodiment. Further, the remote copy processing is the same as the processing shown in FIG. 25 in the ninth embodiment. The write processing of the secondary virtual storage apparatus 1000R is the same as the processing shown in FIG. 26 in the ninth embodiment. The write processing of the secondary virtual storage apparatus 1000R is the same as the processing shown in FIG. 31. The destaging processing is the same as the processing shown in FIG. 30 in the ninth embodiment.

The operation of the local copy processing 6100 in the Copy-On-Write mode according to this embodiment is now explained with reference to FIG. 40.

<Operation of Local Copy Processing (Copy-On-Write Mode)>

(S40001) The pair status of the local copy pair information 6080 (FIG. 23) is referred to for deciding the subsequent processing according to the pair status of the copy pair of the local copy target. The processing is ended if the pair status is a Simplex status or a Duplex status.

(S40002) When the pair status is a Suspend status, the background copy described later is executed.

Figure 41:
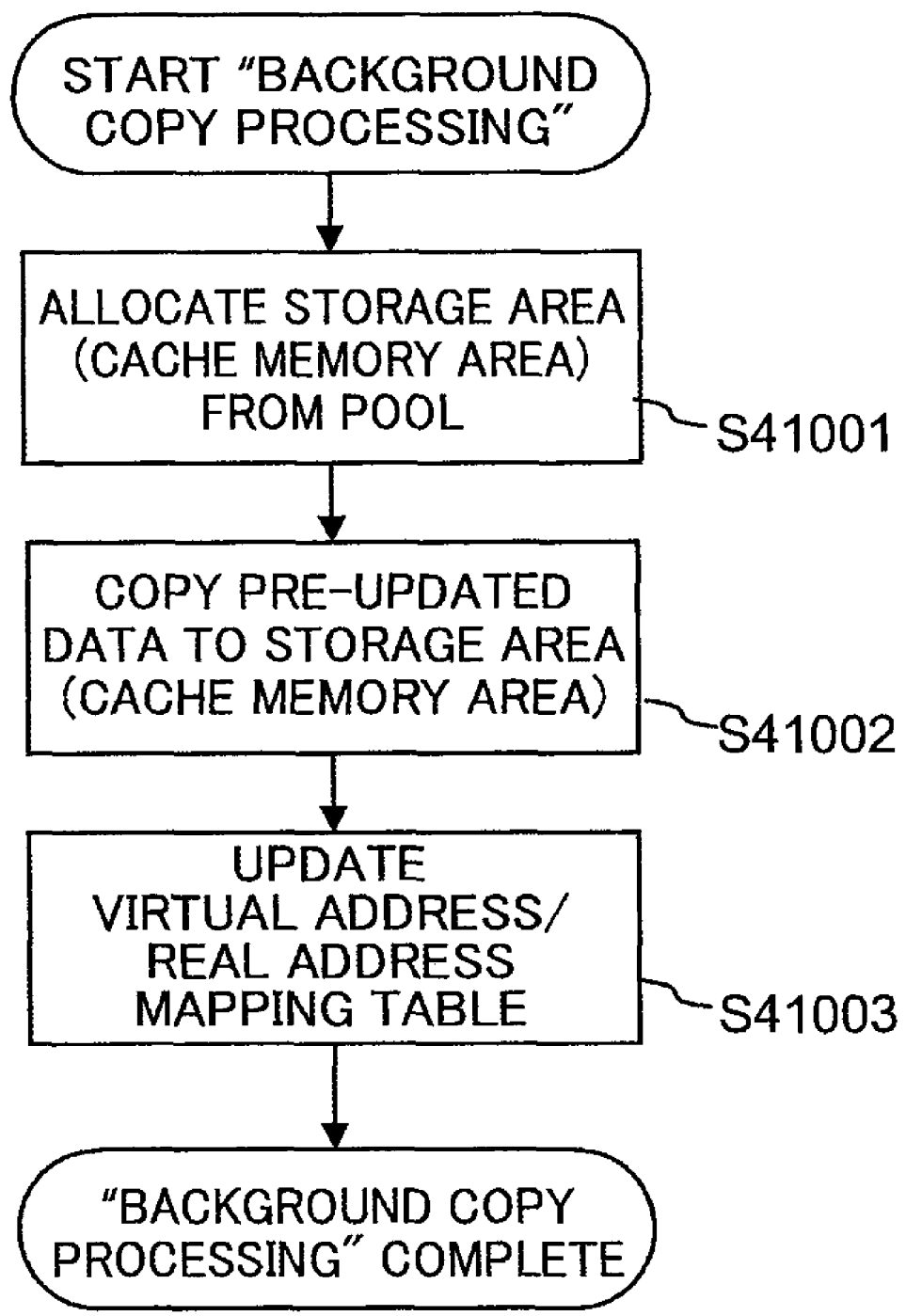
FIG. 41 is a flowchart explaining the background copy processing (Copy-On-Write mode) in the eleventh embodiment.

The operation of the background copy processing in the Copy-On-Write mode according to this embodiment with reference to FIG. 41.

<Operation of Background Copy Processing (Copy-On-Write Mode)>

(S41001) The virtual storage apparatuses 1000L, 1000R allocate a storage area of the real volume belonging to the pool in the storage apparatuses 1500L, 1500R. Simultaneously, the cache memory area corresponding to the storage area is allocated.

(S41002) The virtual storage apparatuses 1000L, 1000R copy the pre-updated data in the primary volume corresponding to the write location in the write processing of the primary virtual storage apparatus 1000L of the write processing of the secondary virtual storage apparatus 1000R to the allocated cache memory area.

(S41003) The virtual storage apparatuses 1000L, 1000R update the bit of the differential bitmap corresponding to the write processing to 1, and add the line for retaining the following data in the virtual address/real address mapping table 6130 (FIG. 39).

(A) Virtual address (A-1) Volume identifier: Setting the identifier of the secondary volume of the corresponding copy pair of the writing.

(A-2) Address: Setting the data address of the writing.

(A-3) Data length: Setting the data length of the writing.

(B) Real address (B-1) Apparatus identifier: Setting the identifier of the storage apparatus retaining the real volume belonging to the pool allocated at step S41001 of FIG. 41.

(B-2) Address: Setting the address of the data location in the real volume allocated at step S41001 of FIG. 41.

Figure 42:
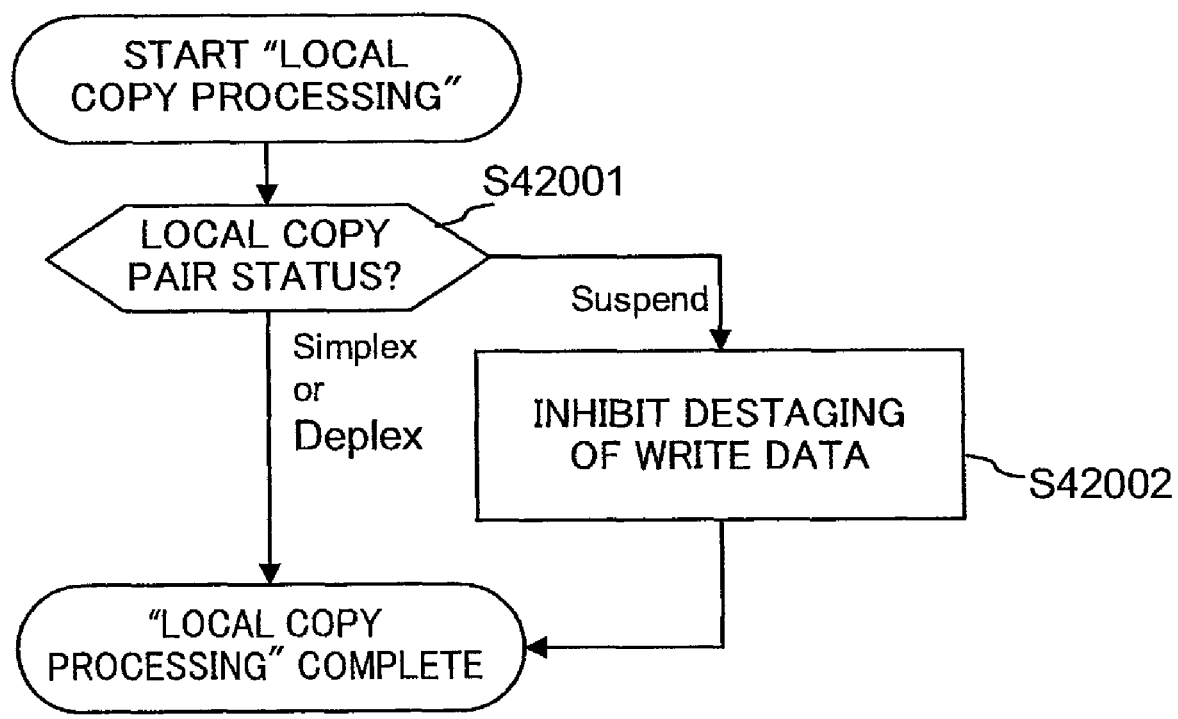
FIG. 42 is a flowchart explaining the local copy processing (Copy-After-Write mode) in the eleventh embodiment.

The operation of the local copy processing 6100 in the Copy-After-Write mode according to this embodiment is now explained with reference to FIG. 42.

<Operation of Local Copy Processing (Copy-After-Write Mode)>

(S42001) The pair status of the local copy pair information 6080 is referred to, and the subsequent processing according to the pair status of the copy pair of the local copy target is decided. The processing is ended if the pair status is a Simplex status or a Duplex status.

(S42002) When the pair status is a Suspend status, destaging concerning the write data of the write processing target in the write processing of the primary or secondary virtual storage apparatus 1000L, 1000R is inhibited.

Figure 43:
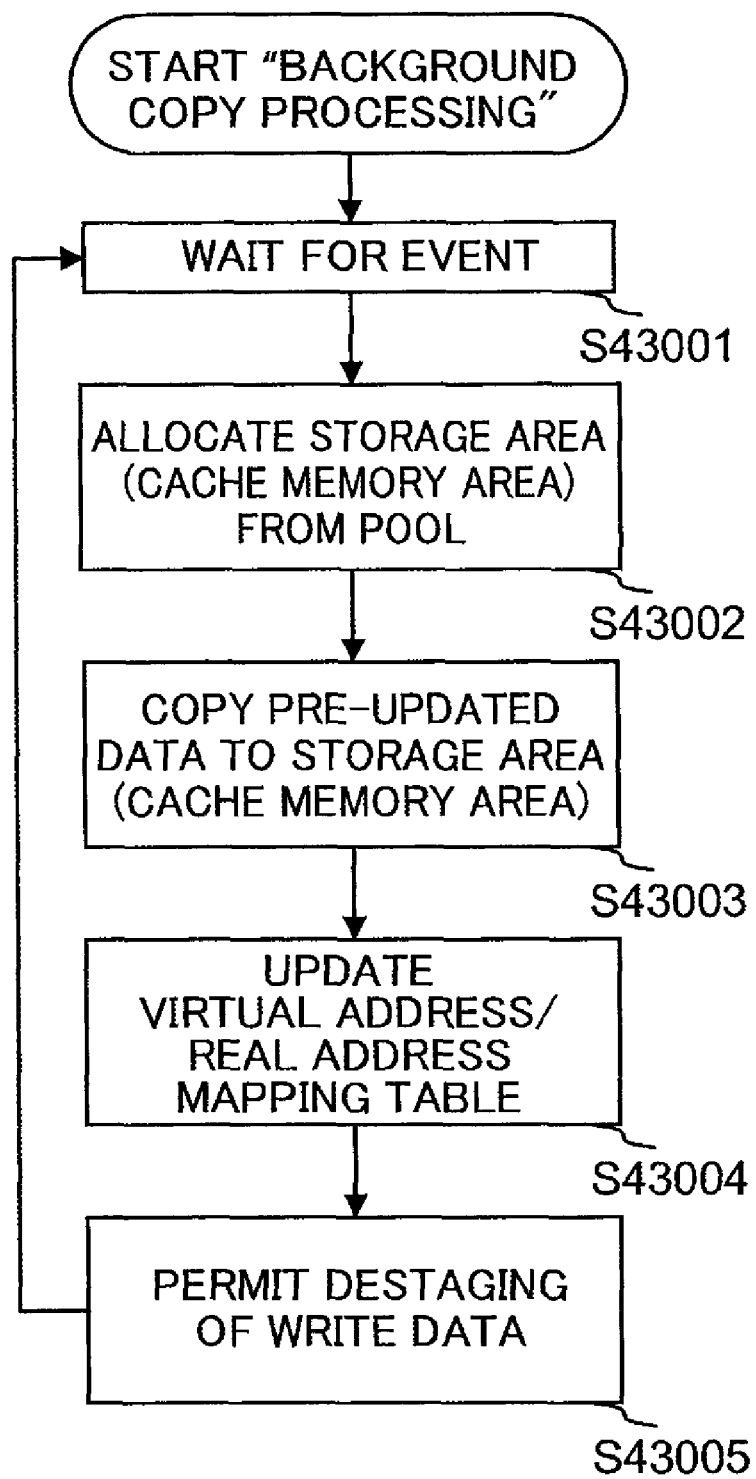
FIG. 43 is a flowchart explaining the background copy processing (Copy-After-Write mode) in the eleventh embodiment.

The operation of the background copy processing based on the background copy processing program 6110 (FIG. 6) in the Copy-After-Write mode according to this embodiment is now explained with reference to FIG. 43.

<Operation of Background Copy Processing (Copy-After-Write Mode)>

(S43001) The virtual storage apparatuses 1000L, 1000R monitor whether the write data in which destaging is inhibited in the local copy processing (Copy-After-Write mode) exists in the primary volumes 3000LA, 3000RA of the pair of the logical snapshot. When an event indicating that write data in which destaging is inhibited is discovered, the routine proceeds to the subsequent step.

(S43002) Same as step S41001.
(S43003) Same as step S41002.
(S43004) Same as step S41003.
(S43005) Destaging of the write data is permitted.

(12) Twelfth Embodiment

Figure 44:
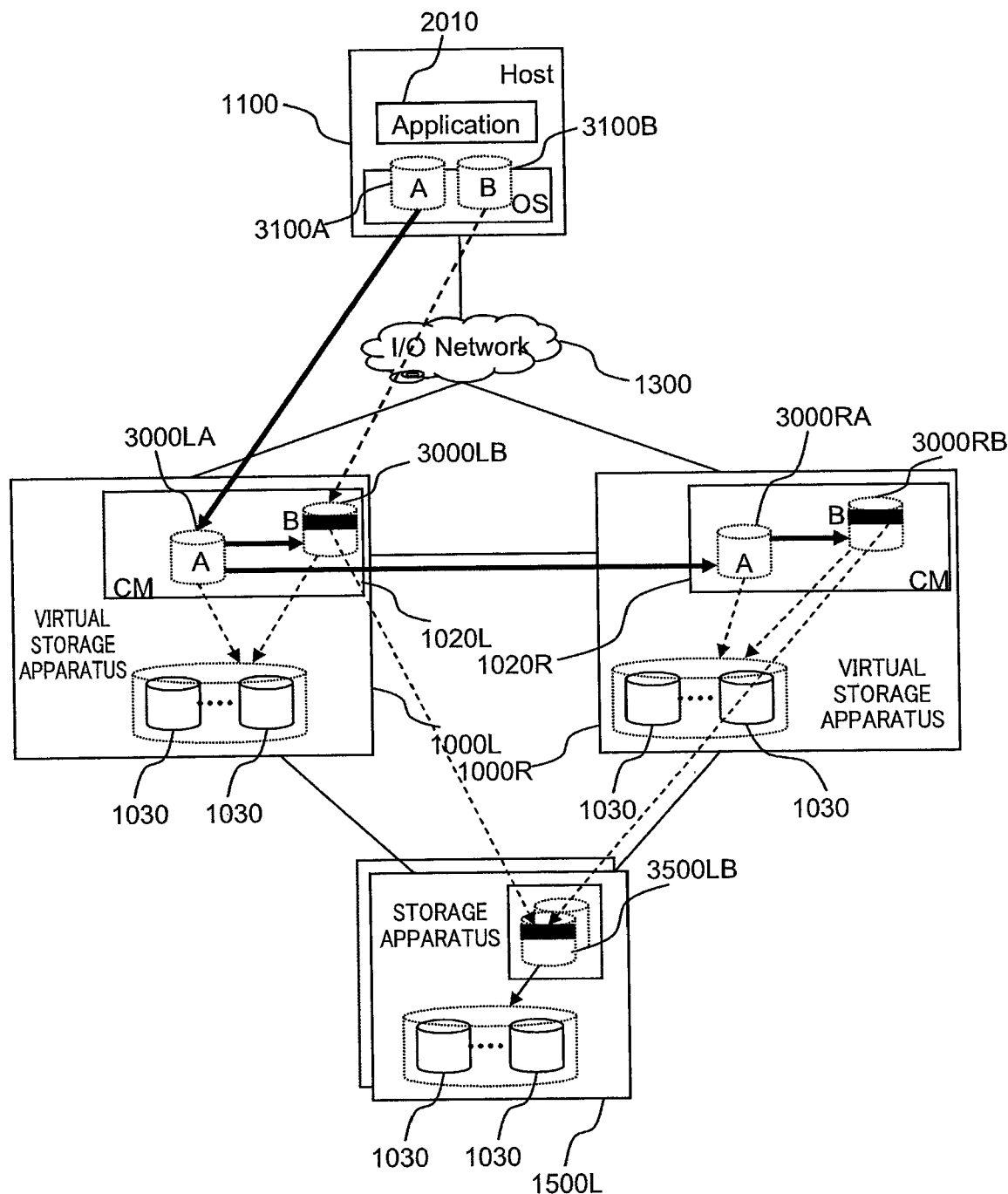
FIG. 44 is a conceptual diagram showing the overview of a twelfth embodiment of the present invention.

An embodiment of a logical snapshot function that is different from the tenth embodiment is now explained. FIG. 44 shows one constitution example of this embodiment.

Foremost, the difference in the constitution between this embodiment and the tenth embodiment, the storage apparatus 1500R does not exist, and no real area of the virtual secondary volumes 3000LB, 3000RB is allocated to the area in the pool of any storage apparatus 1500L. The remaining constitution is the same as the tenth embodiment.

Incidentally, in this embodiment, since the virtual storage apparatus 1000L and the virtual storage apparatus 1000R use the real volume in the common storage apparatus 1500L as the common pool, and, unlike the tenth embodiment, the real volume is limited to the constitution within the storage apparatus 1500L.

As a result of adopting the foregoing constitution, it is possible to eliminate the physical storage apparatus (such as an HDD) required by the pool.

The major difference of the processing operation in this embodiment and the tenth embodiment is as follows.

(A) Normally, in substitute for the standby-side virtual storage apparatus 1000R not performing writing from the cache memory 1020R into the real volume of the storage apparatus 1500L, the active-side virtual storage apparatus 1000L may convey this to the standby-side virtual storage apparatus 1000R during the destaging of the data corresponding to the real volume in the primary volume 3000LA, the secondary volume 3000LB, and the pool, and the standby-side virtual storage apparatus 1000R thereby discards the data in the cache memory 1020R.

(B) The virtual storage apparatus 1000L notifies the virtual storage apparatus 1000R of the update to the virtual address/real address mapping table 6130 (FIG. 6), and the virtual storage apparatus 1000R that received the notification updates the virtual address/real address mapping table 6130.

Further, in substitute of the processing of (A), caching of data corresponding to the real volume in the secondary volume 3000LB or the pool can be invalidated. Here, since the saving of the pre-updated data based on the foregoing Copy-On-Write processing includes the storage of data in the real volume in the pool until the writing in the primary volume 3000LA is complete, the performance will deteriorate. But since this does not occur in the Copy-After-Write mode, this is preferable.

Detailed operation of the logical snapshot processing according to this embodiment is now explained with reference to the flowchart.

The operation of the write processing of the primary virtual storage apparatus 1000L in this embodiment is the same as the operation of FIG. 24. The operation of the write processing of the secondary virtual storage apparatus 1000R in this embodiment is the same as the operation of FIG. 33. The operation of the remote copy processing in this embodiment is the same as FIG. 25. The operation of the destaging processing in this embodiment is the same as FIG. 37.

Figure 40:
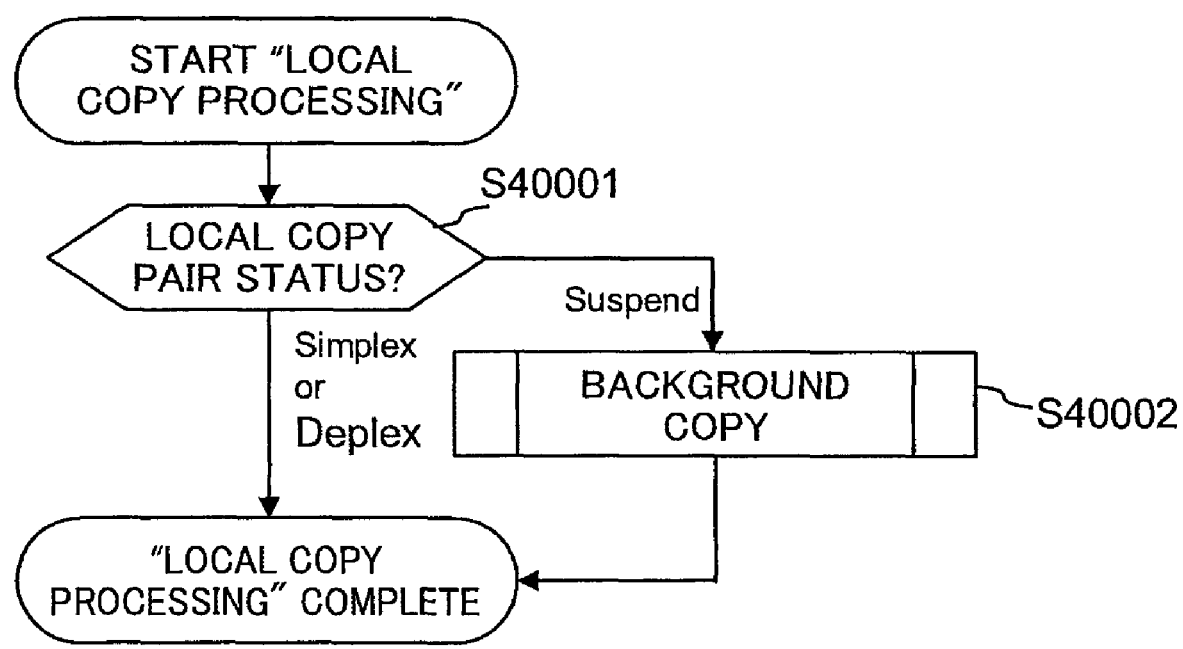
FIG. 40 is a diagram showing the local copy processing (Copy-On-Write mode) in the eleventh embodiment.

The local copy processing of the Copy-On-Write mode in this embodiment is the same as the operation of FIG. 40. Incidentally, this local copy processing is executed only in the primary virtual storage apparatus 1000L.

The operation of the background copy processing in the Copy-On-Write mode according to this embodiment is now explained with reference to FIG. 45.

<Operation of Background Copy Processing (Primary Virtual Storage Apparatus)>

Operation from step S45001 to step S45003 is the same as the operation from step S42001 to step S42003.

(S45004) The primary virtual storage apparatus 1000L sends update information of the virtual address/real address mapping table 6130 (FIG. 39) at S45003 and update information of the bit of the differential bitmap corresponding to the writing are sent to the secondary virtual storage apparatus 1000R.

(S45005) The primary virtual storage apparatus 1000L receives an update completion report of the virtual address/real address mapping table 6130 and the differential bitmap from the secondary virtual storage apparatus 1000R.

<Operation of Background Copy Processing (Secondary Virtual Storage Apparatus)>

(S45006) The secondary virtual storage apparatus 1000R waits for an update request event of the virtual address/real address mapping table 6130 and the differential bitmap from the primary virtual storage apparatus 1000L.

(S45007) The secondary virtual storage apparatus 1000R receives the update information of the virtual address/real address mapping table 6130 and the differential bitmap from the primary virtual storage apparatus 1000L.

(S45008) The secondary virtual storage apparatus 1000R updates the virtual address/real address mapping table 6130 and the differential bitmap based on the received information.

(S45009) The secondary virtual storage apparatus sends the update completion report of the virtual address/real address mapping table 6130 and the differential bitmap to the primary virtual storage apparatus 1000L, and thereafter returns to step S45006 and waits once again for an event.

The local copy processing of the Copy-After-Write mode in this embodiment is the same as the eleventh embodiment. Incidentally, this local copy processing is executed only by the primary virtual storage apparatus 1000L.

Figure 46:
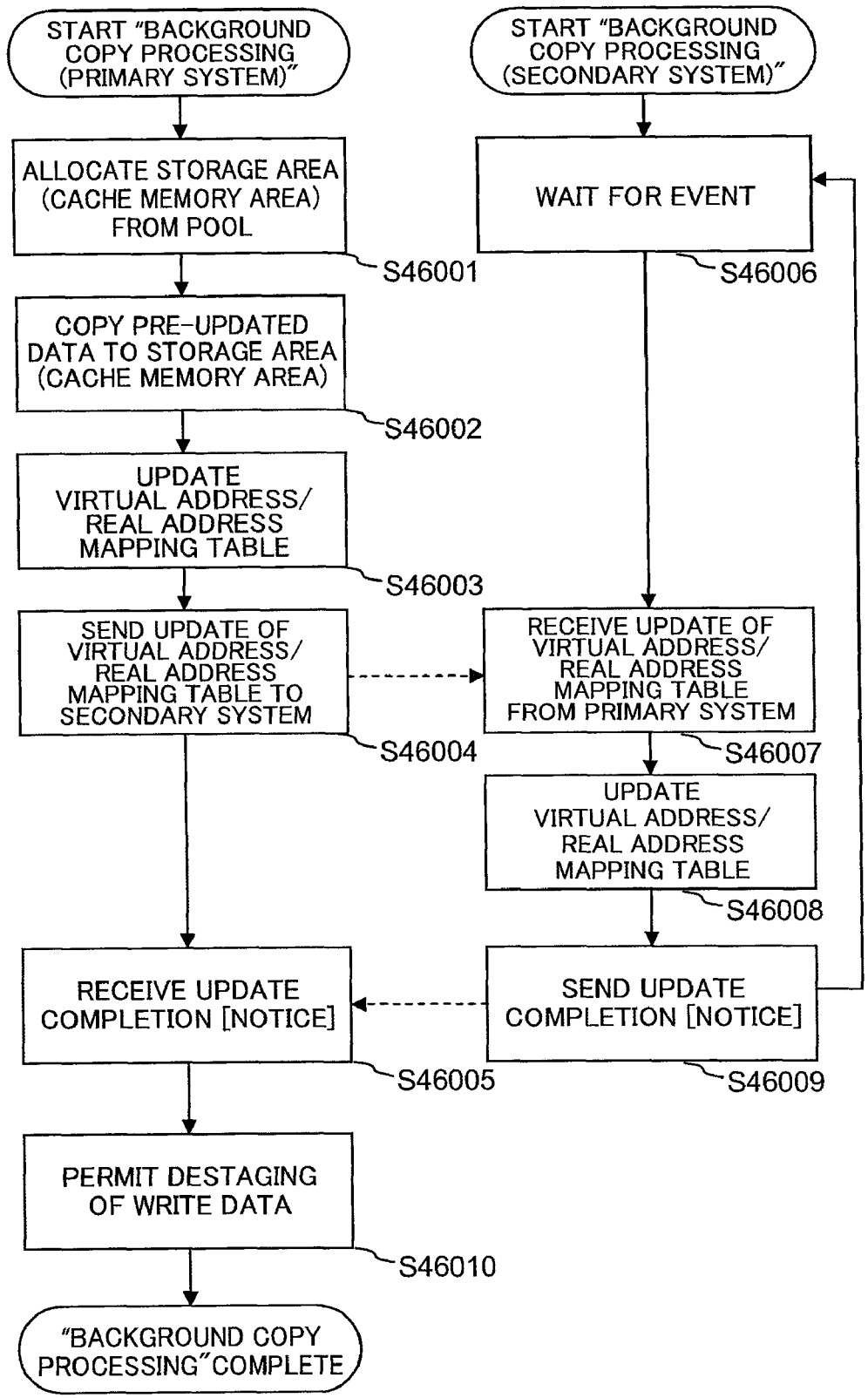
FIG. 46 is a flowchart explaining the background copy processing (Copy-After-Write mode) in the twelfth embodiment.

The operation of the background copy processing in the Copy-After-Write mode according to this embodiment is now explained with reference to FIG. 46.

<Operation of Background Copy Processing (Primary Virtual Storage Apparatus)>

Figure 45:
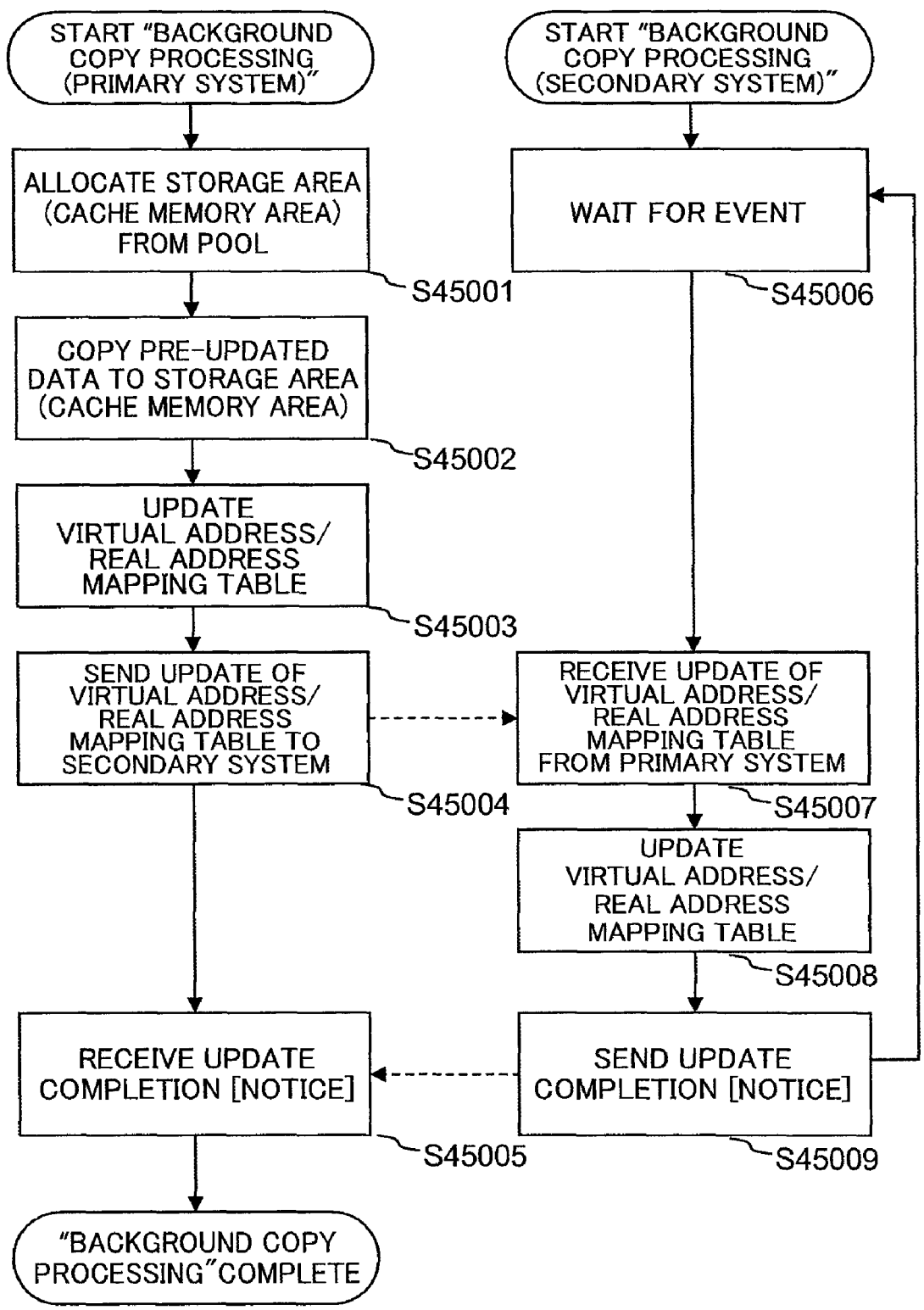
FIG. 45 is a flowchart explaining the background copy processing (Copy-On-Write mode) in the twelfth embodiment.

The operation from step S46001 to step S46005 is the same as the operation from step S45001 to step S45005 of FIG. 45.

(S46010) The primary virtual storage apparatus 1000L permits the destaging concerning the write data to be processed.

<Operation of Background Copy Processing (Secondary Virtual Storage Apparatus)>

The operation from step S46006 to step S46009 is the same as the operation from step S45006 to step S45009 of FIG. 45.

Several embodiments of the present invention were described above, but these embodiments are merely illustrations for explain the present invention and are not intended to limit the scope of invention in any way. The present invention may be worked in various other modes without deviating from the gist of this invention. For example, a nonvolatile memory can be used in substitute for the HDD 1030 and the cache memories 1020L, 1020R. As the nonvolatile memory, for example, various types of nonvolatile memories such as a flash memory (specifically, for instance, a NAND-type flash memory), MRAM (Magnetoresistive Random Access Memory), and PRAM (Parameter Random Access Memory) can be used.

What is claimed is:

1. An information system, comprising:
a computer as a host system;
a first storage apparatus coupled to said computer and including a first primary volume and a first secondary volume;
a second storage apparatus coupled to said first storage apparatus and said computer and including a second primary volume and a second secondary volume,
wherein said first and second storage apparatuses execute remote copy of copying data written into said first primary volume from said computer to said second primary volume,
wherein at least one of said first and second storage apparatuses executes local copy of copying said data written into said first or second primary volume in a self-storage apparatus to corresponding said first or second secondary volume, and
wherein said computer switches the destination of a write request of said data from said first storage apparatus to said second storage apparatus in case of a failure occurring in said first storage apparatus;
a third storage apparatus coupled to said first storage apparatus and including a third volume constituted of a storage area provided by a mounted Hard Disk Drive (HDD); and
a fourth storage apparatus coupled to said second storage apparatus and including a fourth volume constituted of a storage area provided by a mounted HDD;
wherein said first and second secondary volumes are virtual volumes mapped to said third or fourth volume, and
wherein said first and second storage apparatuses respectively copy said data to be copied to said first or second secondary volume to said third or fourth volume.

2. The information system according to claim 1, wherein said third storage apparatus is further coupled to said second storage apparatus, and
wherein alternatively only one of said first and second storage apparatuses copies data to be copied to said first or second secondary volume to said third volume.

3. The information system according to claim 2, wherein said first and second storage apparatuses respectively retain local copy control information for controlling said local copy,
wherein said first storage apparatus notifies update information to said second storage apparatus upon updating said local copy control information, and
wherein said second storage apparatus updates said local copy information in its possession according to a notice from said first storage apparatus.

4. A data transfer method in an information system comprising:
a computer as a host system, a first storage apparatus coupled to said computer, and a second storage apparatus coupled to said first storage apparatus and said computer,
wherein said first storage apparatus includes a first primary volume and a first secondary volume;
wherein said second storage apparatus includes a second primary volume and a second secondary volume;
said data transfer method comprising:
a first step of said first and second storage apparatuses executing remote copy of copying data written into said first primary volume from said computer to said second primary volume, and at least one of said first and second storage apparatuses executing local copy of copying said data written into said first or second primary volume in a self-storage apparatus to corresponding said first or second secondary volume; and
a second step of said computer switching the destination of a write request of said data from said first storage apparatus to said second storage apparatus in case of a failure occurring in said first storage apparatus,
wherein said information system further comprises a third storage apparatus coupled to said first storage apparatus and including a third volume constituted of a storage area provided by a mounted Hard Disk Drive (HDD), and a fourth storage apparatus coupled to said second storage apparatus and including a fourth volume constituted of a storage area provided by a mounted HDD,
wherein said first and second secondary volumes are virtual volumes mapped to said third or fourth volume, and
wherein, at said first step, said first and second storage apparatuses respectively copy said data to be copied to said first or second secondary volume to said third or fourth volume.

5. The data transfer method according to claim 4, wherein said third storage apparatus is further coupled to said second storage apparatus, and
wherein, at said first step, alternatively only one of said first and second storage apparatuses copies data to be copied to said first or second secondary volume to said third volume.

6. The data transfer method according to claim 5, wherein said first and second storage apparatuses respectively retain local copy control information for controlling said local copy,
wherein said first storage apparatus notifies update information to said second storage apparatus upon updating said local copy control information, and
wherein said second storage apparatus updates said local copy information in its possession according to a notice from said first storage apparatus.

7. An information system, comprising:
a computer as a host system:
a first storage apparatus coupled to said computer and including a first primary volume and a first secondary volume; and
a second storage apparatus coupled to said first storage apparatus and said computer and including a second primary volume and a second secondary volume, wherein said first and second storage apparatuses execute remote copy of copying data written into said first primary volume from said computer to said second primary volume, wherein at least one of said first and second storage apparatuses saves pre-updated data of said first or second primary volume updated following a creation command of a logical snapshot in said first or second secondary volume, and wherein said computer switches the destination of a write request of said data from said first storage apparatus to said second storage apparatus in case of a failure occurring in said first storage apparatus;

a third storage apparatus coupled to said first storage apparatus and including a third volume constituted of a storage area provided by a mounted Hard Disk Drive (HDD); and a fourth storage apparatus coupled to said second storage apparatus and including a fourth volume constituted of a storage area provided by a mounted HDD, wherein said first and second secondary volumes are virtual volumes mapped to said third or fourth volume, and wherein said first and second storage apparatuses respectively save said data to be saved in said first or second secondary volume in said third or fourth volume.

8. The information system according to claim 7, wherein said third storage apparatus is further coupled to said second storage apparatus and wherein alternatively only one of said first and second storage apparatuses saves data to be saved in said first or second secondary volume in said third volume.

9. The information system according to claim 8, wherein said first and second storage apparatuses respectively retain snapshot management information for managing said snapshot, wherein said first storage apparatus notifies update information to said second storage apparatus upon updating said snapshot management information, and wherein said second storage apparatus updates said snapshot management information in its possession according to a notice from said first storage apparatus.

10. A data transfer method in an information system comprising:

a computer as a host system, a first storage apparatus coupled to said computer, and a second storage apparatus coupled to said first storage apparatus and said computer, wherein said first storage apparatus includes a first primary volume and a first secondary volume;

wherein said second storage apparatus includes a second primary volume and a second secondary volume;

said data transfer method comprising:

a first step of said first and second storage apparatuses executing remote copy of copying data written into said first primary volume from said computer to said second primary volume, and at least one of said first and second storage apparatuses saving pre-updated data of said first or second primary volume updated following a creation command of a logical snapshot in said first or second secondary volume; and a second step of said computer switching the destination of a write request of said data from said first storage apparatus to said second storage apparatus in case of a failure occurring in said first storage apparatus wherein said information system further comprises:

a third storage apparatus coupled to said first storage apparatus and including a third volume constituted of a storage area provided by a mounted Hard Disk Drive (HDD), and a fourth storage apparatus coupled to said second storage apparatus and including a fourth volume constituted of a storage area provided by a mounted HDD, wherein said first and second secondary volumes are virtual volumes mapped to said third or fourth volume, and wherein, at said first step, said first and second storage apparatuses respectively save said data to be saved in said first or second secondary volume in said third or fourth volume.

11. The data transfer method according to claim 10, wherein said third storage apparatus is further coupled to said second storage apparatus; and wherein, at said first step, alternatively only one of said first and second storage apparatuses saves data to be saved in said first or second secondary volume in said third volume.

12. The data transfer method according to claim 11, wherein said first and second storage apparatuses respectively retain snapshot management information for managing said snapshot, wherein said first storage apparatus notifies update information to said second storage apparatus upon updating said snapshot management information, and wherein said second storage apparatus updates said snapshot management information in its possession according to a notice from said first storage apparatus.

* * * * *